(12) United States Patent
Davignon

(10) Patent No.: US 7,196,707 B2
(45) Date of Patent: Mar. 27, 2007

(54) TANGENT BALANCING

(75) Inventor: Marc-André Davignon, Montreal (CA)

(73) Assignee: Autodesk Canada Co., Montreal (CA)

( * ) Notice: Subject to any disclaimer, the term of this patent is extended or adjusted under 35 U.S.C. 154(b) by 75 days.

(21) Appl. No.: 10/938,715

(22) Filed: Sep. 10, 2004

(65) Prior Publication Data
US 2005/0052460 A1 Mar. 10, 2005

(30) Foreign Application Priority Data
Sep. 10, 2003 (GB) ................... 0321280.0

(51) Int. Cl.
*G06T 11/20* (2006.01)
(52) U.S. Cl. .................................... 345/442
(58) Field of Classification Search ........... 345/441, 345/442, 443
See application file for complete search history.

(56) References Cited

U.S. PATENT DOCUMENTS

| 5,253,336 | A | * | 10/1993 | Yamada | 345/442 |
| 5,309,521 | A | * | 5/1994 | Matsukawa | 345/469 |
| 5,363,479 | A | * | 11/1994 | Olynyk | 345/442 |
| 5,500,927 | A | * | 3/1996 | Sander-Cederlof et al. | 345/442 |
| 5,566,288 | A | * | 10/1996 | Koerhsen | 345/442 |
| 5,598,182 | A | * | 1/1997 | Berend et al. | 345/619 |
| 5,611,036 | A | * | 3/1997 | Berend et al. | 345/441 |
| 5,818,459 | A | * | 10/1998 | Kurumida | 345/442 |
| 6,111,588 | A | * | 8/2000 | Newell | 345/442 |
| 6,154,221 | A | * | 11/2000 | Gangnet | 345/442 |
| 6,204,861 | B1 | * | 3/2001 | Chen | 345/442 |
| 6,268,871 | B1 | * | 7/2001 | Rice et al. | 345/442 |
| 6,441,823 | B1 | * | 8/2002 | Ananya | 345/442 |
| 6,587,747 | B2 | * | 7/2003 | Hirai et al. | 700/189 |
| 6,654,016 | B1 | * | 11/2003 | Hobbs | 345/442 |
| 6,728,392 | B1 | * | 4/2004 | Joshi | 382/104 |
| 6,774,905 | B2 | * | 8/2004 | Elfving et al. | 345/581 |
| 6,782,306 | B2 | * | 8/2004 | Yutkowitz | 700/189 |
| 6,856,312 | B1 | * | 2/2005 | Imai et al. | 345/419 |
| 6,911,980 | B1 | * | 6/2005 | Newell et al. | 345/441 |
| 6,919,888 | B1 | * | 7/2005 | Perani et al. | 345/420 |
| 6,985,639 | B1 | * | 1/2006 | Alwar et al. | 382/286 |
| 2001/0033281 | A1 | * | 10/2001 | Yoshida et al. | 345/420 |

OTHER PUBLICATIONS

"Error Bounded regular algebraic spline curves", Bajaj et al, Jun. 1999, SCG'99, ACM 1999, pp. 332-340.*
"A Bezier curve builder implemented in APL2", Tollet et al, Jul. 1992, APL Quote Quad, ACM 1992, pp. 256-264.*

* cited by examiner

Primary Examiner—Ryan Yang
(74) Attorney, Agent, or Firm—Gates & Cooper LLP

(57) ABSTRACT

When a Bézier spline is fitted to a plurality of points the two tangent handles at each control point can be very different in length. A method of fitting a second spline to the first spline that has tangent handles of equal length at each control point is provided. A point is found on the first spline that is close to the midpoint between the two control points defining the tangent handles. This point is a new control point on the second spline. Tangent handles to the new control point are then found such that they have a slope equal to the tangent to the first spline at the new control point, the sum of their lengths is equal to the sum of the original two tangent handles and their lengths are equal to each other. A second spline found in this way closely approximates the first spline. The lengths of the tangent handles may be adjusted to provide a better fit.

20 Claims, 55 Drawing Sheets

A least squares curve fit is achieved by: 2401

$$\begin{pmatrix} c_{0,0} & c_{0,1} \\ c_{1,0} & c_{1,1} \end{pmatrix} \begin{pmatrix} MULTIPLIER\ 1 \\ MULTIPLIER\ 2 \end{pmatrix} = \begin{pmatrix} X_0 \\ X_1 \end{pmatrix} \Rightarrow (C_0 \quad C_1) \begin{pmatrix} MULTIPLIER\ 1 \\ MULTIPLIER\ 2 \end{pmatrix} = X$$

where: $c_{0,1} = c_{1,0} = \sum_{i=1}^{N} A0_i \cdot A1_i$ $c_{0,0} = \sum_{i=1}^{N} A0_i^2$ $c_{1,1} = \sum_{i=1}^{N} A1_i^2$ ⎯ 2405

$X_0 = \sum_{i=1}^{N} Y0_i$ $X_1 = \sum_{i=1}^{N} Y1_i$ $A0_i = LEFT\ TANGENT \times B1(u_i)$
$A1_i = RIGHT\ TANGENT \times B2(u_i)$ ⎯ 2403

$B0(u_i) = u_i^3$
$B1(u_i) = u_i^2 (1-u_i)$
$B2(u_i) = u_i (1-u_i)^2$ ⎯ 2402
$B3(u_i) = (1-u_i)^3$
$Y0_i = (d_i - (P0 \times (B0(u_i) + B1(u_i)) + P3 \times (B2(u_i) + B3(u_i)))) \cdot A0_i$ ⎯ 2404
$Y1_i = (d_i - (P0 \times (B0(u_i) + B1(u_i)) + P3 \times (B2(u_i) + B3(u_i)))) \cdot A1_i$ It is solved by:  $MULTIPLIER\ 1 = \dfrac{\det(X\ C2)}{\det(C1\ C2)}$ $MULTIPLIER\ 2 = \dfrac{\det(C1\ X)}{\det(C1\ C2)}$ ⎯ 2406

*Figure 24*

TANGENT BALANCING

CROSS-REFERENCE TO RELATED APPLICATION

This application claims the benefit under 35 U.S.C. §1.119 of the following co-pending and commonly assigned foreign patent application, which application is incorporated by reference herein:

United Kingdom Application No. 03 21 280.0 entitled, "IMAGE DATA PROCESSING", by Marc-André Davignon, filed on Sep. 10, 2003.

BACKGROUND OF THE INVENTION

1. Field of the Invention

The invention relates to fitting a spline to a user-defined freehand curve.

2. Description of the Related Art

Many image-related applications allow a user to draw a freehand curve. For example, a curve may be drawn to enclose a garbage matte area, to define a portion of an image to be tracked or to define a motion path. Such a curve is composed of a plurality of digitized points and is expensive both in computation and storage to manipulate and test. Thus a spline is usually fitted to a freehand curve, such a spline being made up of a plurality of discrete curves, usually joined with some degree of continuity.

However, it is often the case that such curve-fitting processes result in control points that are difficult to manipulate. In particular, many curve-fitting algorithms result in splines that have tangent handles, the slope and length of which define the curve, but often the handles are unbalanced, with one being much shorter than the other. Such a fitted curve can be difficult for a user to manipulate.

SUMMARY OF THE INVENTION

According to a first aspect of the invention, there is provided a method of editing image data, comprising the steps of fitting a first spline to a plurality of points and fitting a second spline to said first spline, wherein said second spline has the same number of control points as said first spline and wherein for any principal control point on said second spline its tangent handles are of equal length.

BRIEF DESCRIPTION OF THE DRAWINGS

FIG. 24 shows equations used during the curve-fitting process;

DETAILED DESCRIPTION

FIG. 1

Figure 1:
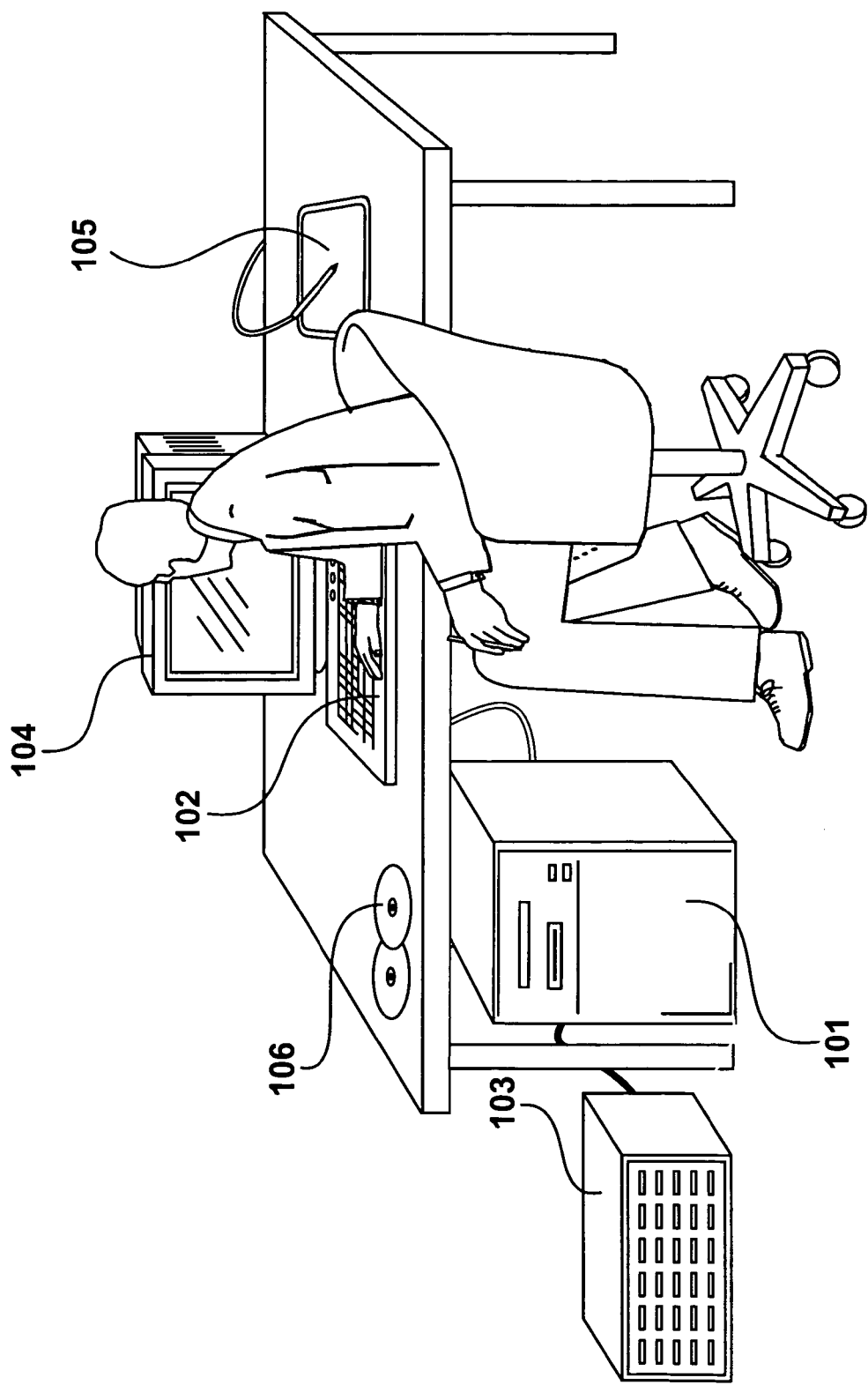
FIG. 1 shows an image processing environment.

An example of apparatus according to the present invention is shown in FIG. 1 which illustrates an image processing environment, such as an online editing station. A processing system 101, in this example an Octane™ produced by Silicon Graphics Inc., supplies image signals to a video display unit (VDU) 104. Image data is stored on a redundant array of inexpensive disks (RAID) 103. The RAID is configured in such a way as to store a large volume of data, and to supply this data to processing system 101, when required, at a high bandwidth. The operator controls the image processing environment formed by the processing system 101, the VDU 104 and the RAID 103 by means of a keyboard 102 and a stylus-operated graphics tablet 105. The environment shown in FIG. 1 is optimal for the purpose of processing image and other high-bandwidth data.

Instructions controlling the processing system 101 may be installed from a physical medium such as a CD-ROM disk 106, or over a network, including the Internet. These instructions enable the processing system 101 to interpret user commands from the keyboard 102 and the graphics tablet 105 such that data may be viewed, edited and processed.

FIG. 2

Figure 2:
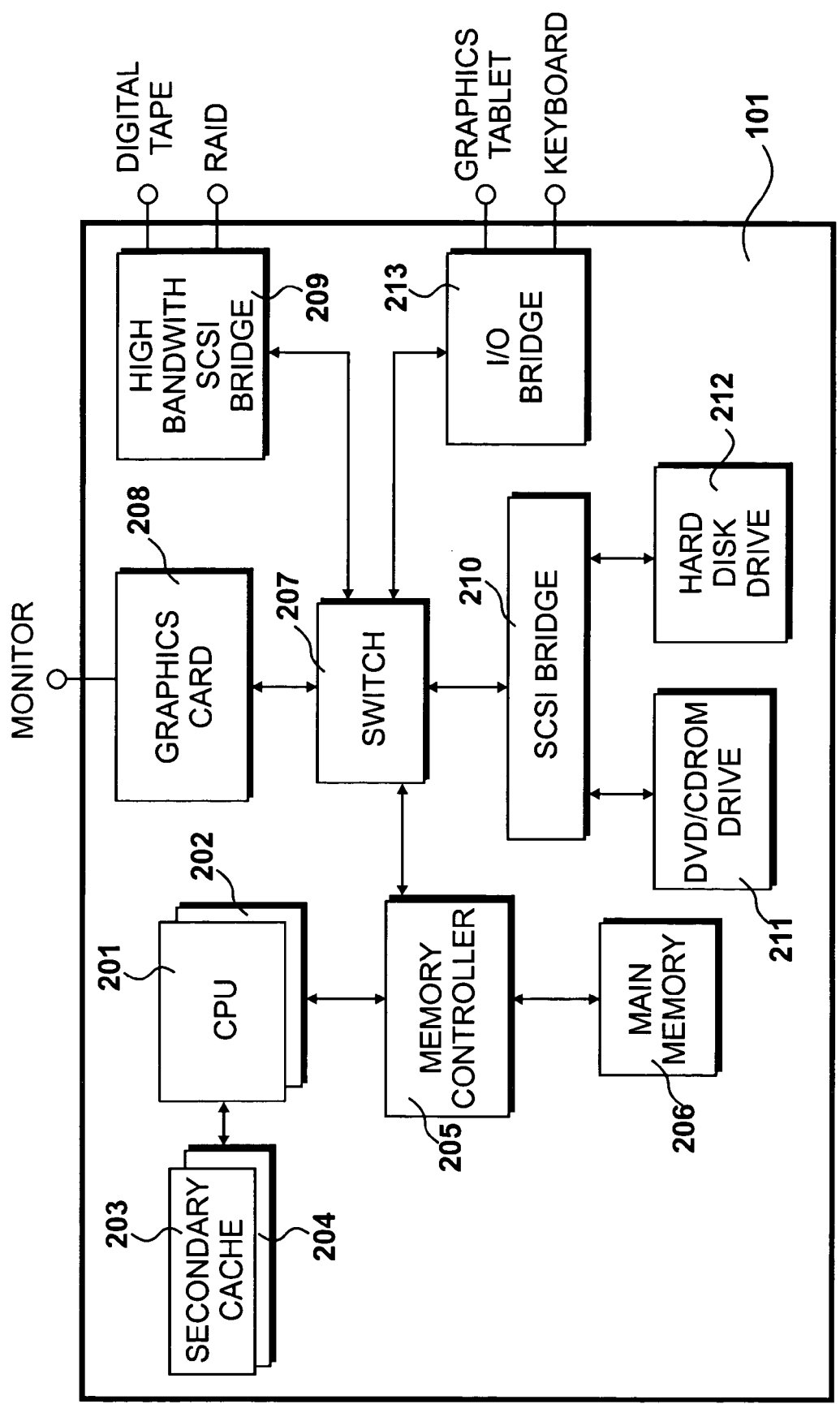
FIG. 2 shows a processing system illustrated in FIG. 1.

The processing system 101 shown in FIG. 1 is detailed in FIG. 2. The processing system comprises two central processing units (CPUs) 201 and 202 operating in parallel. Each of these processors may comprise a MIPS R11000 manufactured by MIPS Technologies Incorporated, of Mountain View, Calif. Each of these CPUs 201 and 202 may also have a dedicated secondary cache memory 203 and 204 that facilitates per-CPU storage of frequently used instructions and data. Each CPU 201 and 202 may further include separate primary instruction and data cache memory circuits on the same chip, thereby facilitating a further level of processing improvement. A memory controller 205 provides a common connection between the CPUs 201 and 202 and a main memory 206. The main memory 206 comprises two gigabytes of dynamic RAM.

The memory controller 205 further facilitates connectivity between the aforementioned components of the processing system 101 and a high bandwidth non-blocking crossbar switch 207. The switch makes it possible to provide a direct high capacity connection between any of several attached circuits. These include a graphics card 208. The graphics card 208 generally receives instructions from the CPUs 201 and 202 to perform various types of graphical image rendering processes, resulting in images, clips and scenes being rendered in real time on the monitor 104. A high bandwidth SCSI bridge 209 provides an interface to the RAID 103, and also, optionally, to a digital tape device, for use as backup.

A second SCSI bridge 210 facilitates connection between the crossbar switch 207 and a DVD/CD-ROM drive 211. The CD-ROM drive provides a convenient way of receiving large quantities of instructions and data, and is typically used to install instructions for the processing system 101 onto a hard disk drive 212. Once installed, instructions located on the hard disk drive 212 may be fetched into main memory 206 and then executed by the CPUs 201 and 202. An input/output bridge 213 provides an interface for the graphics tablet 105 and the keyboard 104, through which the user is able to provide instructions to the processing system 101.

FIG. 3

Figure 3:
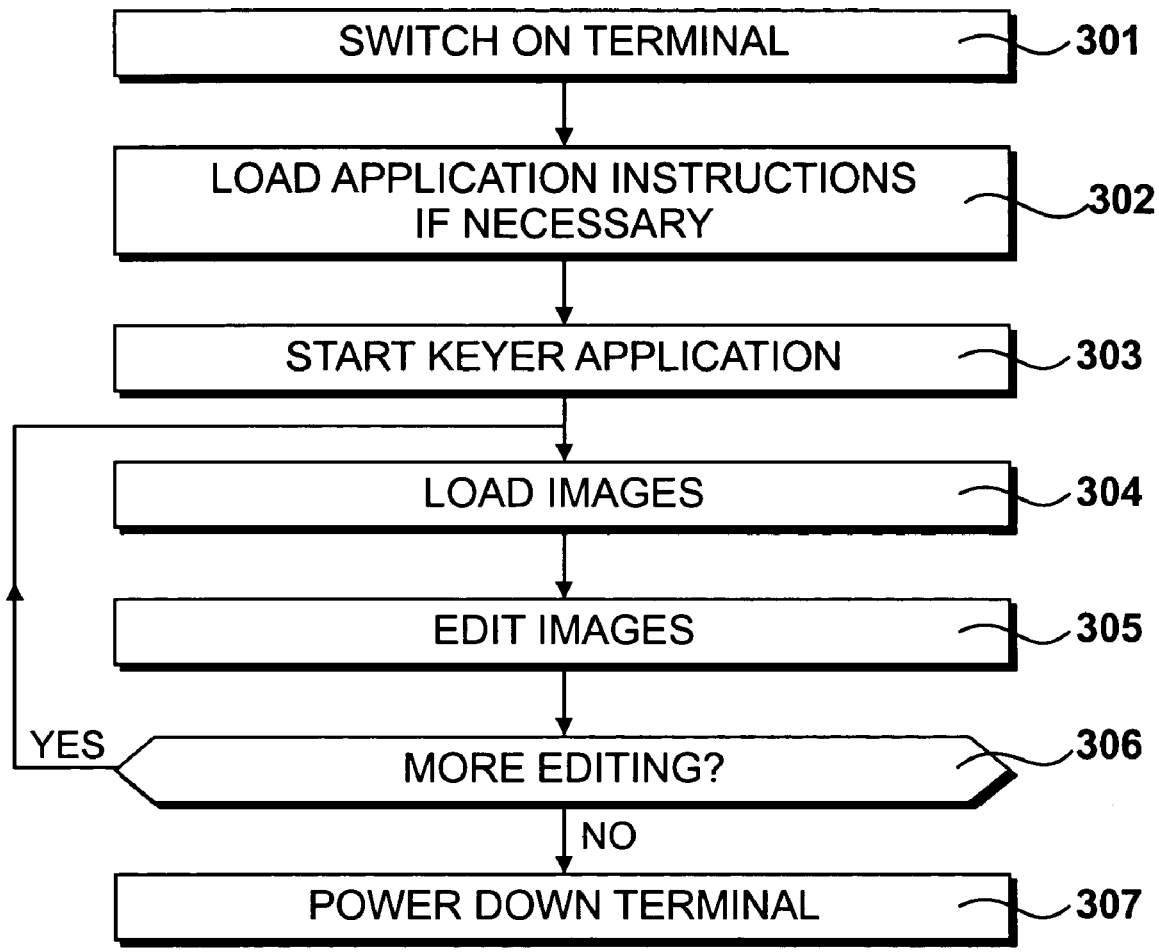
FIG. 3 shows steps carried out by the user of processing system shown in FIG. 1.

FIG. 3 shows steps carried out by the user of processing system 101. At step 301 the system is powered up and at step 302 application instructions are loaded as necessary. At step 303, the application is started and at step 304, the user selects and loads image data. This image data represents, in one or more embodiments, two pictures that are to be composited together, and at step 305, this is carried out according to parameters set by the user.

At step 306, a question is asked as to whether more images are to be edited and if this question is answered in the affirmative, then control is returned to step 304. If this is answered in the negative, then the processing system is switched off at step 307.

FIG. 4

Figure 4:
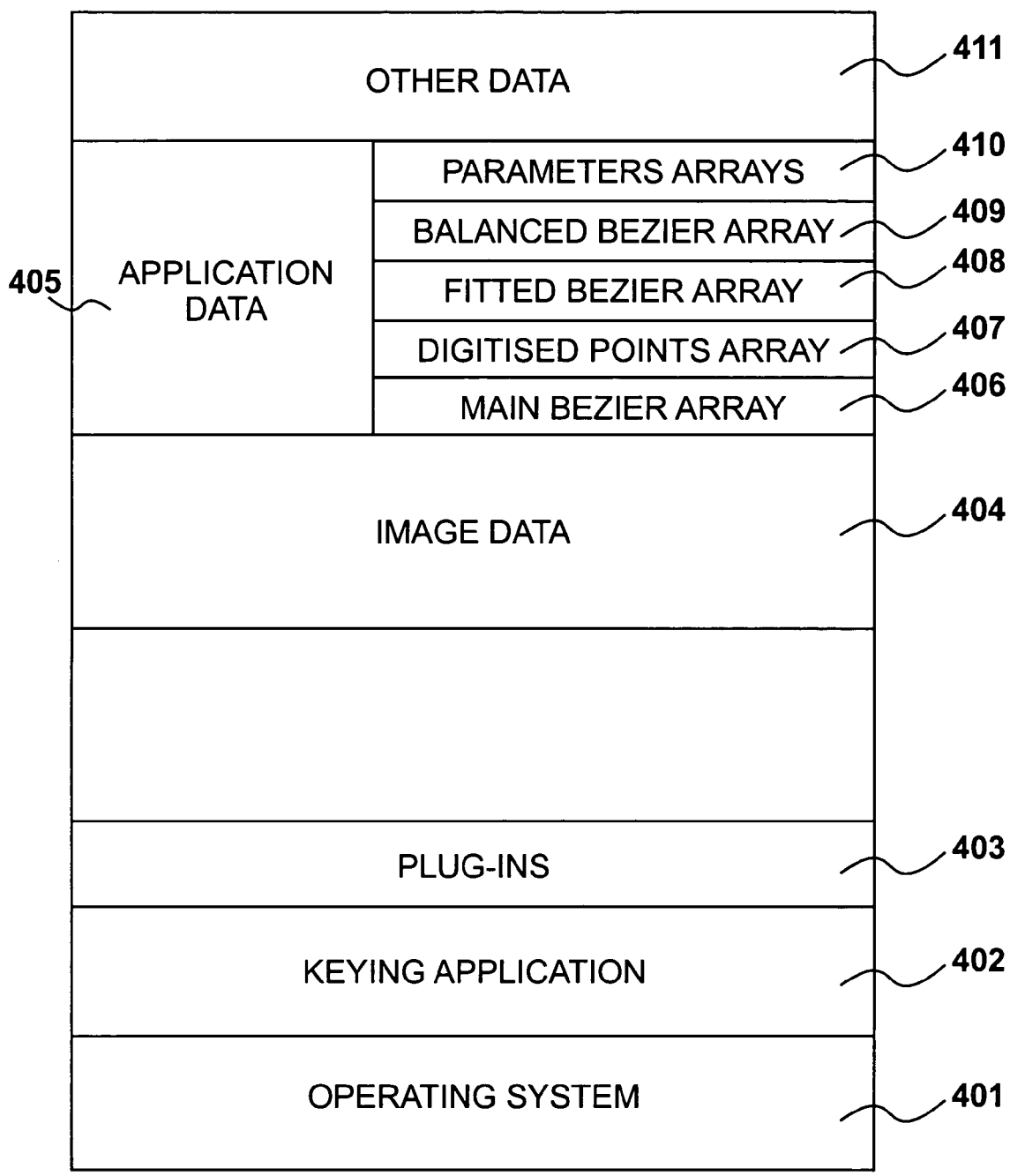
FIG. 4 represents the contents of the main memory shown in FIG. 2.

FIG. 4 represents the contents of main memory 206 during step 306. An operating system 401 provides operating system instructions for common system tasks and device abstraction. The Windows™ XP™ operating system may be used. Alternatively, a Macintosh™, Unix™ or Linux™ operating system may provide similar functionality. Keyer application instructions 402 provide instructions for the compositing of images. Plug-ins 403 provide additional instructions for special effects used by the keyer application 402.

Image data 404 includes clips of frames that are to be edited. Application data 405 comprises temporary data structures required to process the images. In particular, main Bézier array 406, digitized points array 407, fitted Bézier array 408, balanced Bézier array 409, and parameters array 410 are used to store data required in order to define a garbage matte. Other data 411 includes temporary data structures used by the operating system 401.

FIG. 5

Figure 5:
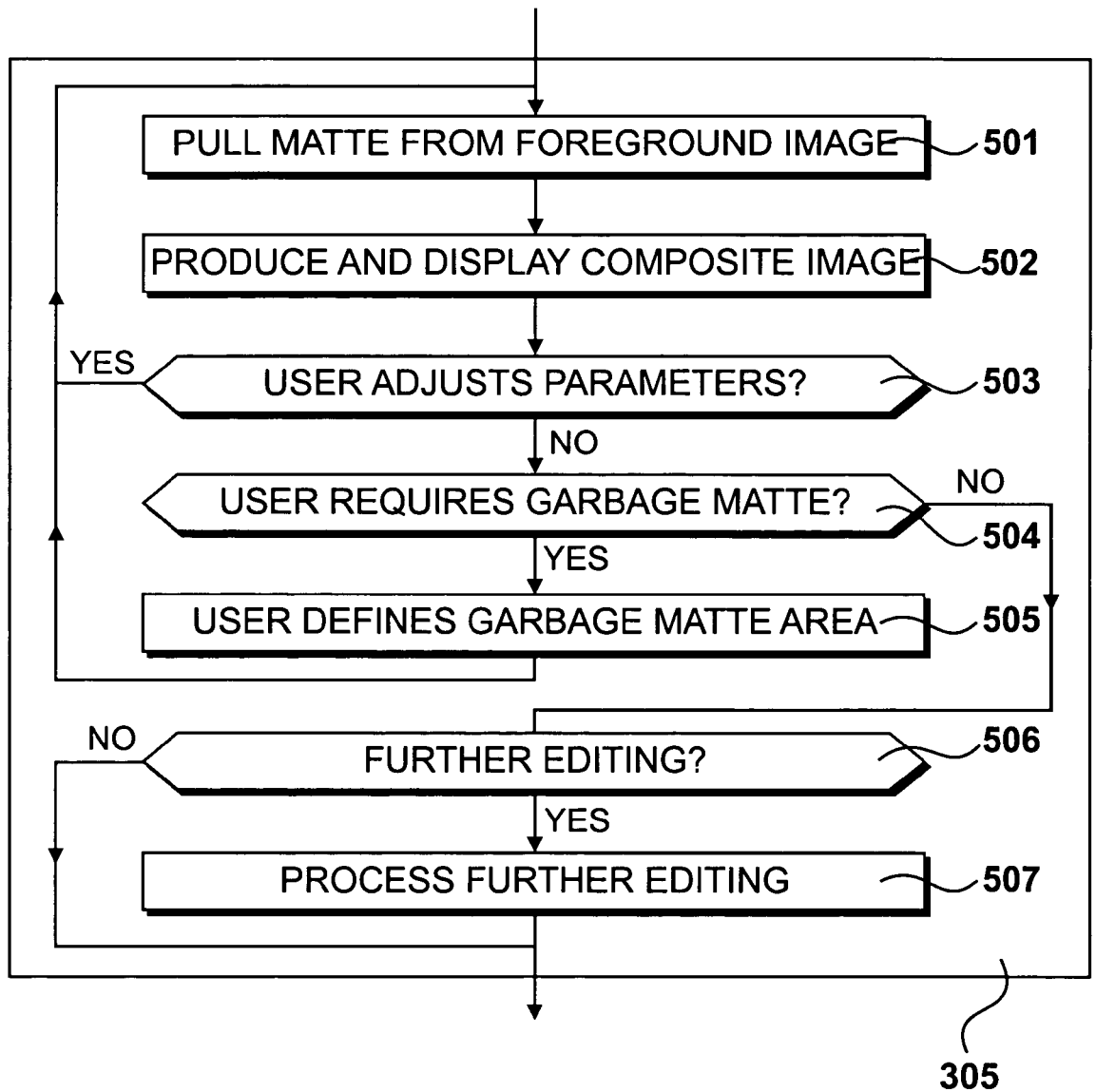
FIG. 5 details steps carried out in FIG. 3 at which images are edited.

FIG. 5 details step 305 at which the user performs editing on the images loaded at step 304. These images are a foreground image, composed of a "talent" photographed against a uniform backing color, and a background image that are to be composited together to produce an output composited image of the talent against the background.

Thus, at step 501 an initial matte of the talent is pulled from the foreground image, and at step 502 the composite image is produced and displayed using this matte. At step 503, a question is asked as to whether the user has adjusted any of the keying parameters. A typical keying application includes many user-defined parameters that adjust such details as softness and tolerance regions, blue spill removal and halo removal. Thus, if this question is answered in the affirmative, then control is returned to step 501.

If the question asked at step 503 is answered in the negative, to the effect that the user has not adjusted any parameters, then at step 504, a second question is asked as to whether the user requires a garbage matte. If this question is answered in the affirmative, then the user defines the garbage matte area at step 505 before control is returned to step 501 and the keying is restarted. A garbage matte is defined by a user drawing a line within the displayed matte or composited image that excludes parts of the foreground image that belong to the backing color. This technique is normally used where the foreground image has been badly lit resulting in an uneven backing color. In this case, especially when certain attributes of the talent make it difficult to pull a matte, it is often difficult to produce a satisfactory result using only chroma-keying.

If the question asked at step 504 is answered in the negative, to the effect is that the user does not require a garbage matte, then at step 506 a question is asked as to whether any further editing is to be carried out on the images. If this question is answered in the affirmative then the further editing is processed at step 507 and if it is answered in the negative then step 305 is concluded and the loaded images have been edited to the user's satisfaction to create an output image.

FIG. 6

Figure 6:
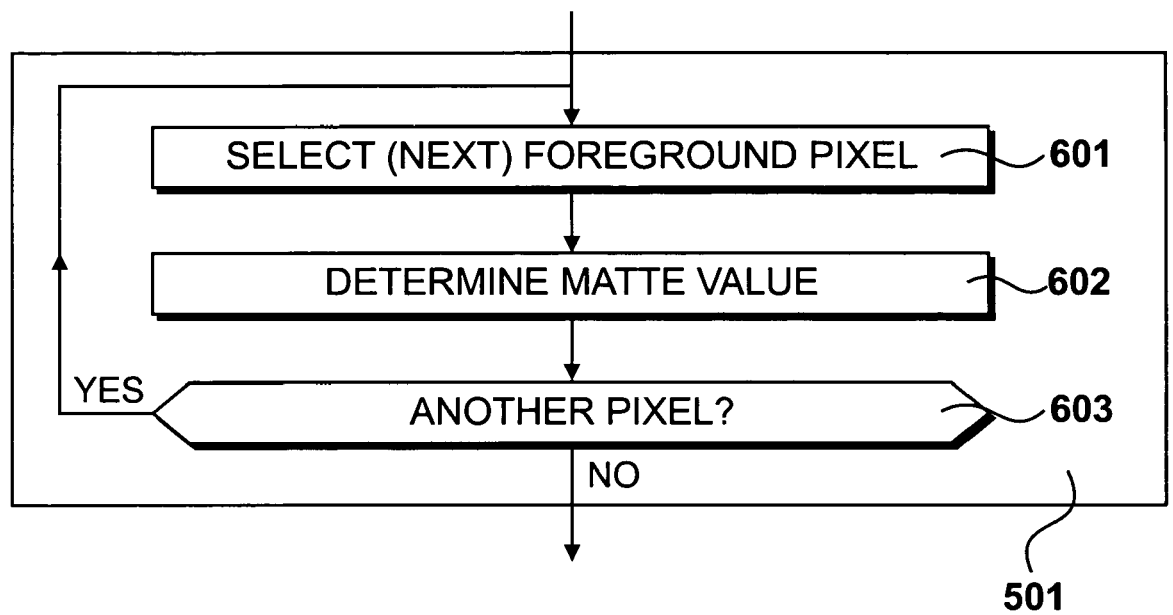
FIG. 6 details steps carried out in FIG. 5 to pull a matte from a foreground image.

FIG. 6 details step 501 at which a matte is pulled from the loaded foreground image. At step 601 the first pixel in the foreground is selected and at step 602, the red, green, and blue (RGB) values are used to determine a matte value. This value is then stored as a fourth value, sometimes referred to as an alpha-channel, in the pixel's RGB array. At step 603, a question is asked as to whether there is another pixel in the foreground image and if this question is answered in the affirmative, then control is returned to step 601 and the next pixel is selected. If it is answered in the negative, then step 501 is concluded since each pixel in the foreground image has a matte value associated with it. The matte values are between zero and one and may be used, if required, to produce and display a black and white image of the matte.

FIG. 7

Figure 7:
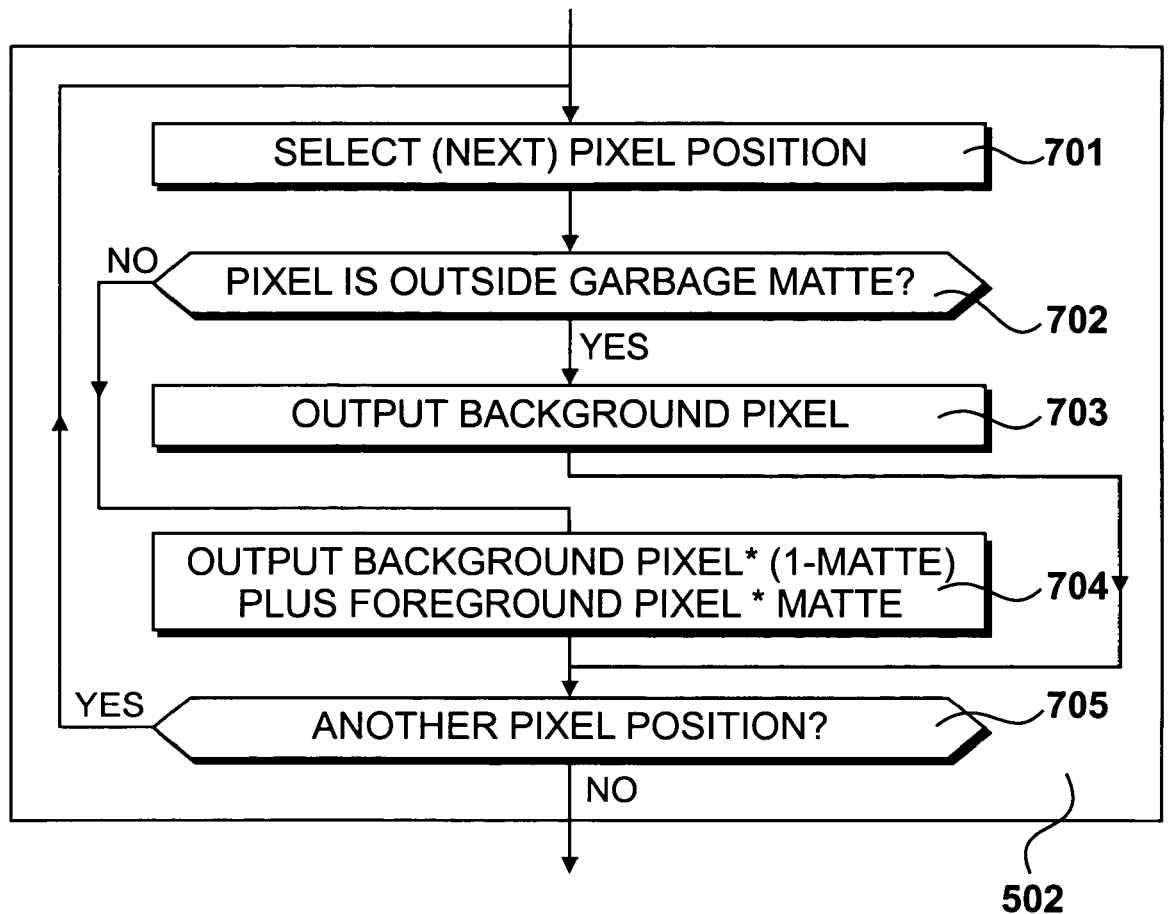
FIG. 7 details steps carried out in FIG. 5 to produce and display a composite image.

FIG. 7 details step 502 at which the composite image is produced and displayed. At step 701 the first pixel position of the composite image is selected and at step 702 a question is asked as to whether the pixel's position is outside any garbage matte that has been defined by the user. If this question is answered in the affirmative, then the background pixel in the corresponding position is output at step 703. No further calculation is necessary for this pixel position since by defining a garbage matte, the user is specifying that anything outside the matte is automatically set to be background.

If the question asked at step 702 is answered in the negative, to the effect that the pixel is inside the garbage matte, then at step 704 the output for the pixel position is calculated as one minus the foreground pixel's matte value multiplied by the background pixel, plus the matte value multiplied by the foreground pixel. Thus an output pixel value is a combination of the RGB values of the foreground and background pixels in the corresponding position, mixed in a proportion determined by the foreground pixel's matte value.

At step 705, a question is asked as to whether there is another pixel position in the composite image. If this question is answered in the affirmative then control is returned to step 701 and the next pixel position is selected. If it is answered in the negative then step 502 is concluded.

FIG. 8

Figure 8:
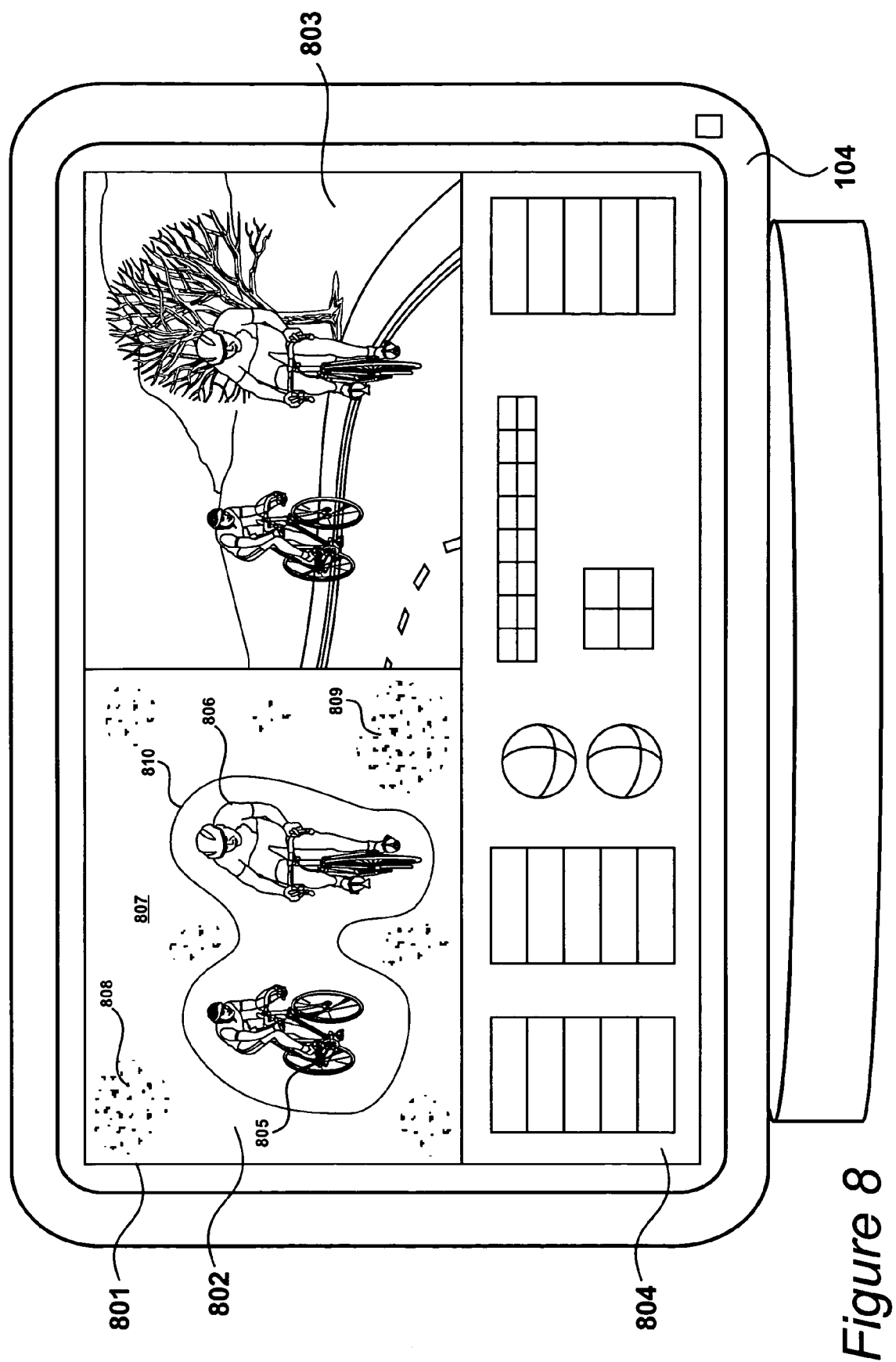
FIG. 8 shows a keyer application displayed on the VDU shown in FIG. 1.

FIG. 8 shows keyer application 801 displayed on VDU 104. The keyer application currently includes two display windows showing the foreground image 802 and the composite image 803. A black and white matte image could also be shown instead of or in addition to either of these images. Area 804 of keyer application 801 includes various buttons, widgets and parameter values that are adjustable by the user to change the composite image.

Foreground image 802 shows two cyclists 805 and 806 against a blue background 807. The background has been very poorly lit and so contains areas such as area 808 and area 809 where the backing color is noticeably different from the backing color in the rest of the image. This makes it difficult to pull a good matte from the foreground image using chroma-keying and the user has noticed areas of composite image 803 where artifacts are being produced. He has therefore determined to use a garbage matte and so draws a closed line 810 around cyclists 805 and 806. By defining a garbage matte in several frames of a clip of frame, a travelling garbage matte can be produced which interpolates between the frames in which the garbage matte is specified to produce a garbage matte for every frame in the clip.

Thus, for this process to be user-friendly, line 810 must be easy to draw and a freehand curve would seem the simplest solution. However, the line must also be well defined such that it is easy to test whether or not any pixel position is inside the garbage matte. Since a freehand curve is defined simply as a collection of pixel positions this would make such a test very awkward. Users of keying applications are normally also familiar with using control points to specify a spline. Since this is a curve or collection of curves defined by functions it is easy to perform the aforementioned test on it. However it is not always intuitive to draw.

For these reasons a curve fitting process is used that fits a spline to a freehand curve, thus allowing the user to draw the required curve but resulting in an easily testable line. In this example, the user is given the choice between drawing freehand and specifying one or more Bézier curves. A collection of freehand and Bézier curves may be used to produce the single garbage matte line 810.

FIG. 9

Figure 9:
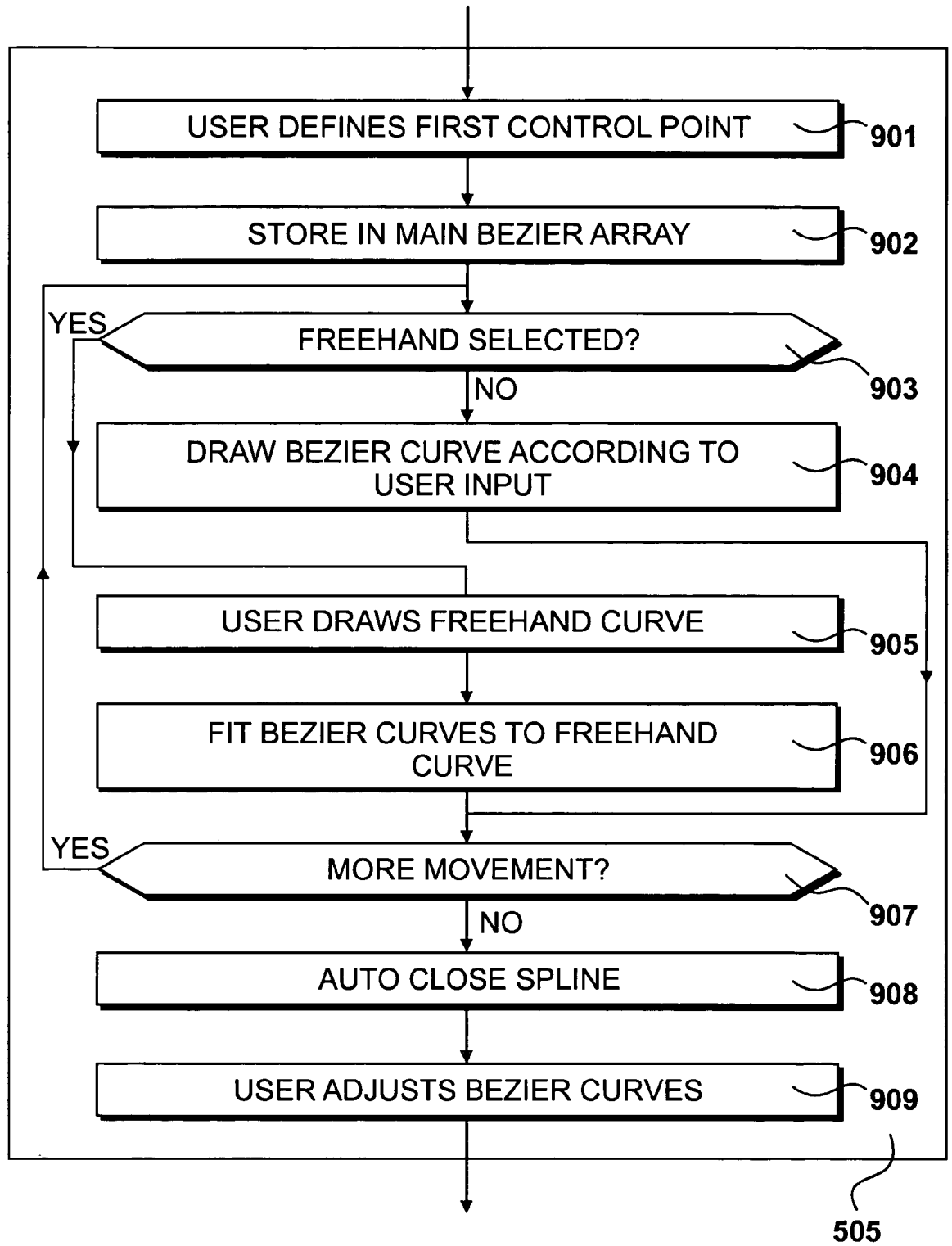
FIG. 9 details steps carried out in FIG. 9 at which the user draws a line to define a garbage matte area.

FIG. 9 details step 505 at which the user draws line 810 to define the garbage matte area. At step 901 the user defines a first control point by moving a cursor on VDU 104 to a particular position using stylus and pad 105, and then putting pressure on the stylus to indicate a position selection. At step 902, the x and y coordinates on the VDU of this first control point are stored in main Bézier array 406. This is an expandable array that stores two values per element and that can be added to almost indefinitely dependent upon memory space 206 within processing system 101.

At step 903, a question is asked as to whether freehand drawing is selected. This may be done by holding down a modifier key on keyboard 102 or by keeping pressure on stylus 105. There are many ways in which the process can determine whether the user wishes to draw a freehand curve or a Bézier curve and the skilled reader will understand that they are all encompassed herein. If the question asked at step 903 is answered in the negative, to the effect that the user does not wish to draw a freehand curve, then at step 904, a Bézier curve is drawn according to the user input. However, if the question at step 903 is answered in the affirmative then the user draws a freehand curve on VDU 104 at step 905 and at step 906 a spline of Bézier curves is fitted to the freehand curve and displayed in its place.

At step 907 a question is asked as to whether there is more movement of the stylus indicating that further curves are to be drawn. If this question is answered in the affirmative, then control is returned to step 903 and the question is asked again as to whether freehand drawing is selected. If the question asked at step 907 is answered in the negative, to the effect that the user has finished, then at step 908 the spline that has been created is closed by drawing a final Bézier curve from the end point to the beginning point. The user may then adjust the spline at step 909 by moving any of the control points before ending the garbage matte-definition step 505.

FIG. 10

Figure 10:
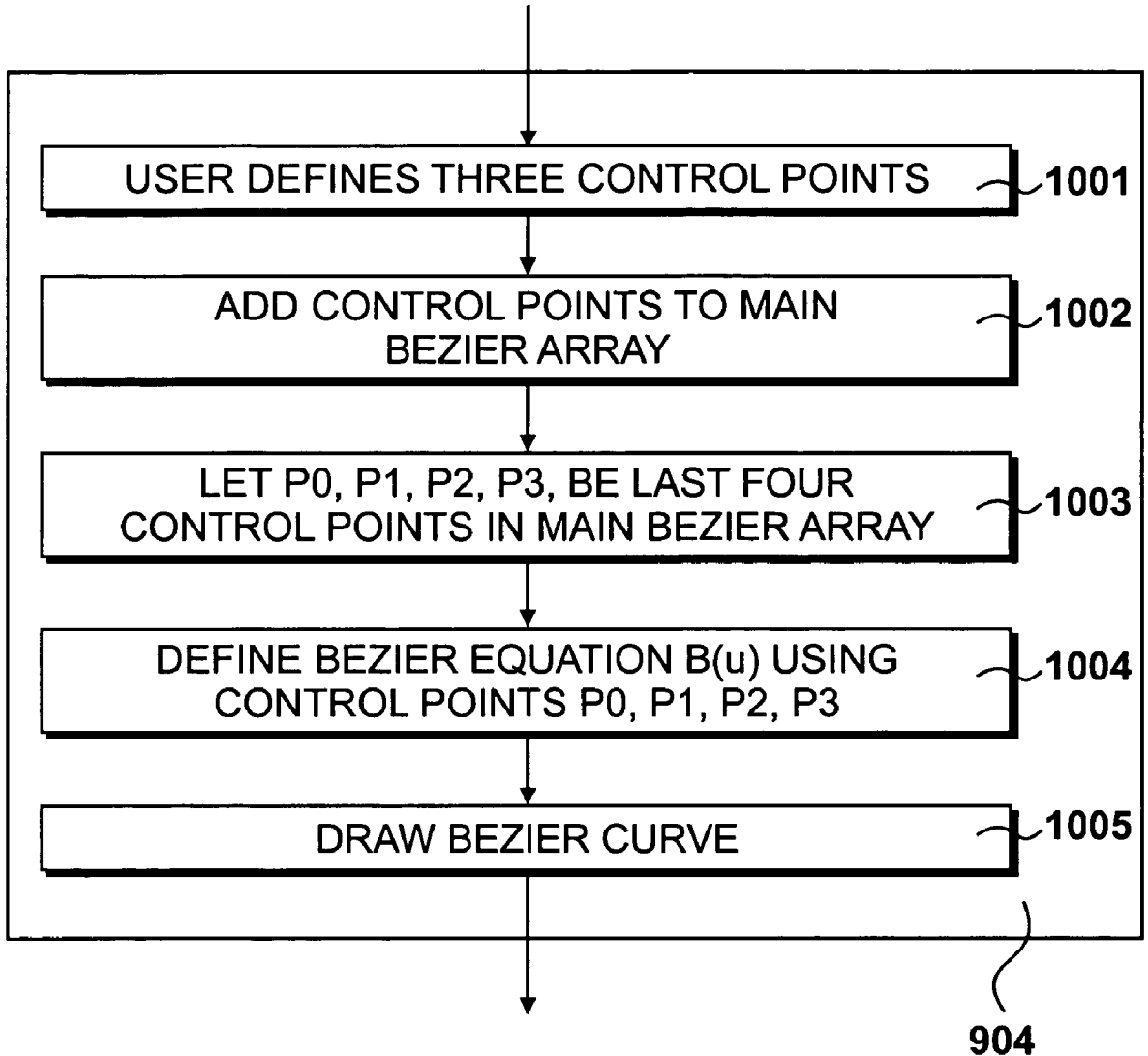
FIG. 10 details steps carried out in FIG. 9 to define and draw a Bézier curve.

FIG. 10 details step 904 at which a Bézier curve is drawn according to user input received. At step 1001, the user defines three control points and at step 1002, the x-y coordinates, with respect to VDU 104, of these control points are added to the end of main Bézier array 406. Thus main Bézier array 406 now contains the first control point defined at step 901 and the three further control points, giving four points which are be used to define a Bézier curve. Thus at step 1003, four control points P0, P1, P2 and P3 are set to be the last four control points in main Bézier array 406 and at step 1004, a Bézier equation is defined using these control points. At step 1005 a Bézier curve is drawn using the Bézier equation defined at step 1004.

Further iterations of step 904 will add three more control points to main Bézier array 406 each time. Thus at any time array 406 contains a whole number of control points, which is equal to one more than some multiple of three.

In this embodiment the x-y coordinates are input into the keyer application in terms of the x-y coordinate system of VDU 104. However, in order to achieve full functionality of the keyer application it is necessary to transform the VDU coordinates into some system that is relative to the image 802 and is independent of the display means in order for the points to be processed and stored. They are transformed back into display coordinates at the end of the process. However, this transformation is not discussed at length herein since it is part of the general functionality of the keyer application and is not directly related to the embodiment of the invention.

FIG. 11

Figure 11:
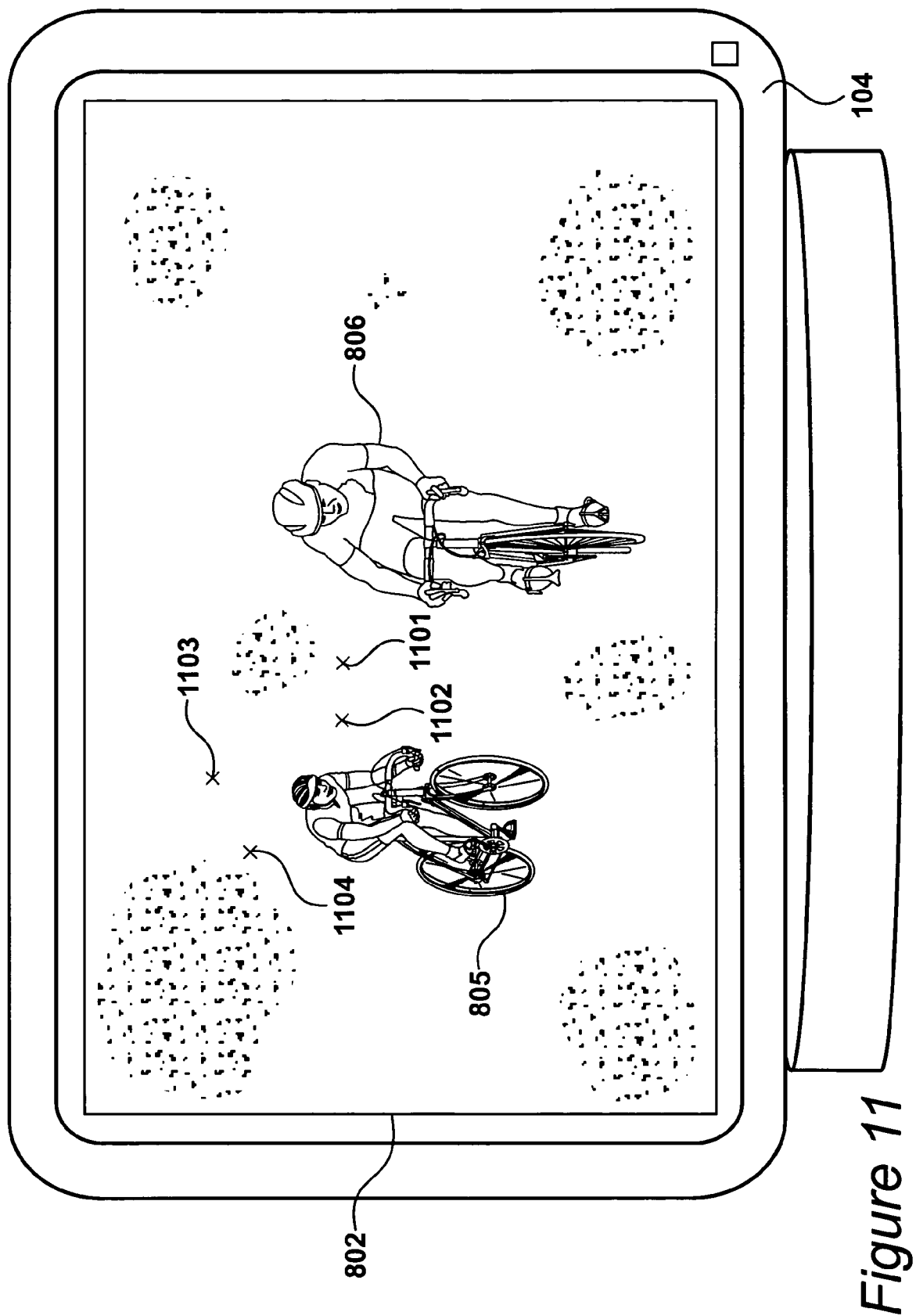
FIG. 11 shows the VDU shown in FIG. 1 on which a foreground image is displayed together with Bézier control points.

FIG. 11 shows VDU 104 on which foreground image 802 is displayed. In order to define a garbage matte around the two cyclists 805 and 806, the user first defines a first control point 1101 at step 901. The user wishes to draw a Bézier curve and thus defines three further control points 1102, 1103 and 1104 at step 1001. These four control points are then used to draw a Bézier curve from point 1101 to point 1104 that is determined by the positions of points 1102 and 1103, as will be described further with reference to FIG. 12. Control points at the beginning and end of a Bézier curve, such as control points 1101 and 1104, are referred to herein as principal control points. Control points that affect the shape of the curve, such as points 1102 and 1103, are referred to as tangent control points.

FIG. 12

Figure 12:
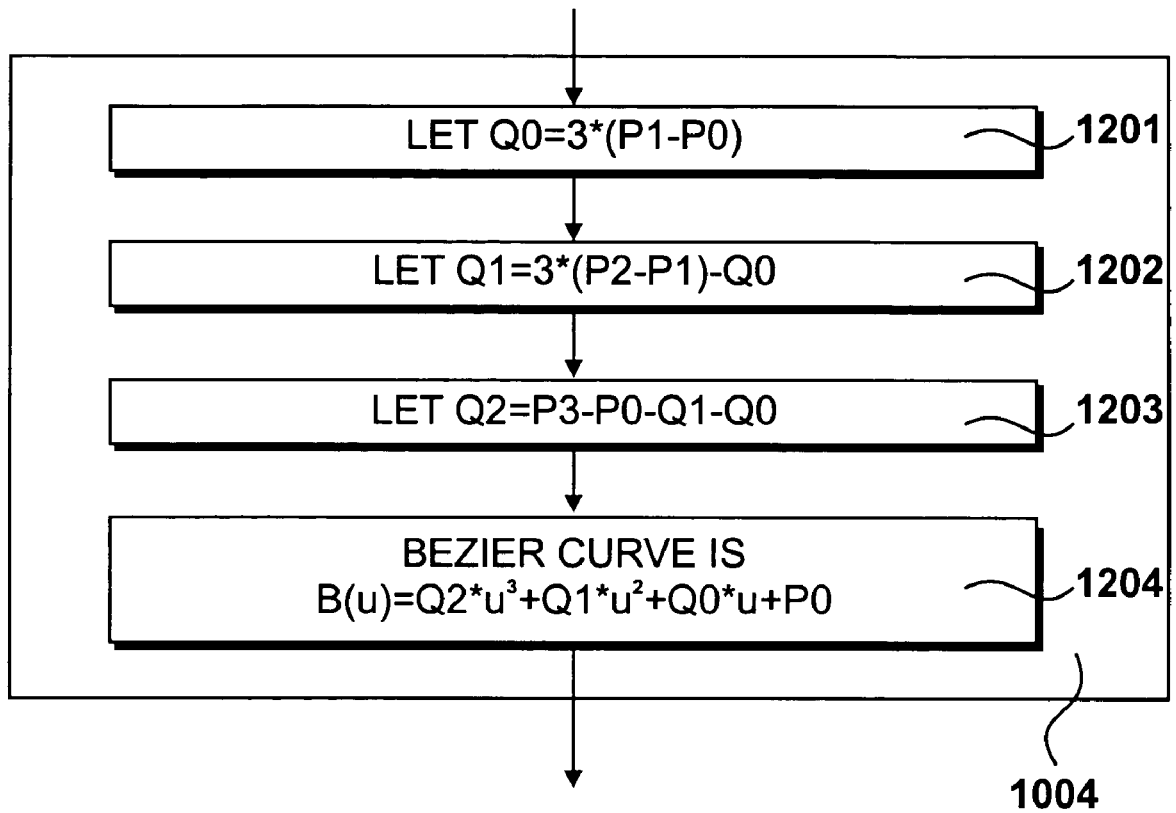
FIG. 12 details steps carried out in FIG. 10 to define a Bézier equation using four control points.

FIG. 12 details step 1004 at which a Bézier equation is defined using the four control points selected at step 1003. At step 1201, a first value Q0 is set to be equal to three times the difference between the first two selected control points. At step 1202, a value Q1 is set to be the value Q0 subtracted from three times the difference between the second and third control points, or the tangent control points. At step 1203 a value Q2 is set to be the values Q0 and Q1 subtracted from the difference between the first and last control points, or the principal control points. It will be appreciated that all three values Q0, Q1 and Q2 are two-dimensional values since they are a function of two-dimensional control points.

At step 1204 the Bézier equation is defined as the sum of the following products: the value Q2 multiplied by a parameter u cubed, the value Q1 multiplied by the parameter u squared, the value Q0 multiplied by the parameter u, and the first control point P0. The result of this equation for any one-dimensional parameter is a two-dimensional point. Inputting a value for the parameter u of 0 will yield the control point P0 and inputting a value for the parameter u of 1 will yield the control point P3. Inputting a value of parameter u between 0 and 1 will yield a point on the Bézier curve between the control points P0 and P3.

FIG. 13

At step 1301 a parameter u is set to be zero, and at step 1302 the value of u is input into the Bézier equation and the x-y coordinates produced are displayed on VDU 104. At step 1303, this point is joined to the previous displayed point, if one exists, by a straight line and at step 1304, the parameter u is incremented by a small amount, which in this example is 0.05.

At step 1305, a question is asked as to whether the value of u is now greater than one and if this question is answered in the negative then control is returned to step 1302. The new value of u is input into the Bézier curve and a new set of x-y coordinates is produced. If the question asked at step 1305 is answered in the affirmative, to the effect that the new value of u is greater than one, then the Bézier curve defined at step 1004 is drawn at step 1306.

The amount by which u is incremented on each iteration is a compromise between computing power and smoothness of a curve and is an implementation detail only.

FIG. 14

Figure 14:
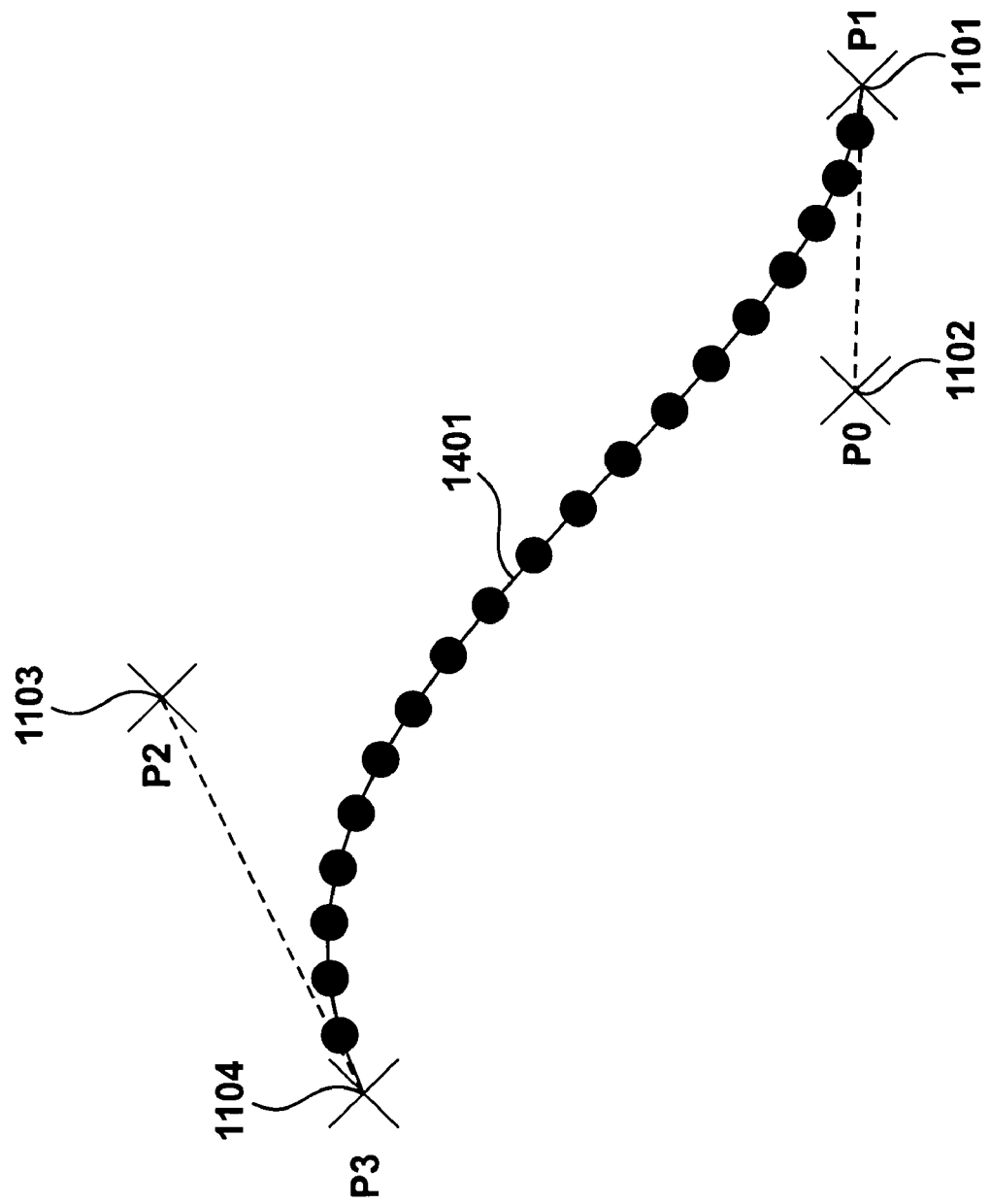
FIG. 14 shows an example of a Bézier curve drawn according to FIG. 10.

FIG. 14 shows a close up of the Bézier curve drawn according to the control points shown in FIG. 11. As can be seen, the Bézier curve 1401 is made up of twenty-one displayed points, including point 1101 and point 1104, which have been joined together by straight lines. The overall impression is of a curve. The straight lines between control points 1101 and 1102 and between control points 1103 and 1104 are known as tangent handles because they are in fact the tangents of the Bézier curve at points 1101 and 1104. Changing the length or slope of these tangents by altering the positions of the tangent control points 1102 and 1103 changes the shape of the curve.

FIG. 15

Figure 15:
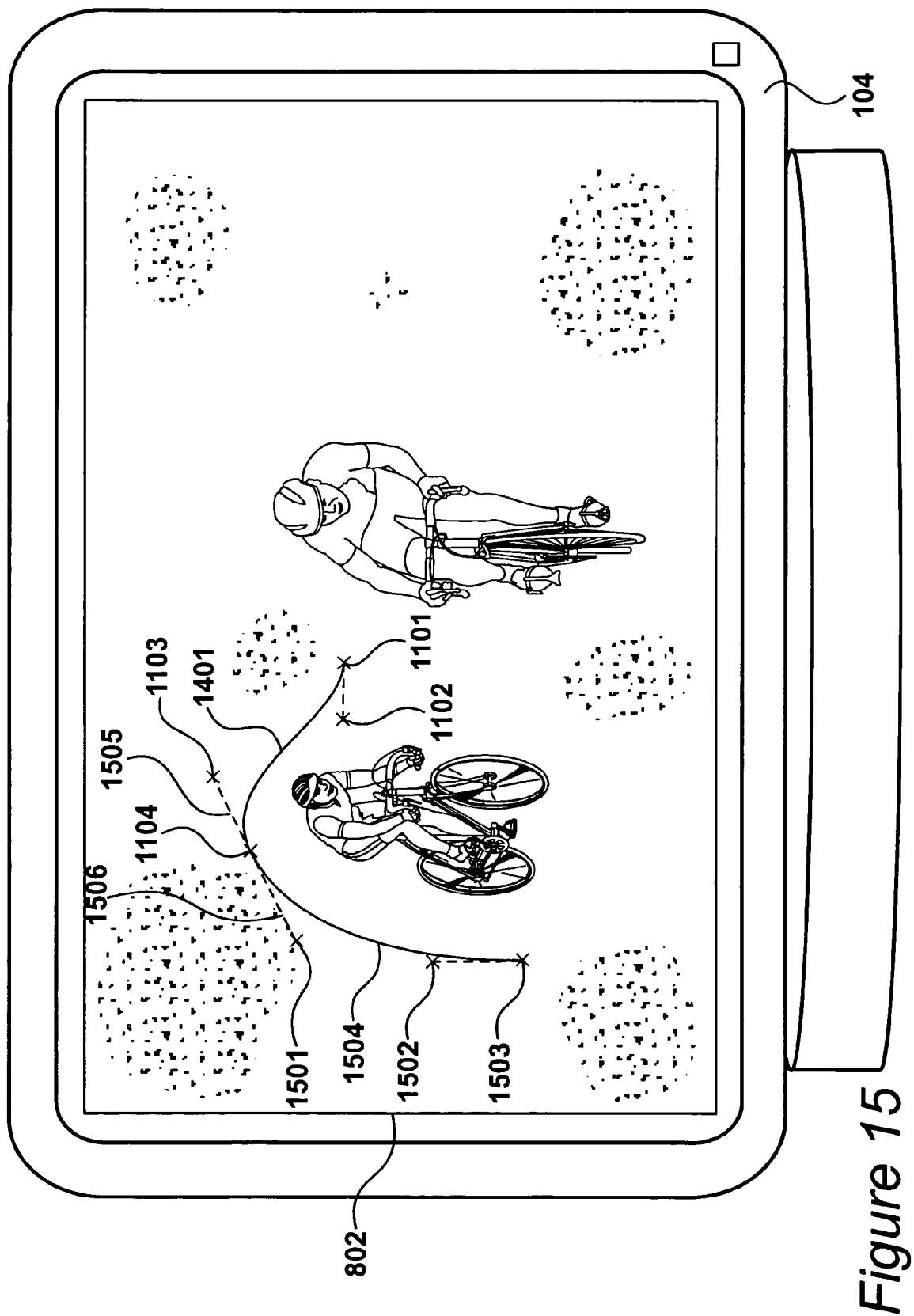
FIG. 15 shows the VDU shown in FIG. 1 on which a foreground image is displayed together with further Bézier control points.

FIG. 15 again shows VDU 104 with foreground image 802 displayed thereon. Bézier curve 1401 has been drawn and the user has decided to draw another Bézier curve by defining control points 1501, 1502 and 1503 without specifying that a freehand curve is to be drawn.

The x-y coordinates of these three points are added to main Bézier array 406 which now includes seven control points and the last four are used to define the new Bézier curve 1504, namely points 1104, 1501, 1502 and 1503. Thus the last point of one Bézier curve is always the first point of the next. This means that the number of points in main Bézier array 406 is always equal to one more than three times the number of curves it defines.

The control points in main Bézier array 406 can be split into two types, the principal control points such as points 1101, 1104 and 1503 which define the beginning and end of Bézier curves, and tangent control points such as points 1102, 1103, 1501 and 1502 which define the tangents to the Bézier curves at the principal points and thus define the Bézier curves themselves. The line joining a principal control point to the tangent point immediately preceding it is called its left tangent handle and the line joining it to the tangent point immediately succeeding it is called its right tangent handle. Thus, for example line 1505 is the left tangent handle of principal control point 1104 while line 1506 is the right tangent handle of control point 1104.

FIG. 16

Figure 16:
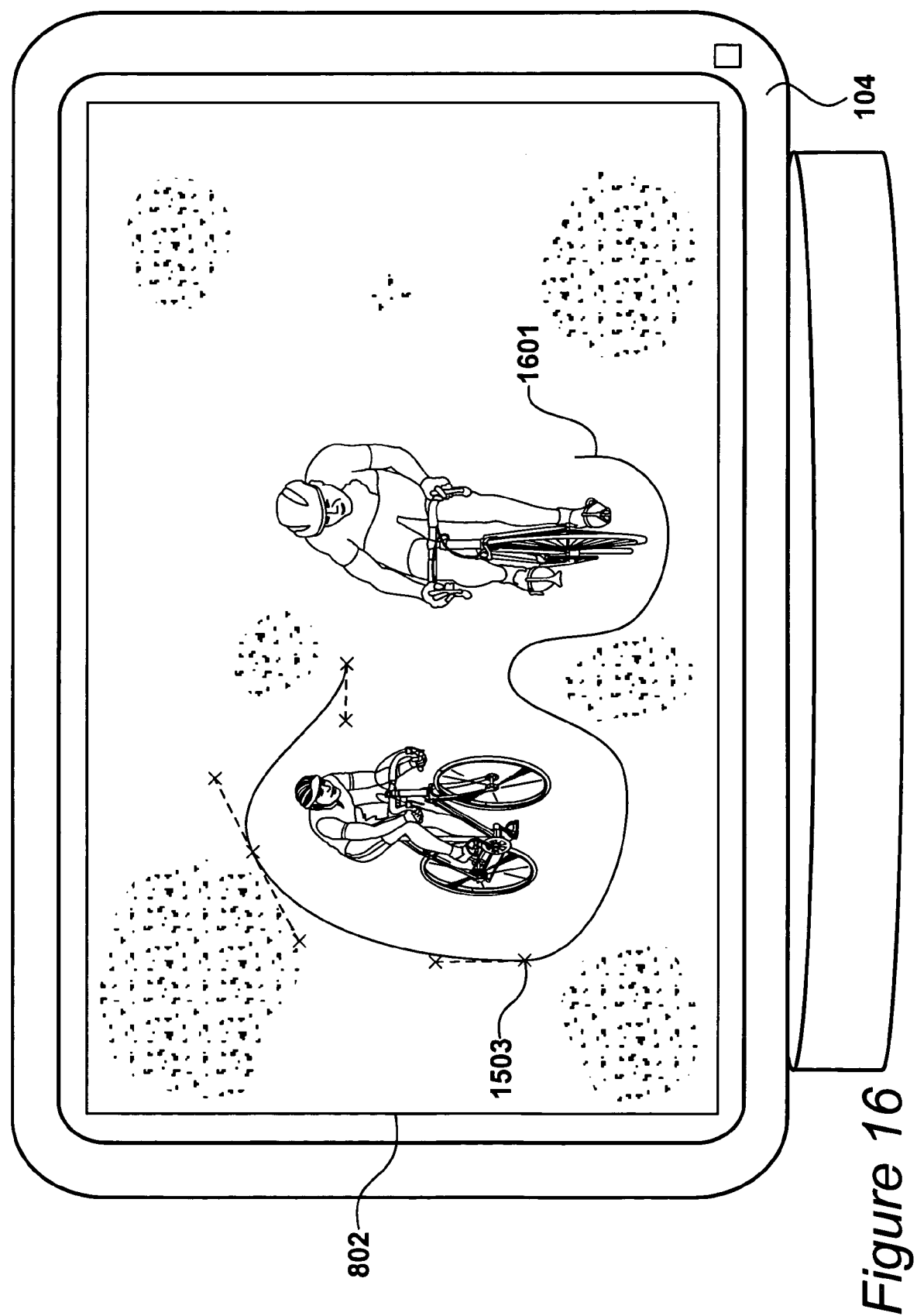
FIG. 16 shows the VDU shown in FIG. 1 on which a foreground image is displayed together with a freehand curve.

FIG. 16 shows foreground image 802 where the user has decided to draw a freehand curve. By holding down pressure on the stylus and moving it on the pad while holding down a modifying key on keyboard 102 indicating that a freehand curve is to be drawn, the user has drawn line 1601. This line is actually defined by a series of digitized points produced as output from the stylus and pad 105 that are transformed into x-y coordinates relative to image 802.

The only condition imposed upon this freehand curve is that it starts at the last point in main Bézier array 406, namely point 1503. This is to ensure that a single closed curve is drawn rather than a series of discrete curves. A series of Bézier curves making up a spline is now fitted to freehand curve 1601 and the control points defining these curves are added to main Bézier array 406.

FIG. 17

Figure 17:
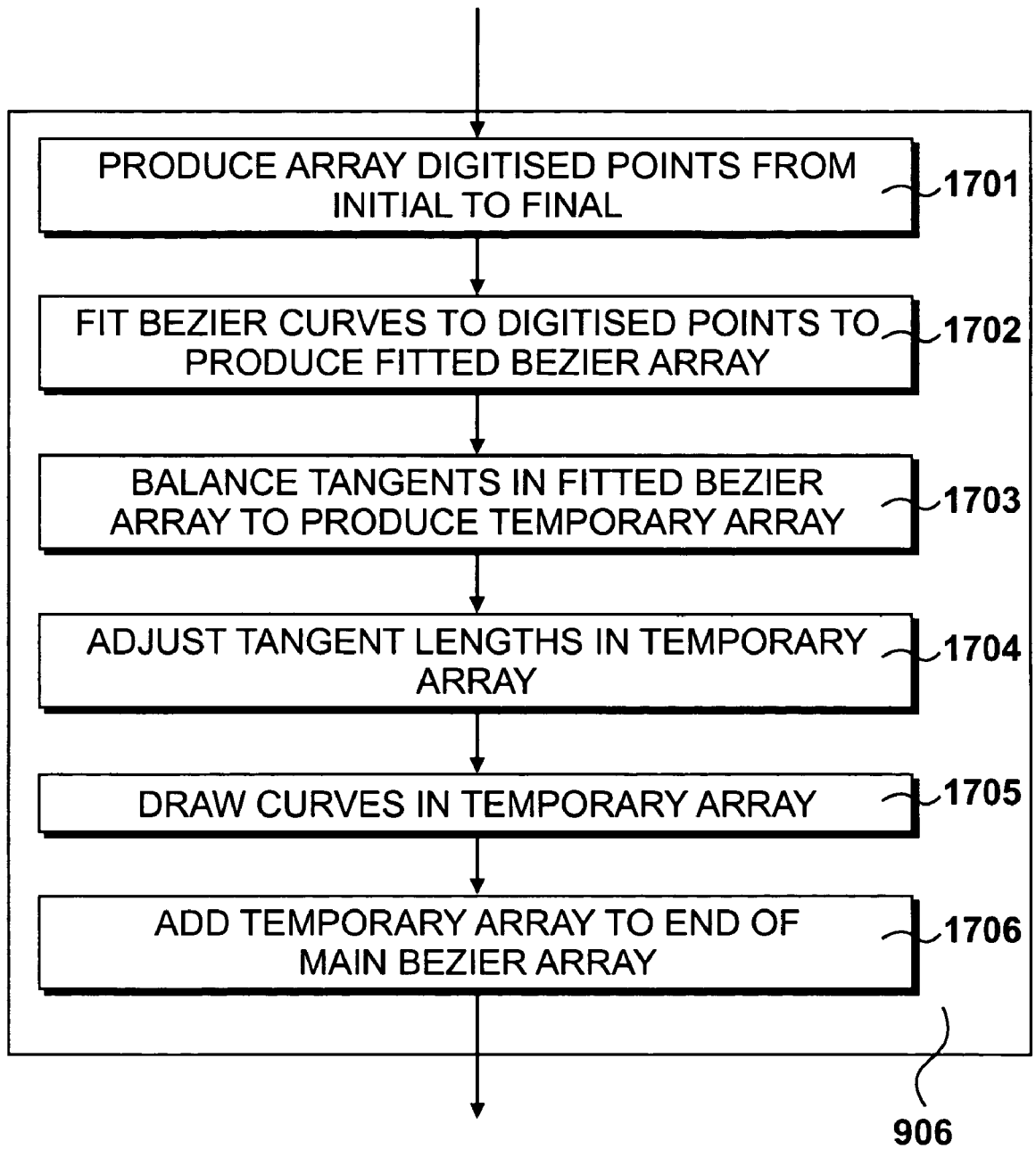
FIG. 17 details steps carried out in FIG. 9 to fit a balanced spline of Bézier curves to a freehand curve.

FIG. 17 details step 906 at which a series of Bézier curves, known as a spline, is fitted to the freehand curve 1601 drawn at step 905. At step 1701 the array of digitized points 407 is created by adding the last control point in main Bézier array 406 to the beginning of the series of digitized points received from the stylus and pad 105 and storing all the points in the array. The first point of this array is known as the initial point and the last as the final point. At step 1702, a spline of continuously-joined Bézier curves that best fits the digitized points in array 407 is created, and the control points that define it are stored in fitted Bézier array 408. This is an expandable array that stores two values per element.

The curve fitting process carried out at step 1702 often has the effects of creating extremely unbalanced tangent handles. These occur when a principal control point has a tangent handle on one side that is much smaller than the one on the other side. This can cause a problem when the user wishes to adjust the Bézier curve by moving a tangent control point as it can be difficult for the user to distinguish the tangent control point from the principal control point if the tangent handle is very small. Thus at step 1703, the tangent handles of the control points in fitted Bézier array 408 produced at step 1702 are balanced such that for any principal control point its left and right tangent handles are the same length. This procedure involves moving both the principal and the tangent control points such that the resulting spline is a selection of different Bézier curves from those stored in fitted Bézier array 408. The set of control points making up this new spline is stored in balanced Bézier array 409 and at step 1704 the lengths of the new tangent handles are adjusted such that the new spline defined by the control points in the balanced Bézier array 409 is as close as possible to the original fitted spline as defined by the control points in fitted Bézier array 408.

At step 1705, the Bézier curve defined by the control points in balanced Bézier array 409 are drawn on VDU 104 and at step 1706, the control points in balanced Bézier array 409 are added to the end of main Bézier array 406. Thus at the end of step 906, main Bézier array 406 contains control points not only for Bézier curves defined by the user but also for the Bézier curves that have been fitted to any freehand curve that has been drawn by the user.

FIG. 18

Figure 18:
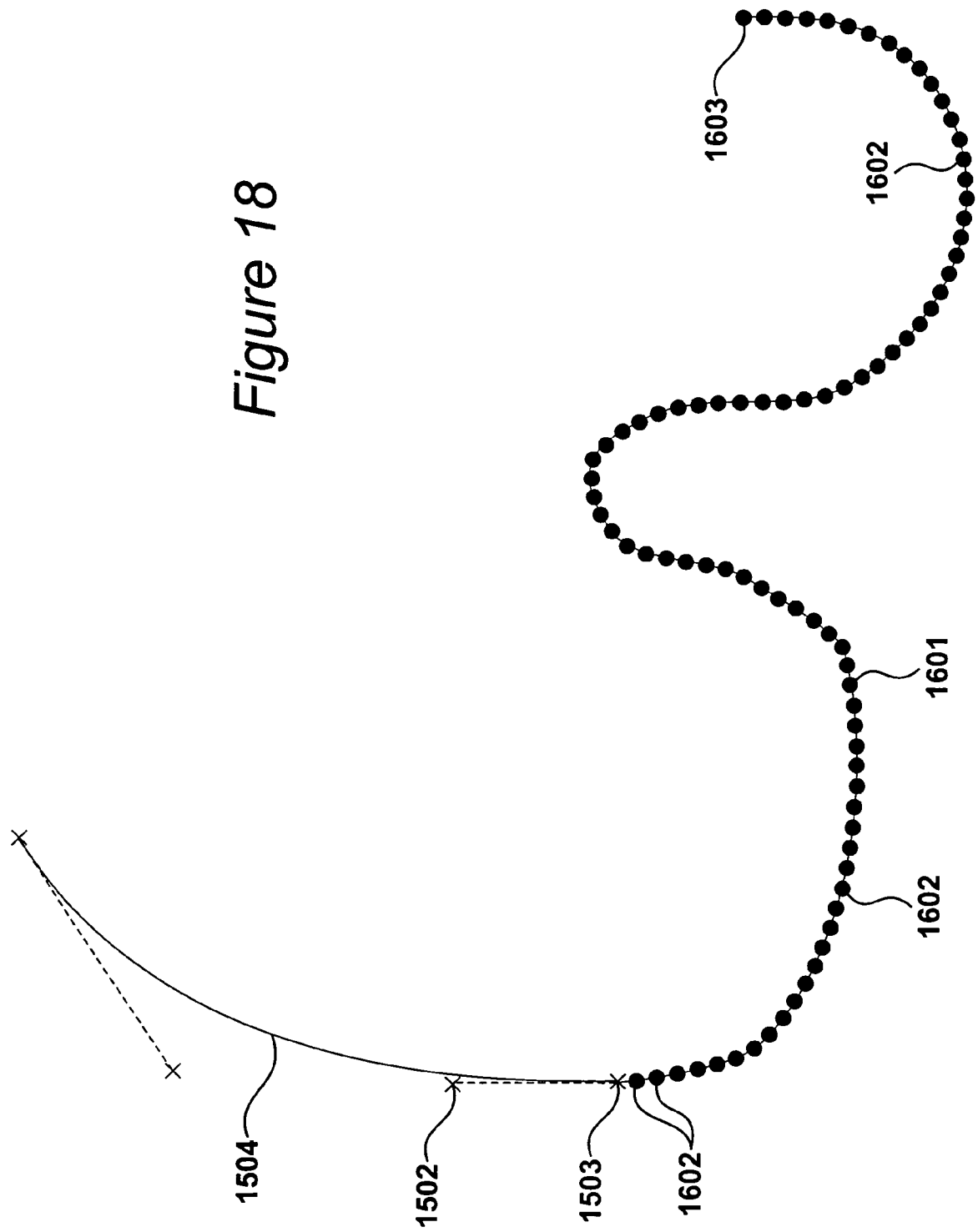
FIG. 18 shows an example of a plurality of digitized points making up a freehand curve.

FIG. 18 shows lines drawn by the user as shown in FIG. 16. It comprises the second Bézier curve 1504 and the freehand curve 1601. Line 1601 is actually made up of a series of discrete digitized points 1602 stored in array 407, as described above with reference to FIG. 17. The array includes control point 1503 since the freehand curve is constrained to start from the end point of any previous curve. The final point is shown at 1603.

FIG. 19

Figure 19:
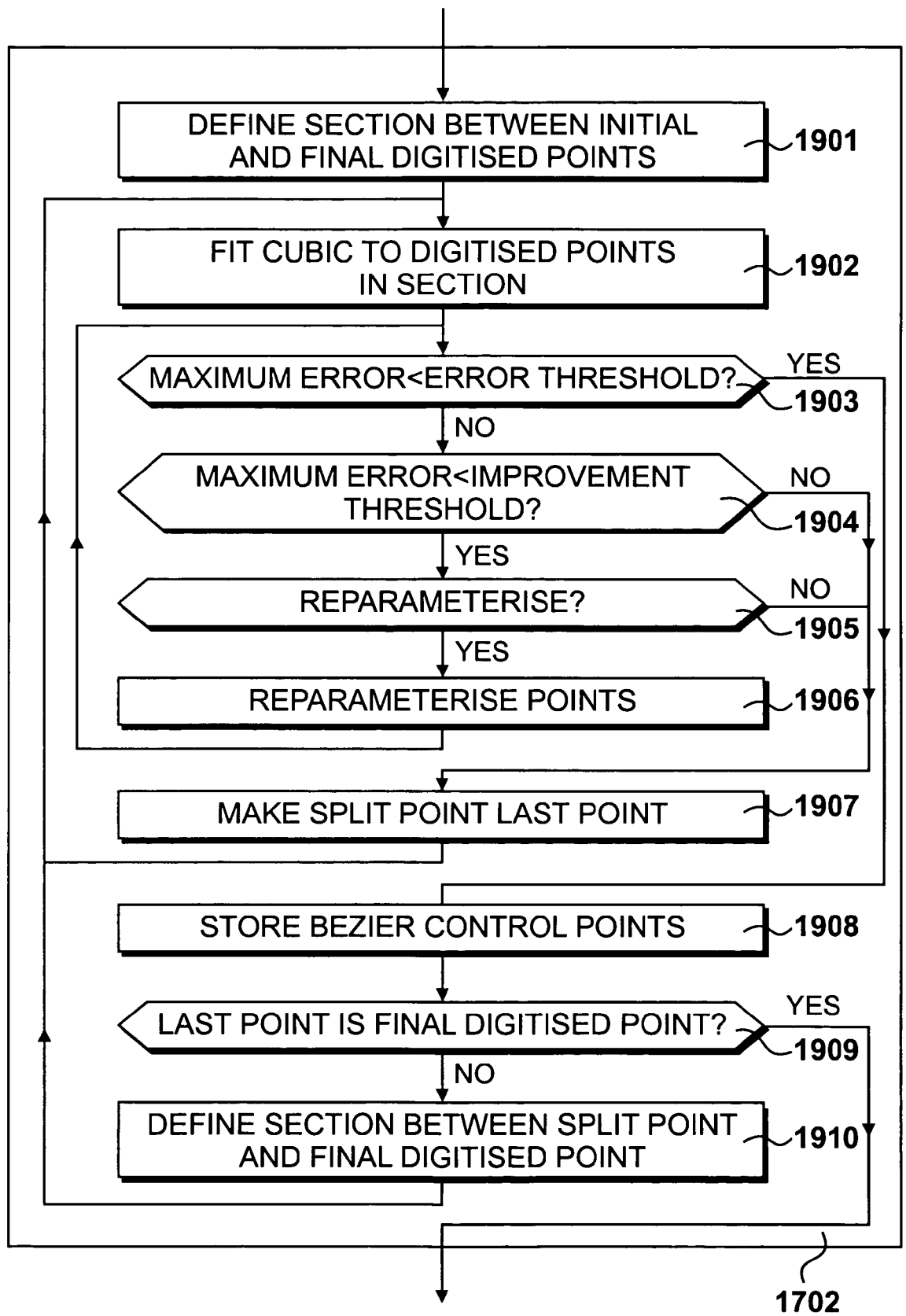
FIG. 19 details steps carried out in FIG. 17 to fit a spline of Bézier curves to an array of digitized points making up a freehand curve.

FIG. 19 details step 1702 at which a number of Bézier curves are fitted to the array 407 of digitized points 1602 produced at step 1701.

The curve-fitting process requires a section of digitized points 1602 to be defined by specifying a first and a last digitized point, and thus at step 1901, the first section to be fitted is defined by setting the first point of the section to be the initial digitized point (1503 in this example) and the last point of the section to be the final digitized point 1603. At step 1902, a cubic Bézier curve is found that best fits the specified section of digitized points.

At step 1903, a question is asked as to whether the maximum error of the fitted curve, that is to say the largest of the distances between each of the digitized points 1602 and their corresponding points on the fitted curve, is smaller than an error threshold. If this question is answered in the negative, then at step 1904 a second question is asked as to whether it is less than an improvement threshold which is greater than the error threshold. If this question is answered in the affirmative, then re-parameterization of the digitized points in the section under consideration may be usefully carried out. However, the re-parameterization is only carried out four times. Accordingly, at step 1905, a question is asked as to whether it should be carried out. On the first four occurrences of this question it will be answered in the affirmative, after which the points are re-parameterized at step 1906 and control is returned to step 1903 to examine whether the new maximum error is less than the error threshold. However, on the fifth iteration of step 1905 it will be answered in the negative.

At this point, and if the question asked at step 1904 is answered in the negative, to the effect that the maximum error is not below the improvement threshold, then at step 1907 the section of digitized points to be fitted is defined by setting the split point, which is the digitized point at which the maximum error occurs, to be the last point. The first point does not change. Control is then returned to step 1902, and a new attempt is made to fit a cubic Bézier curve to the section of digitized points between the first point and the new last point.

Steps 1902 to 1907 are repeated until the question asked at step 1903 is answered in the affirmative, to the effect that the maximum error of the Bézier curve just fitted is below the error threshold. In this case control is directed to step 1908, and the control points of the Bézier curve just fitted are stored in fitted Bézier array 408.

At step 1909, a question is asked as to whether the digitized point that is currently set to be the last point is actually the final point. If this question is answered in the negative then at step 1910 a new section of digitized points is defined. The point that is currently the last point, and is thus the last point of the section of points that has been successfully fitted, is made into the first point and the final digitized point is set to be the last point. Thus, the section of digitized points to be fitted is the entire array minus one or more sections at the beginning that have been successfully fitted. Control is then returned to step 1902, and a new Bézier curve is fitted to the specified section.

These iterations continue until the question asked at step 1909 is answered in the affirmative, to the effect that the last point of the Bézier curve just successfully fitted is actually the final digitized point, in which case step 1702 is concluded since the entire array 407 of digitized points 1602 has been fitted with a spline of Bézier curves.

Thus step 1702 consists of attempting to fit a Bézier curve to all the digitized points and finding the point at which the curve is most different from the digitized points, called a split point, because the Bézier curve is effectively split at that point. The next attempted Bézier curve is fitted to only the points to the left of the split point and then a new split point is found. This continues until a Bézier curve is found which fits, within the specified error, a first section of the freehand curve from the initial point up to the last-defined split point. At this point that part of the curve is considered to be fitted and is subsequently ignored as the process starts again to attempt to fit a Bézier curve to the rest of the digitized points.

FIG. 20

The process carried out at 1902 which fits a Bézier curve to a section of points requires as input a first point, a last point, a left tangent and a right tangent. The first and last points are the principal control points of the Bézier curve that will be fitted to the section of digitized points. The left and right tangents are directions, expressed as unity vectors, from the first and last control points respectively, along which the tangent control points will lie. How far along those directions they should lie is the subject of the curve fitting process.

Figure 20:
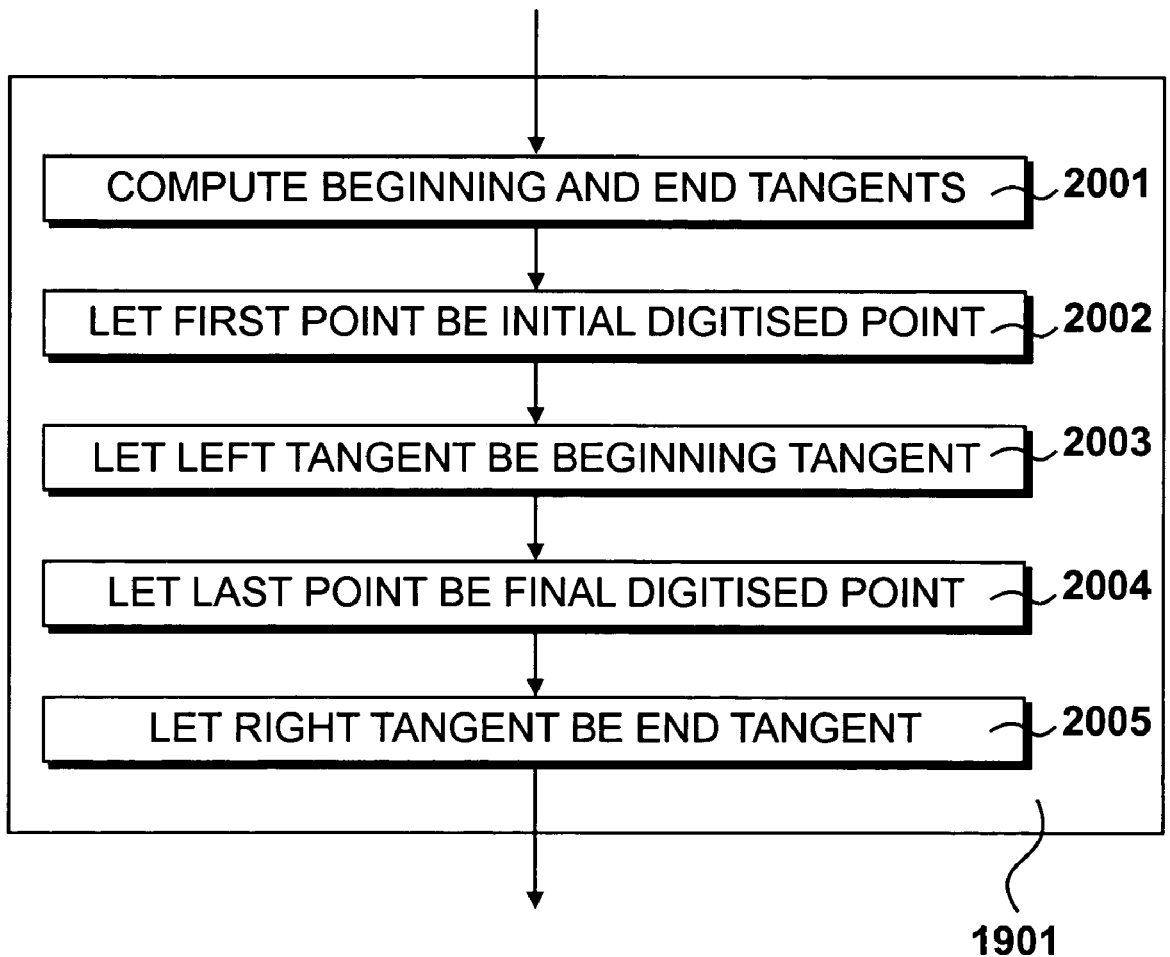
FIG. 20 details steps carried out in FIG. 19 to identify a first section of digitized points to be fitted.

Thus, at step 1901 the first section to be fitted is defined as the entire array 407 of digitized points 1602. This step is detailed in FIG. 20. At step 2001 the beginning and end tangents are computed. These are approximations of the tangents to the freehand curve at the initial and final points. At step 2002 the first point is set to be the initial digitized point and at step 2003 the left tangent is set to be the beginning tangent. Similarly at step 2004 the last point is set to be the final digitized point and at step 2005, the right tangent is set to be the end tangent.

FIG. 21

Figure 21:
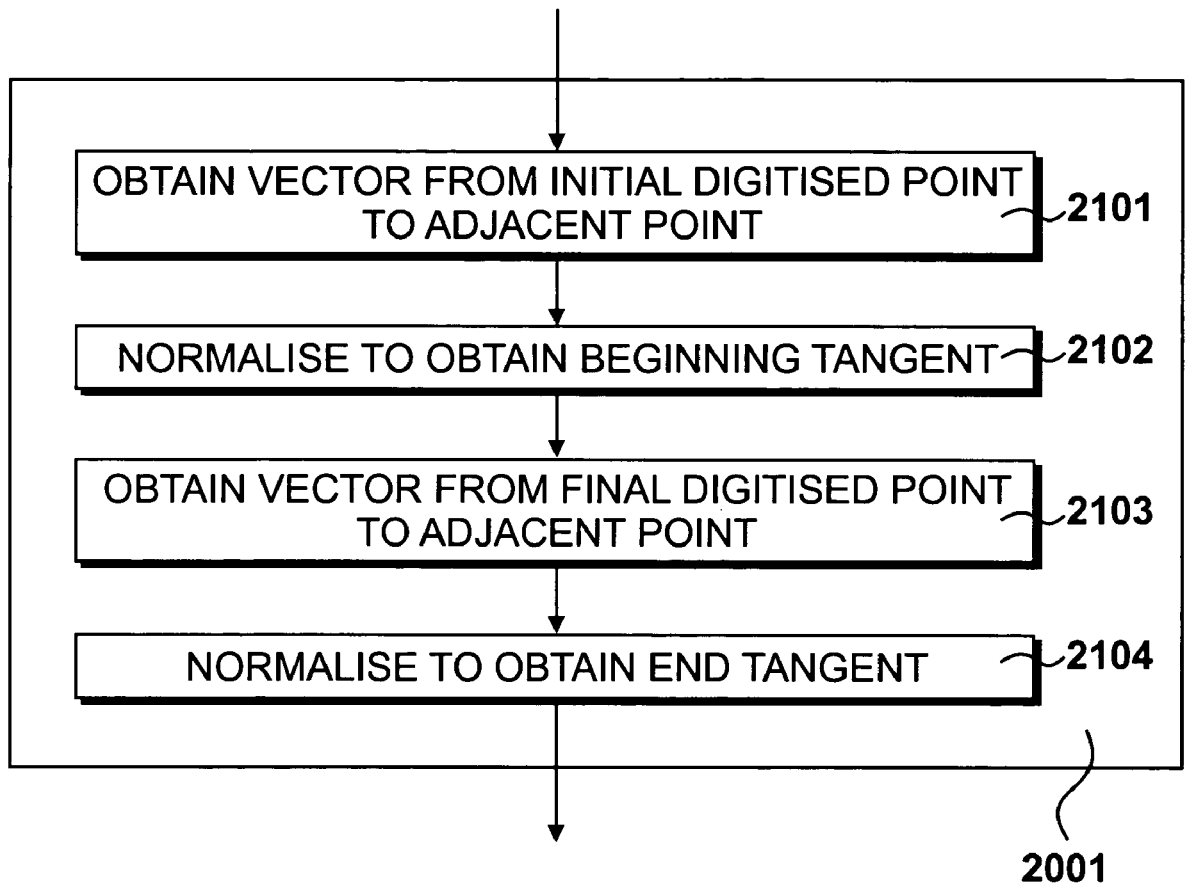
FIG. 21 details steps carried out in FIG. 20 to compute beginning and end tangents.

FIG. 21 details step 2001 at which the beginning and end tangents are computed. At step 2101, the vector from the initial digitized point to the digitized point immediately adjacent is obtained and at step 2102 the vector is normalized such that its length is unity. This normalized vector is the beginning tangent. Similarly, at step 2103 the vector from the final digitized point to the point immediately adjacent to it is obtained, and at step 2104, this vector is normalized to give the end tangent.

FIG. 22

Figure 22:
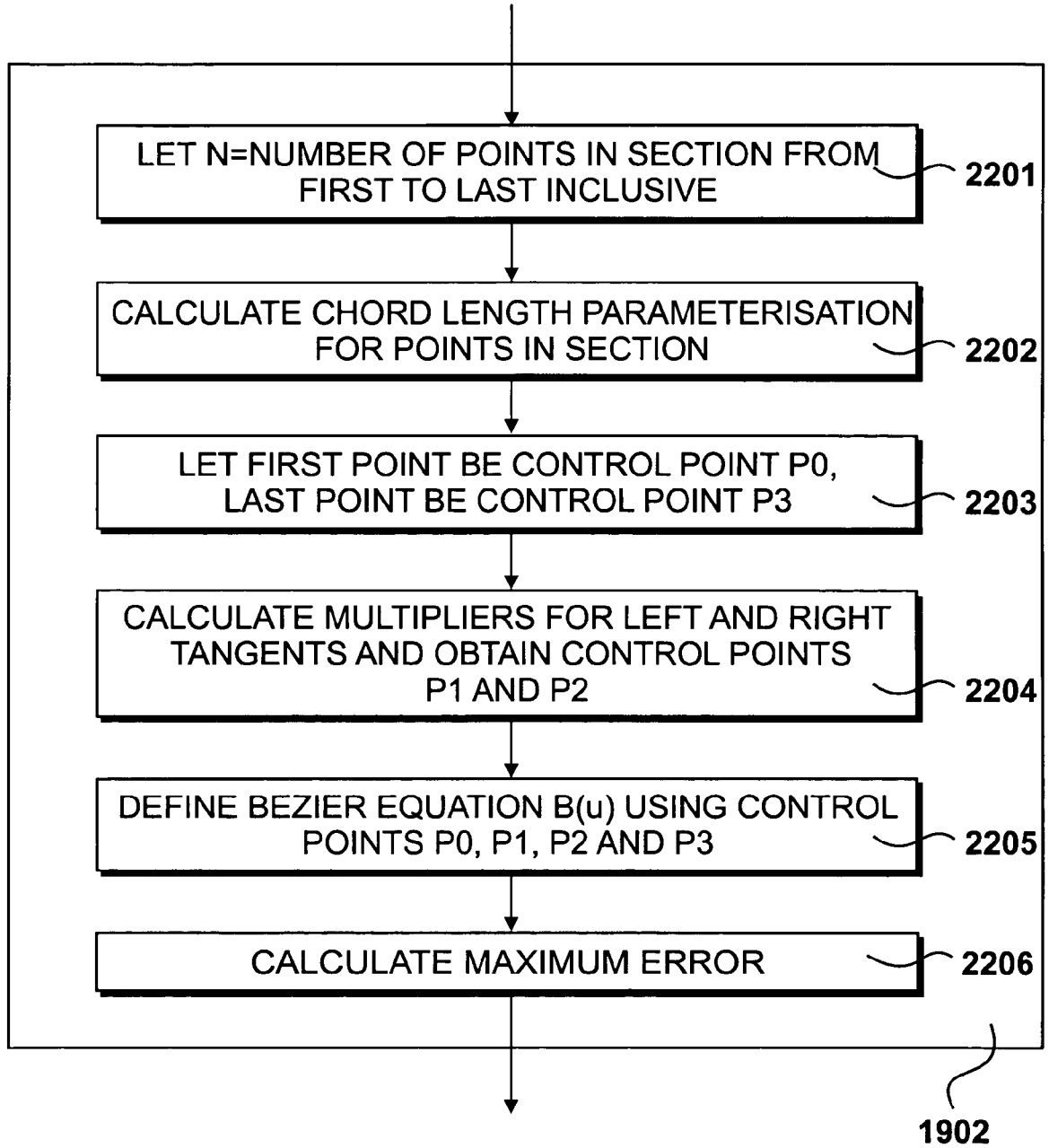
FIG. 22 details steps carried out in FIG. 19 to fit a cubic Bézier curve to the identified section of digitized points.

FIG. 22 details step 1902 at which a cubic is fitted to the section of digitized points defined by the first and last points. On the first iteration, these are the initial and final points but on subsequent iterations they will be different.

At step 2201, a variable N is set to be the number of points in the section, from the first to the last inclusive. At step 2202, a chord length parameterization is obtained for all the points in the section. This parameterization assigns the first digitized point a parameter of zero, and the last digitized point a parameter of one. The points in between are assigned parameters that are proportional to their distance along the section of the freehand curve from the first point.

At step 2203, the first point in the section is assigned to be principal control point P0 and the last point is assigned to be principal control point P3. At step 2204, multipliers are calculated for the left and right tangents to obtain the tangent control points P1 and P2. At step 2205, a Bézier equation is then defined using these control points in exactly the same way as at step 1004 detailed in FIG. 12. At step 2206, the maximum error between this curve and the section of digitized points is calculated in order that it may be tested at steps 1903 and 1904 against the error threshold and improvement threshold.

FIG. 23

Figure 23:
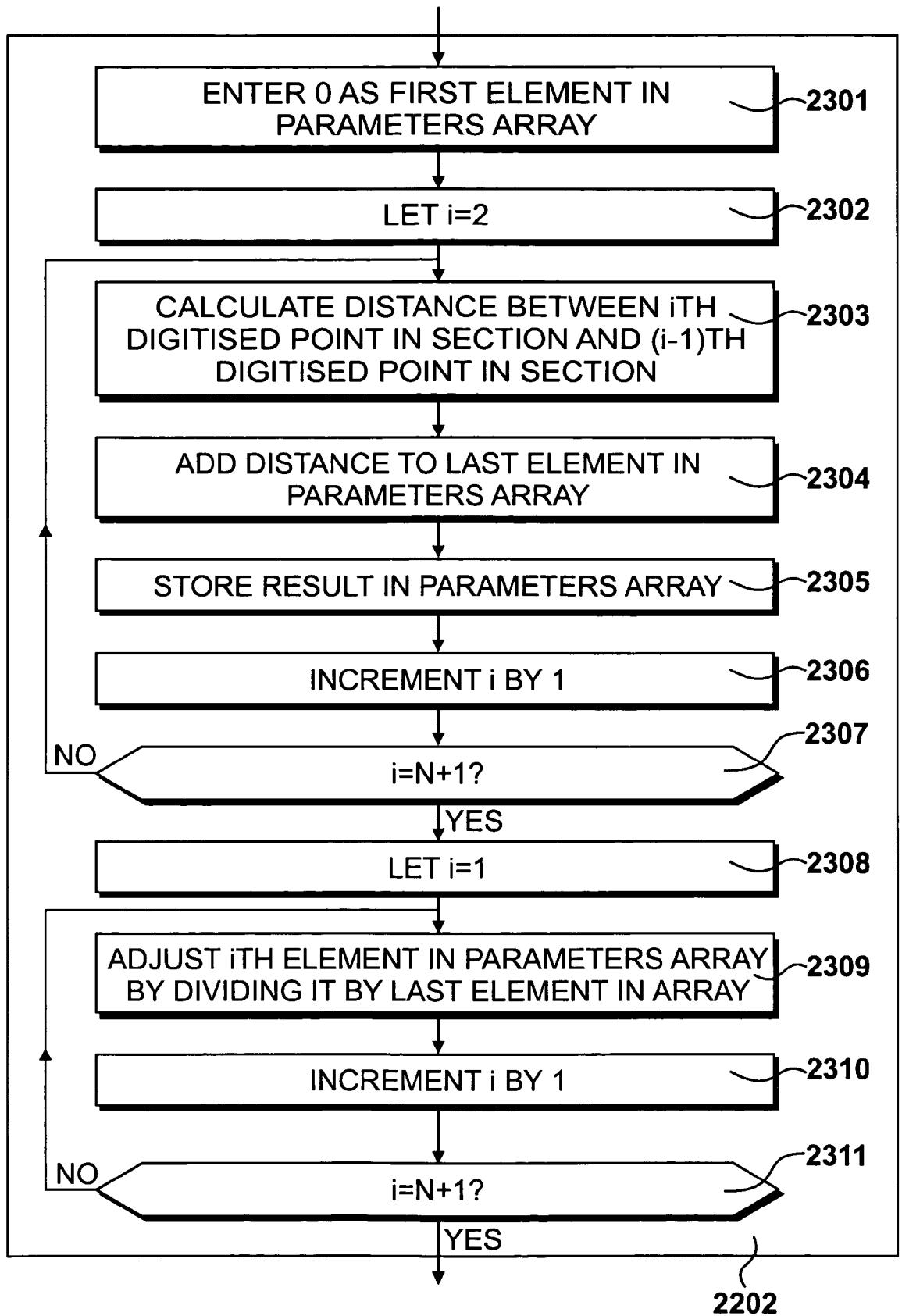
FIG. 23 details steps carried out in FIG. 22 to calculate a chord length parameterization.

FIG. 23 details step 2202 at which the chord length parameterization is calculated for the section of points defined by the first and last points. This step results in parameters array 410 containing N elements and is used as a parameterization for the fitted Bézier curve. Parameters array 410 is an expandable array that stores a single value per element.

Referring back to FIG. 13, when a Bézier curve is drawn a uniform parameterization is used, which in this example is a step size of 0.05. However, when fitting digitized points, the points themselves should be used to obtain the parameterization such that when the freehand curve is compared with the fitted Bézier curve, like can be compared with like by comparing corresponding points. A good initial parameterization is chord length parameterization, which depends on the actual distances between the digitized points. However, this parameterization is only used to obtain the tangent control points, and when the final fitted Bézier curves are actually drawn on screen a uniform parameterization is used.

Thus, at step 2301, the value zero is entered as the first element in parameters array 410, since the first parameter of a Bézier curve must be zero. At step 2302, an iterator i is set to be 2, and at step 2303, the distance is calculated between the $i^{th}$ digitized point in the section and the $(i-1)^{th}$ digitized point in the section. On the first iteration, this will be the distance between the first point and the second point.

At step 2304, this distance is added to the value of the last element in the parameters array, which on the first iteration is actually the first element, zero, and at step 2305, the result of step 2304 is stored by adding it to the end of the parameters array 410. At step 2306, the iterator i is incremented by one and at step 2307, a question is asked as to whether i is now equal to N plus one. If this question is answered in the negative, then control is returned to step 2303, and the distance between the next two digitized points is calculated.

If the question asked at step 2307 is answered in the affirmative, then the parameters array 410 has been created and consists of N values, the first being zero and the last being the length of the freehand curve as defined by the section of digitized points being examined. Thus, at step

2308 the iterator i is reset to be one and at step 2309 the i$^{th}$ element in the parameter's array is adjusted by dividing it by the last element in the array. At step 2310, i is incremented by one and at step 2311, a question is asked as to whether i is equal to N plus 1. If this question is answered in the negative, then control is returned to step 2309 and the next element is adjusted. On the last iteration, the last element will be divided by itself to give a parameter of one and the question asked at step 2311 will be answered in the affirmative. The parameters array 410 is now populated with a number of parameters that is the same as the number of digitized points in the section and whose elements are proportional to the distances between each of the digitized points.

FIG. 24

FIG. 24 details the mathematics behind the curve fitting process used. Given a set of digitized points, of which the first and last are considered to be principal control points P0 and P3, a left and a right tangent, both of which have unity length, and a parameterization of the points, solving equation 2401 gives two multipliers 2406. These multipliers 2406 are used to scale the left and right tangents respectively to obtain control points P1 and P2. The Bézier curve defined by the control points P0, P1, P2 and P3 will then be the curve that best approximates the digitized points, where a best fit is defined as minimizing the sum of the squares of the errors at each digitized point.

FIG. 25

Figure 25:
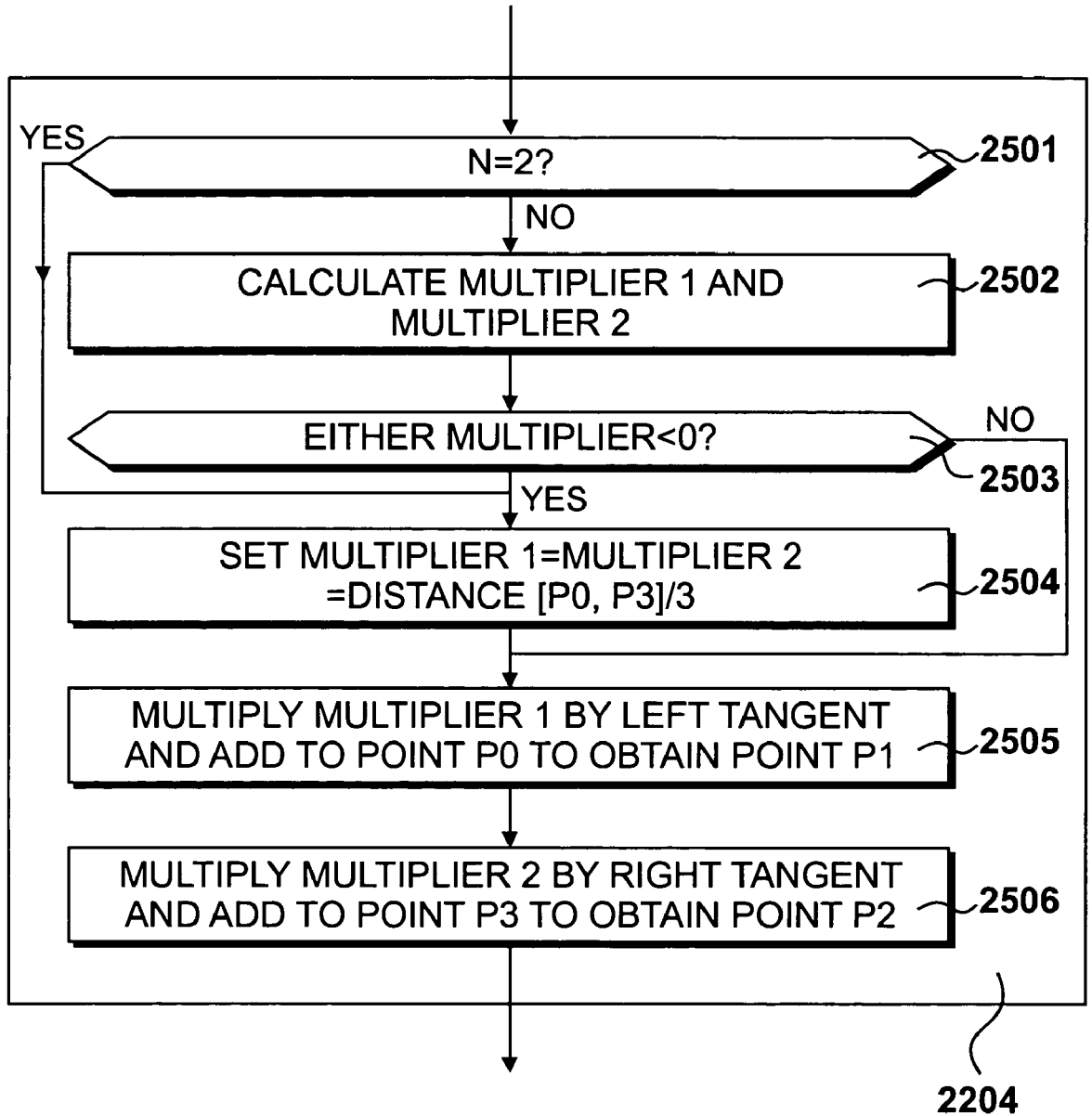
FIG. 25 details steps carried out in FIG. 22 to obtain tangent control points.

FIG. 25 details step 2204 at which the multipliers are calculated in order to obtain the two tangent control points. At step 2501, a question is asked as to whether N, the number of digitized points in the section under examination, is equal to two. If this question is answered in the negative, then multiplier one and multiplier two are calculated at step 2502, and at step 2503, a question is asked as to whether either of them is negative. If this question is answered in the affirmative, or if the question asked at step 2501 is answered in the affirmative, then the multipliers obtained would not give the best fitting curve. In these cases, a compromise is obtained by setting each multiplier to be a third of the distance between the first and last digitized points at step 2504.

Once the multipliers have been obtained, the first multiplier is multiplied by the left tangent and added to principal control point P0, the first digitized point, to obtain tangent control point P1 at step 2505. Similarly, at step 2506, multiplier two is used to scale the right tangent which is added to principal control point P3, the last digitized point in the section, to obtain tangent control point P2.

FIG. 26

Figure 26:
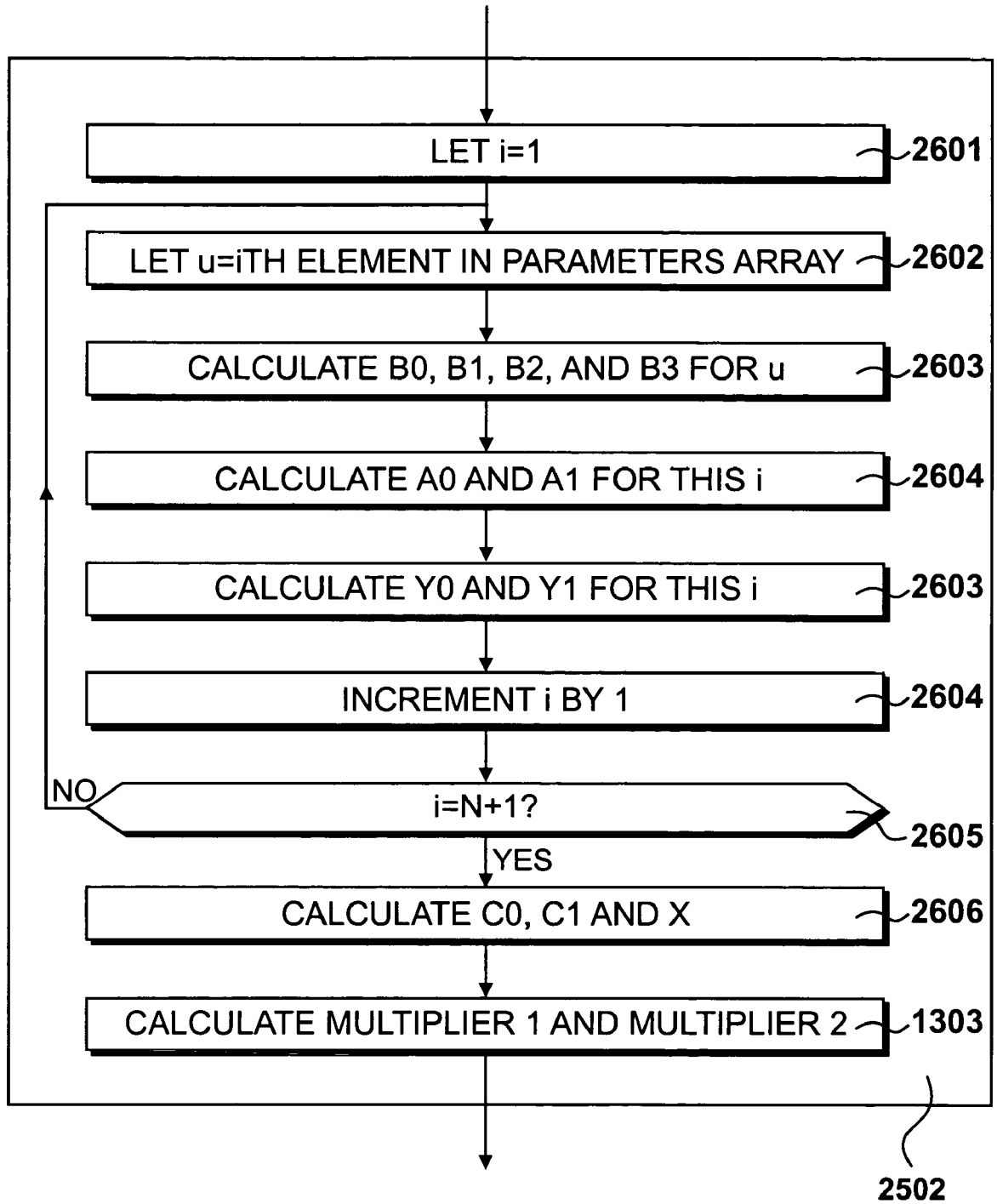
FIG. 26 details steps carried out in FIG. 25 to calculate multipliers.

FIG. 26 details step 2502 at which the multipliers are calculated. At step 2601 an iterator i is set to be one, and at step 2602, the parameter u is set to be the i$^{th}$ element in parameters array 410 as obtained at step 2202. Referring back to FIG. 24 for the equations, at step 2603 Bernstein factors B0, B1, B2 and B3 are calculated for this value of u as shown by equations 2402. At step 2604 vectors A0 and A1 are calculated for this value of i, as shown by equations 2403. At step 2605, vectors Y0 and Y1 are calculated for this value of i, as shown by equations 2404, wherein for any value of i "d" is equal to the x-y coordinates of the i$^{th}$ digitized point in the section under examination. At step 2606, i is incremented by one and at step 2607, a question is asked as to whether i is now equal to N plus one. If this question is answered in the negative, then control is returned to step 2602 and all the variables are calculated for the next value of i.

If it is answered in the affirmative, then they have been calculated for all of the elements in parameters array 410 and at step 2608 matrices C0, C1 and X are calculated by summing the variables as shown by equations 2405. At step 2609, the multipliers are then calculated as shown by equations 2406.

FIG. 27

Figure 27:
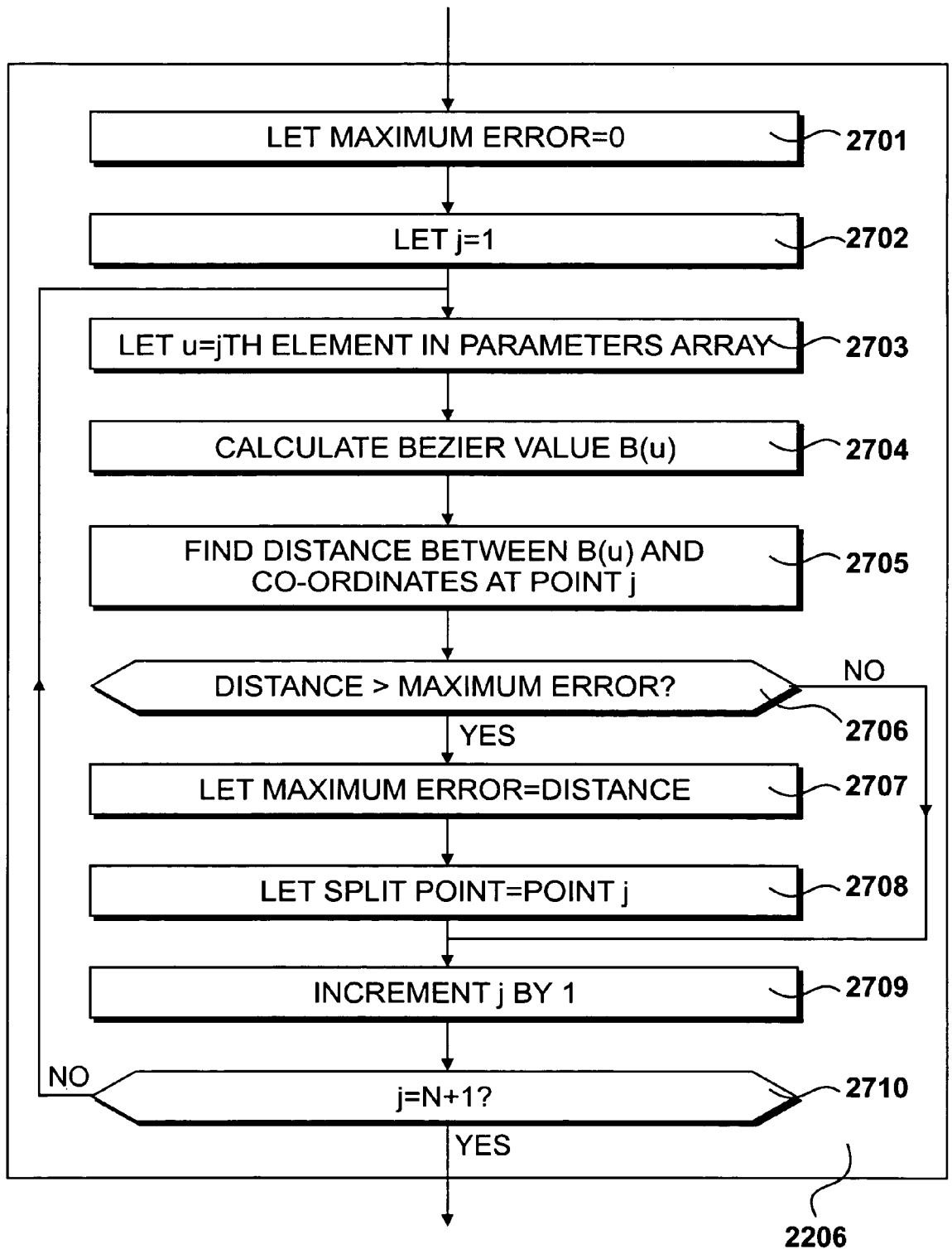
FIG. 27 details steps carried out in FIG. 22 to calculate the maximum error between the digitized points in the section and the fitted Bézier curve.

FIG. 27 details step 2206 at which the maximum error between the digitized points in the section and the fitted Bézier curve is calculated. At step 2701, the value of the maximum error is set to be zero and at step 2702 an iterator j is set to be one. At step 2703, a parameter u is set to be the j$^{th}$ element in parameters array 410.

At step 2704, this parameter is input into the Bézier equation defined at step 2205 and at step 2705 the distance between this Bézier value and the x-y coordinates of the j$^{th}$ digitized point in the section under consideration is obtained. At step 2706, a question is asked as to whether this distance is greater than the current maximum error. If this is answered in the affirmative, at step 2707, the maximum error is set to be the distance obtained at step 2705 and at step 2708, the split point is defined to be the digitized point currently under consideration.

At this point, and if the question asked at 2706 is answered in the negative, the iterator j is incremented by one at step 2709. At step 2710, a question is asked as to whether j is now equal to N plus one, and if this question is answered in the negative, then control is returned to step 2703 and the distance between the curve and the next digitized point in the section is calculated. If it is answered in the affirmative then all of the digitized points in the section have been considered and the maximum error has been found, and the point at which this maximum error occurs has been set to be the split point.

FIG. 28

Figure 28:
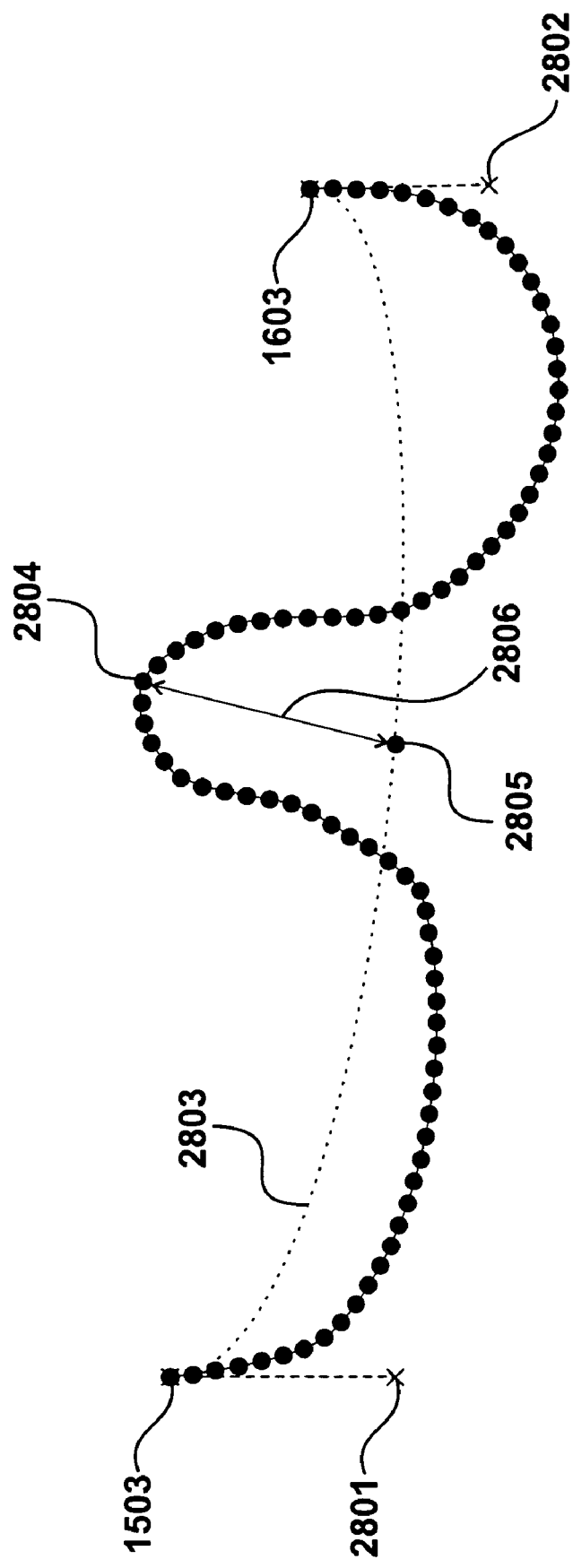
FIG. 28 shows a first example of a curve fitted to a freehand curve.

FIG. 28 shows an example of a curve fitted during the first iteration of step 1902, when the section of points to be fitted is the entire array. The curve is fitted to the example array of points shown in FIG. 18. The curve has principal control points at points 1503 and 1603 and is determined by tangent control points 2801 and 2802 that were determined at step 2204. The curve is shown at 2803 and the maximum error is between digitized point 2804 and its corresponding point 2805 on curve 2803. The magnitude of the error is shown by arrow 2806. Thus digitized point 2804 is set to be the split point and the next curve to be fitted is fitted to the digitized points from point 1503 to 2804 inclusive.

FIG. 29

Figure 29:
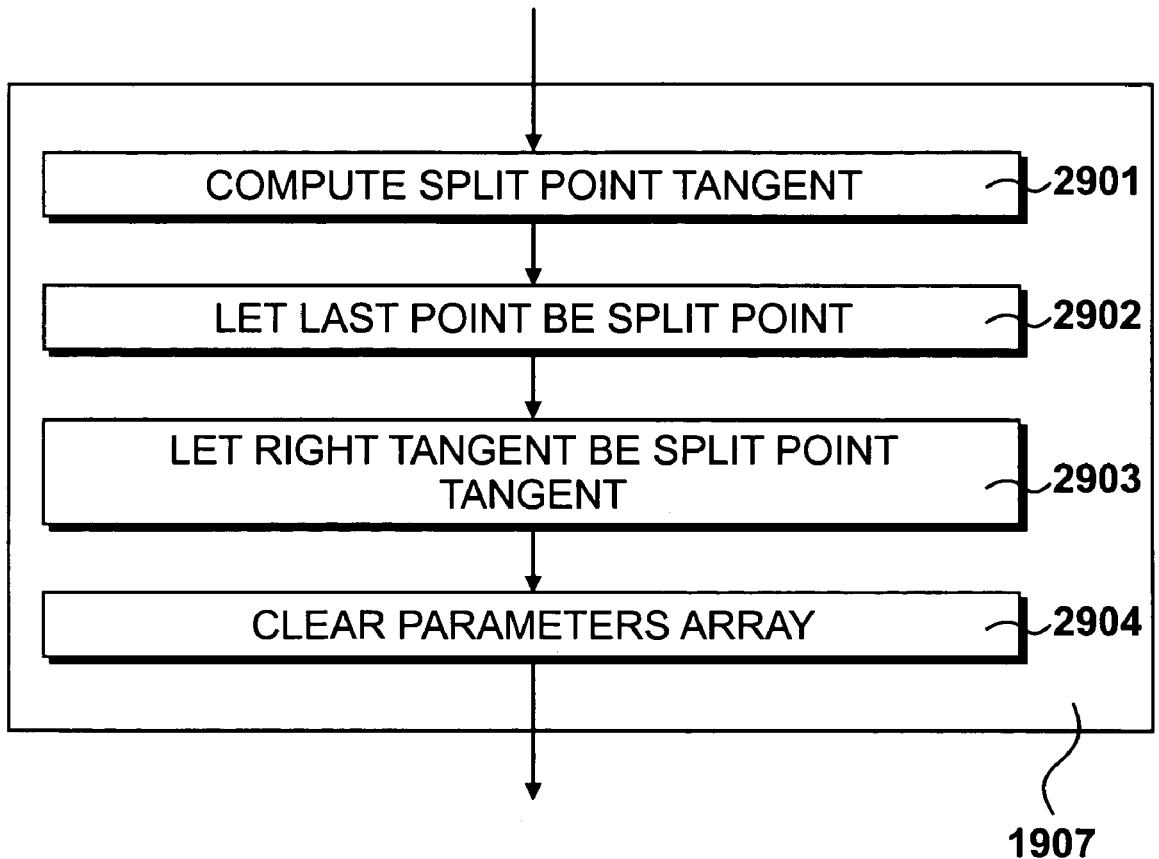
FIG. 29 details steps carried out in FIG. 19 at which the section of digitized points to which a curve is to be fitted is redefined.

FIG. 29 details step 1907 at which the split point is made into the last point of the section such that the next fitted curve is fitted to only those digitized points to the left of the split point. At step 2901, the tangent to the freehand curve at the split point is approximated. The last point is then set to be the split point at step 2902, and the right tangent is set to be the split point tangent at step 2903. Thus, when control is returned to step 1902, the input to the curve-fitting process will be point 1503, point 2804, the unity tangent at point 1503 and the unity tangent at point 2804.

At step 2904, parameters array 410 is cleared so that it is free for use during the next iteration of step 1902.

FIG. 30

Figure 30:
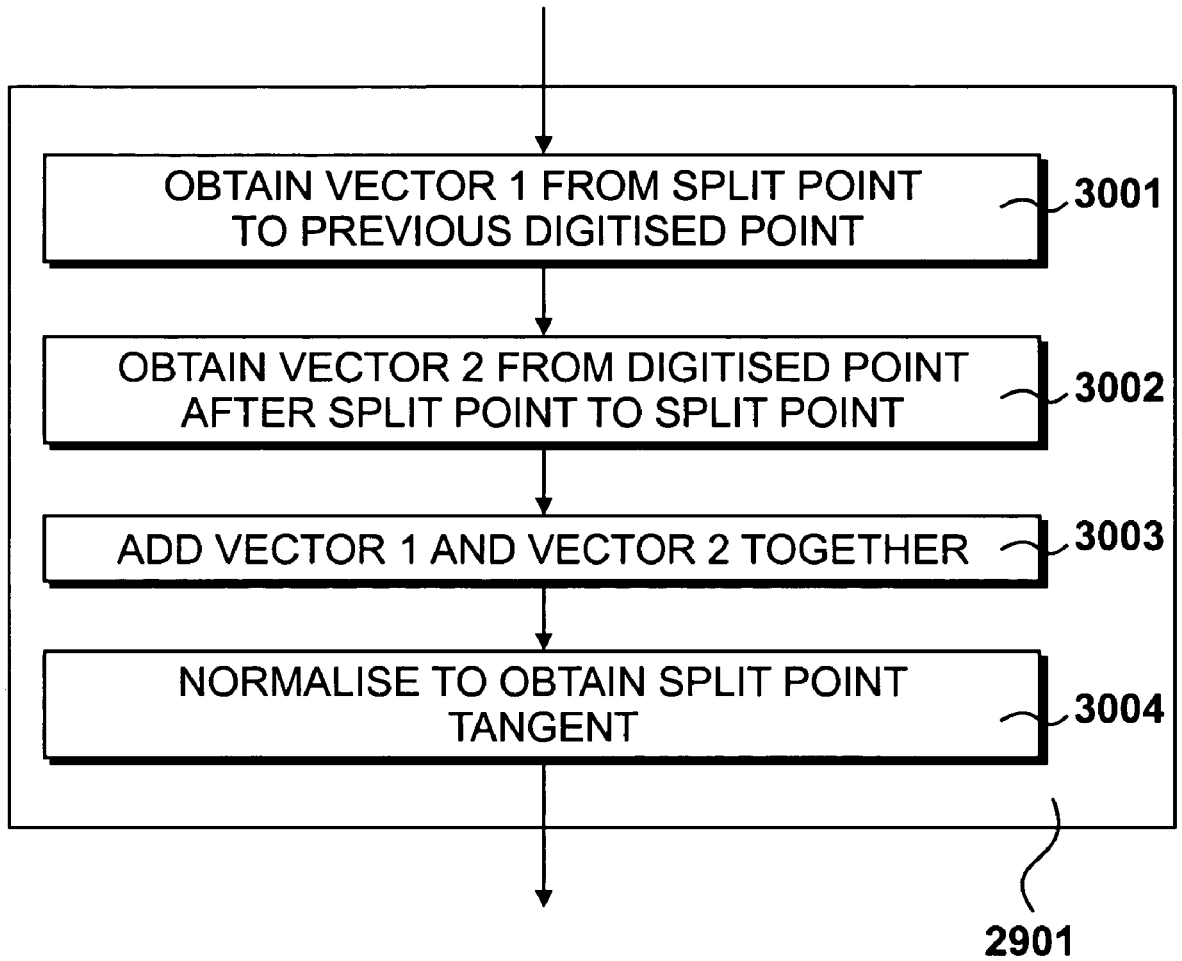
FIG. 30 details steps carried out in FIG. 29 to calculate a tangent.

FIG. 30 details step 2901 at which the tangent at the split point is computed. At step 3001, the vector from the split point to the digitized point preceding it is obtained, and at step 3002, the vector from the digitized point succeeding the split point to the split point is obtained. At step 3003, the two vectors are added together and at step 3004, the result is normalized to obtain the split point tangent. Thus, the approximation to the tangent on the freehand curve at the split point is parallel to the line that passes through the points immediately preceding and succeeding the split point.

FIG. 31

Figure 31:
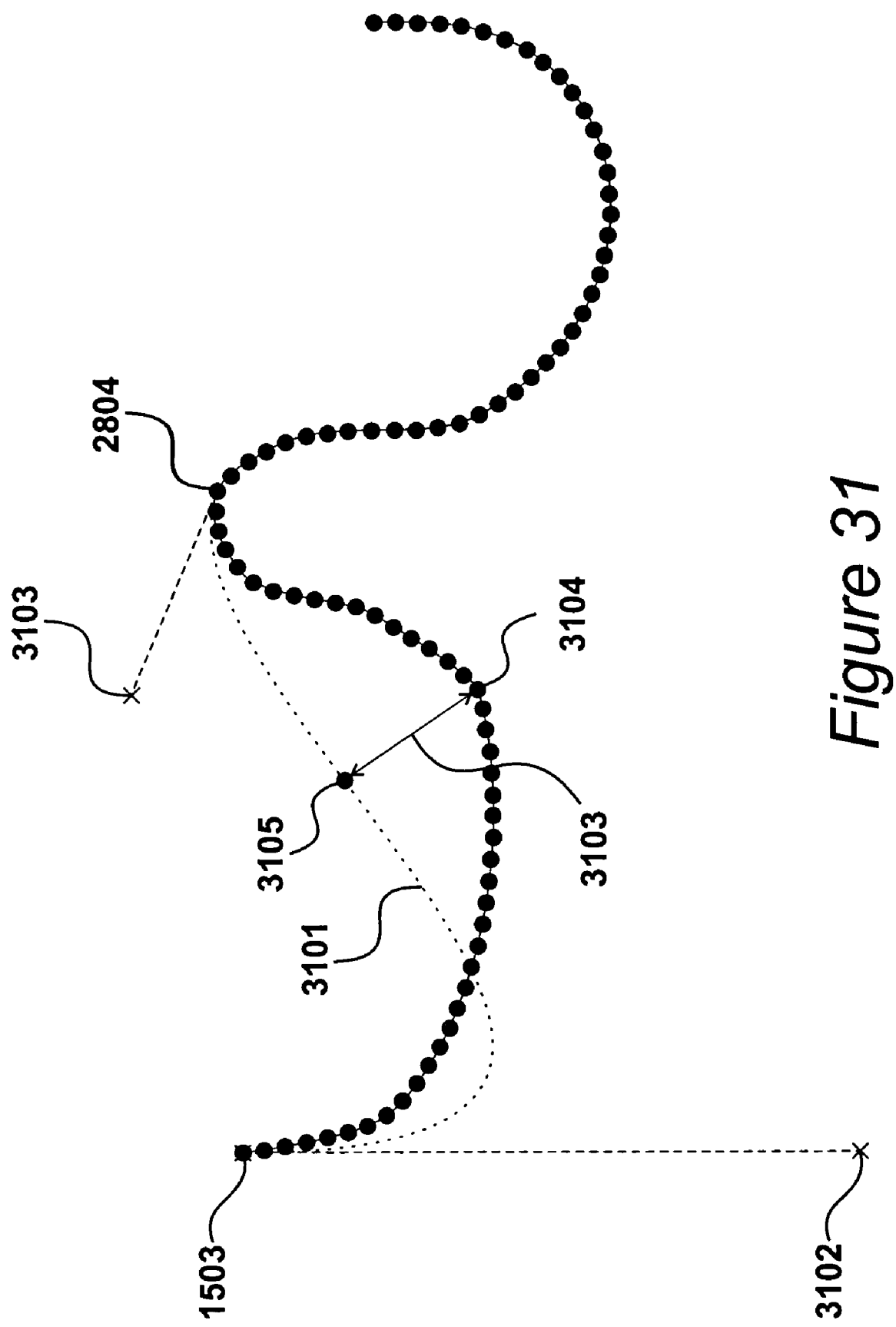
FIG. 31 shows a second example of a curve fitted to a section of a freehand curve.

FIG. 31 illustrates the second curve that is fitted to the example array of digitized points shown in FIG. 18. Curve 3101 has principal control points 1503 and 2804. Tangent control point 3102 is on the same line as tangent point 2801, since the same left tangent is being used as in the first iteration of the curve fitting process. Tangent point 3103 is in a direction from point 2804 determined by the split point tangent.

The maximum error, as shown by arrow 3103, occurs at digitized point 3104, with the corresponding point on curve 3101 shown at 3105. Thus, point 3104 is the next split point.

FIG. 32

The fitting of a cubic Bézier curve to a smaller and smaller section of digitized points continues until the maximum error is less than a certain threshold. This can be user-defined but a typical error threshold has a value of four. Lowering the value of the threshold gives a better fit but also results in more control points, with the ultimate effect, if the threshold is too low, of a control point at every digitized point.

However, if on an iteration the maximum error is not lower than the error threshold but is lower than an improvement threshold, which is typically set to be the value of the error threshold squared, then a re-parameterization of the digitized points may be enough to lower the maximum error below the error threshold. If the maximum error is above the improvement threshold, however, then the re-parameterization is not usually worthwhile since it is computationally intensive. Also, a maximum number of iterations for the parameterization is set, typically four, since each successive parameterization produces less and less change in the maximum error.

Figure 32:
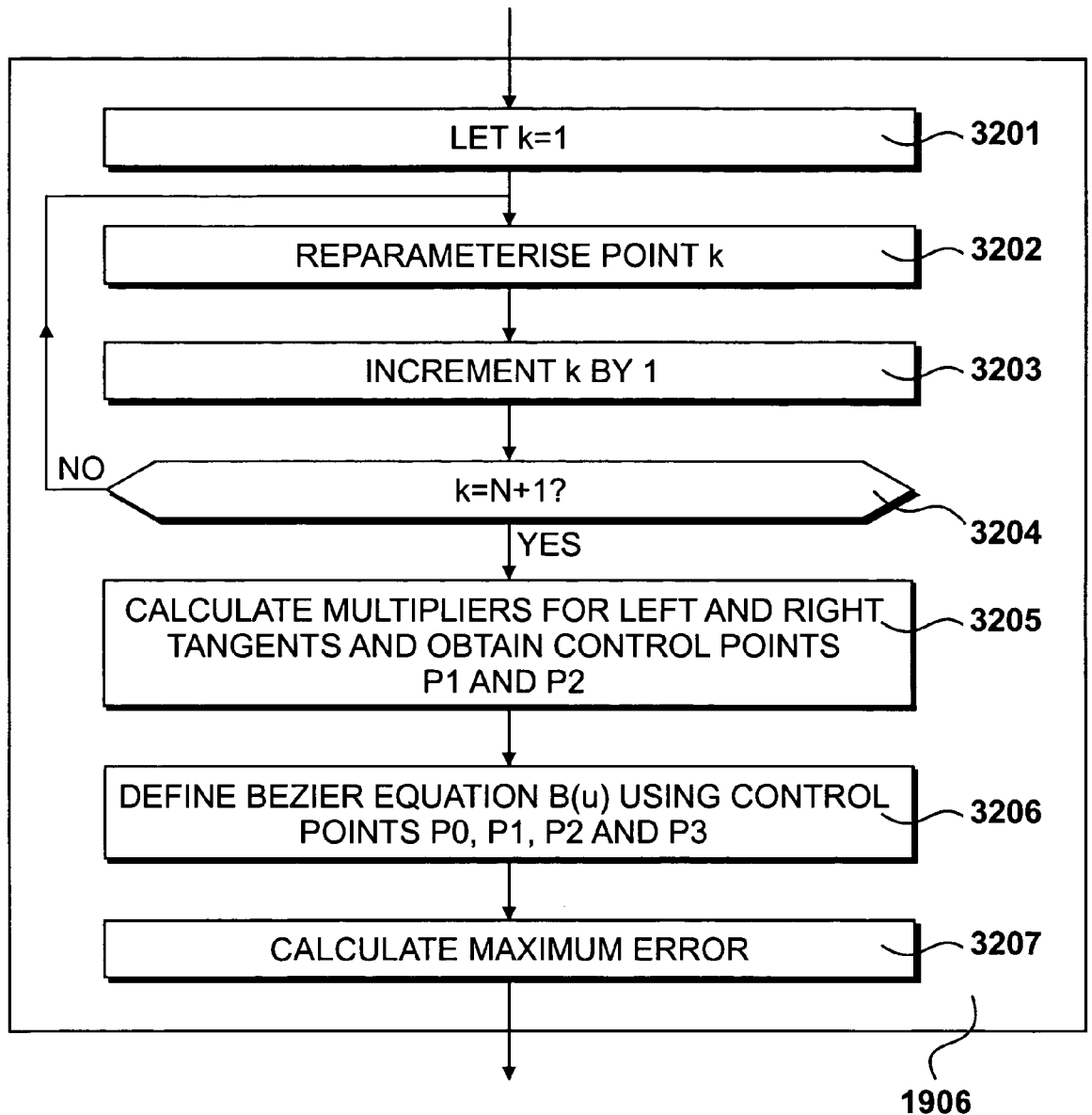
FIG. 32 details steps carried out in FIG. 19 to reparameterize a section of digitized points.

Thus, FIG. 32 details step 1906 at which the points are re-parameterized. At step 3201, an iterator k is set to be one and at step 3202, the $k^{th}$ digitized point in the section of points under consideration is re-parameterized. At step 3203, k is incremented by one and at step 3204, a question is asked as to whether k is now equal to N plus one. If this question is answered in the negative, then control is returned to step 3202 and the next point in the section is re-parameterized. However, if the question is answered in the affirmative, then all the points in the section have been re-parameterized and control is directed to step 3205. Here, multipliers are calculated for the left and right tangents to obtain tangent control points P1 and P2 in the same way as at step 2204. Similarly, a Bézier equation is defined at step 3206 in the same way as at step 2205 and the new maximum error is calculated at step 3207 in the same way as at step 2206.

FIG. 33

Figure 33:
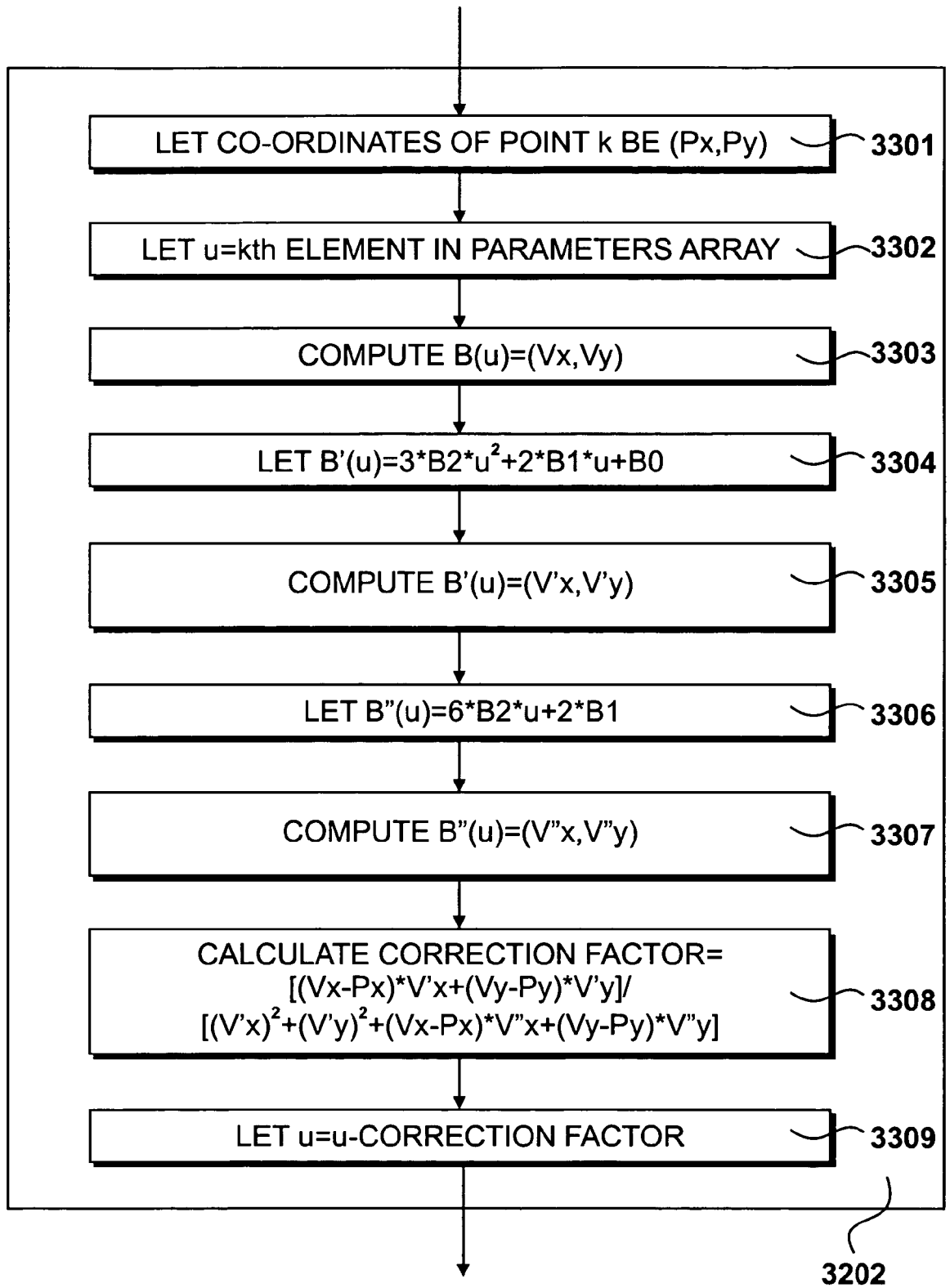
FIG. 33 details steps carried out in FIG. 32 to reparameterize a selected point.

FIG. 33 details step 3202 at which a selected point is re-parameterized. At step 3301, the x-y coordinates of the selected point are stored and at step 3302, a parameter u is set to be the element numbered k in the parameters array 410. At this point, the array 410 contains the elements assigned to it during the last iteration of step 1902 or, if this is a second, third or fourth iteration of step 3202, at the previous iteration of it. At step 3303, a Bézier value for this parameter is calculated using the Bézier equation, similarly defined during the last iteration of either step 1902 or step 3202.

At step 3304, the derivative of the Bézier equation with respect to u is calculated and at step 3305, the parameter u is input into this equation. Similarly, at step 3306, the second derivative with respect to u is calculated for the Bézier equation and at step 3307, the parameter u is input into this new equation.

At step 3308, a correction factor is calculated using the x-y coordinates of the points under consideration, as obtained at step 3301, and its corresponding points on the Bézier curve and the first two derivatives of the Bézier curve. This correction factor is defined by a fraction. The numerator is defined as the dot product of the first derivative of the Bézier curve calculated for parameter u and the result of subtracting the coordinates of the digitized point from the Bézier equation calculated for the parameter u. The denominator is equal to the sum of the derivative of the numerator, that is the sum of the first derivative of the Bézier curve for the parameter u multiplied by itself, and the dot product of the second derivative of the Bézier curve calculated for the parameter u and the result of subtracting the coordinates of the digitized point under consideration from the Bézier curve calculated for the parameter u.

A Newton-Raphson iteration is given by subtracting the correction factor from the parameter u at step 3309 to obtain a new parameter u, which is entered in parameters array 410 to replace the parameter under consideration. Once all of the parameters have been corrected, a new Bézier equation is calculated so that the new maximum error can be tested against the threshold.

FIG. 34

Figure 34:
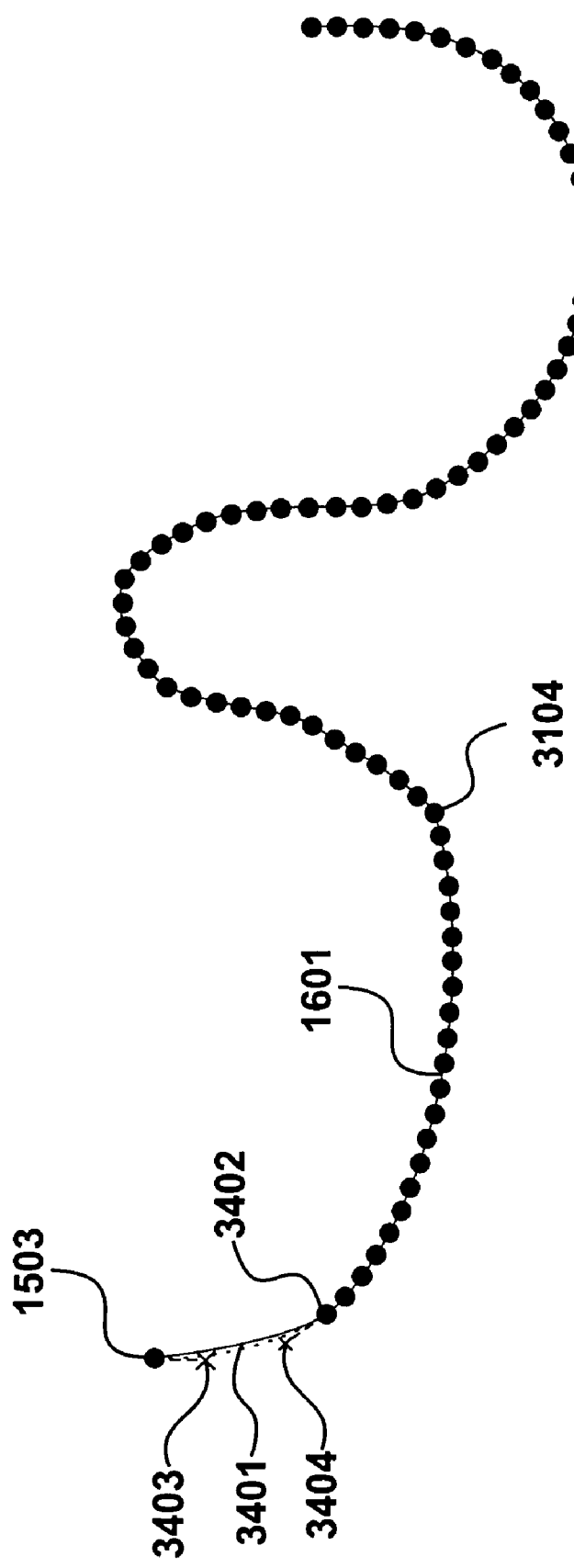
FIG. 34 shows a third example of a curve fitted to a section of freehand curve.

FIG. 34 shows an example of the final iteration of the first stage of fitting a cubic to the digitized points shown in FIG. 18. The curve 3401 has principal control points 1503 and 3104. Tangent control point 3403 is on the same line as tangent points 3102 and 2801, referring back to FIGS. 31 and 28, while tangent point 3404 is on the line of the split point tangent calculated with respect to point 3402 during step 2901.

Curve 3401 is very close at all points to curve 1601 and the maximum error falls within the error threshold, although some re-parameterization has been done to achieve this. Thus, the section of points from 3402 to 3104 has been fully fitted and thus need not be considered with respect to further iterations of step 1902. The next iteration will attempt to fit a cubic starting at point 3402.

FIG. 35

Figure 35:
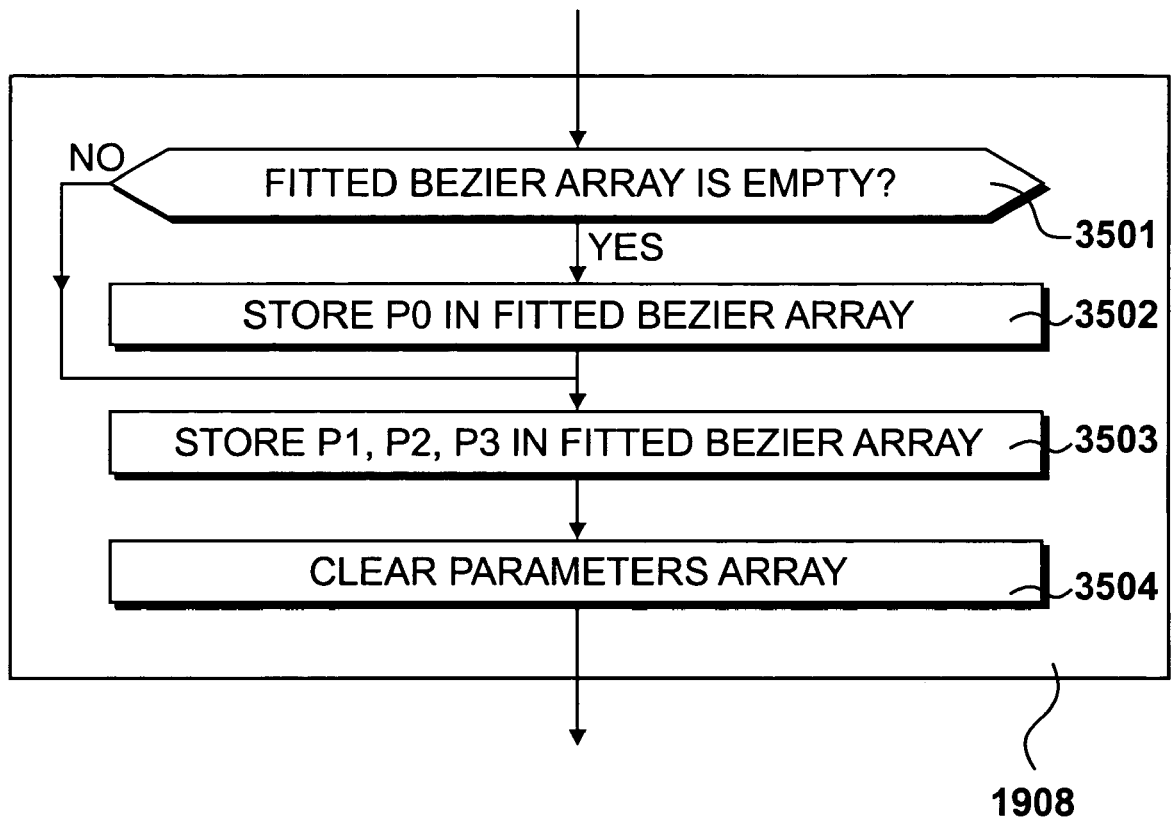
FIG. 35 details steps carried out in FIG. 19 to store control points of a fitted Bézier curve.

FIG. 35 details step 1908 at which the control points of the Bézier curve fitted at the last iteration of step 1902 are stored. At step 3501, a question is asked as to whether fitted Bézier array 408 is empty. If this question is answered in the affirmative, then the first control point P0 is stored in fitted Bézier array 408 at step 3502. If the question is answered in the negative, then the point P0 is already stored in fitted Bézier array 408 as the point P3 of the previous curve and so there is no need to store it. At step 3503, the control points P1, P2 and P3 are stored in fitted Bézier array 408 and at step 3504, the parameters array 410 is cleared for use during the next curve-fitting step.

FIG. 36

Figure 36:
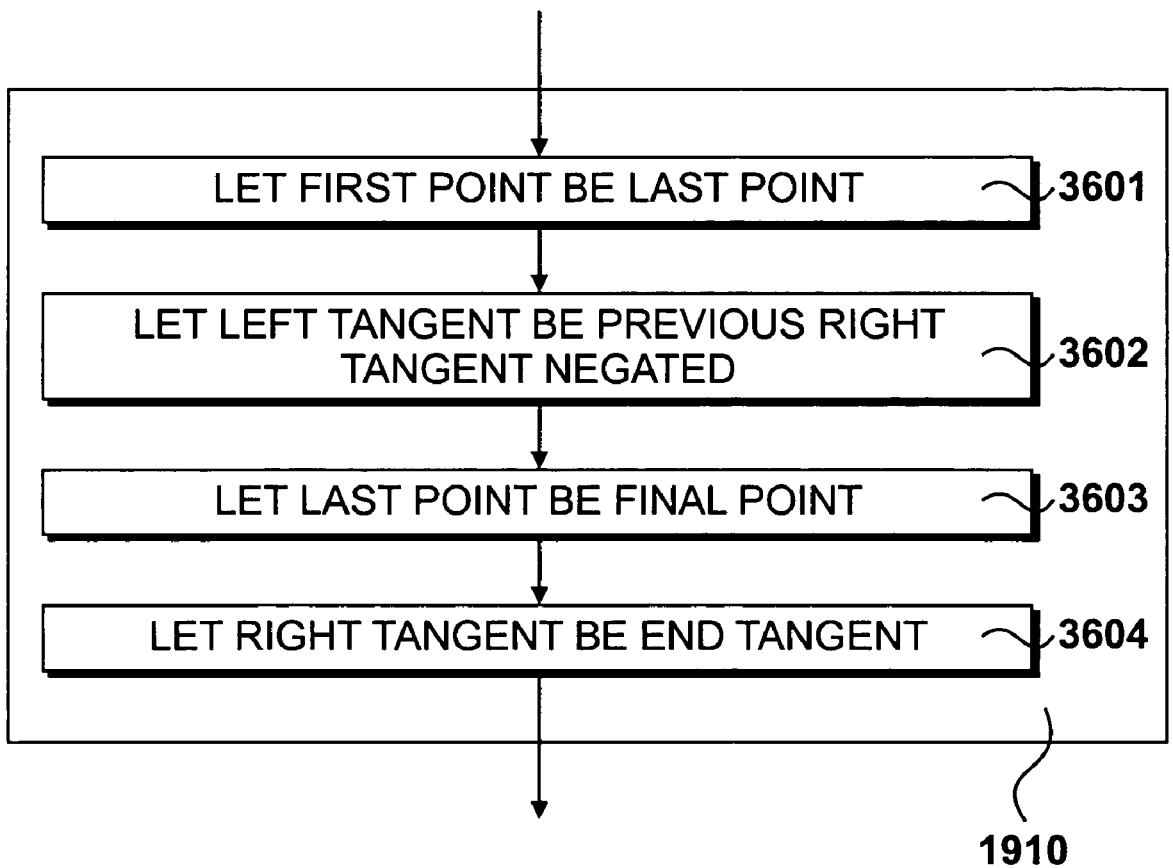
FIG. 36 details steps carried out in FIG. 19 to define a new section of digitized points.

FIG. 36 details step 1910 at which the next section of digitized points to have a curve fitted to it is defined. At step 3601, the current last point is set to be the first point, and at step 3602 the left tangent is set to be the previous right tangent negated. This ensures continuity along the Bézier spline. This type of continuity, where two curves have, at their joining point, tangent handles that have the same slope but different magnitudes, is known as G1 geometric continuity. If the magnitudes are also the same, then the curves are said to join with C1 continuity.

At step 3603, the last point is set to be the final digitized point in the array (in this example point 1603) and at step 3604, the right tangent is set to be the end tangent as calculated during step 2001.

Control is now returned to step 1902 and a cubic is fitted to the section of points thus defined.

FIG. 37

Figure 37:
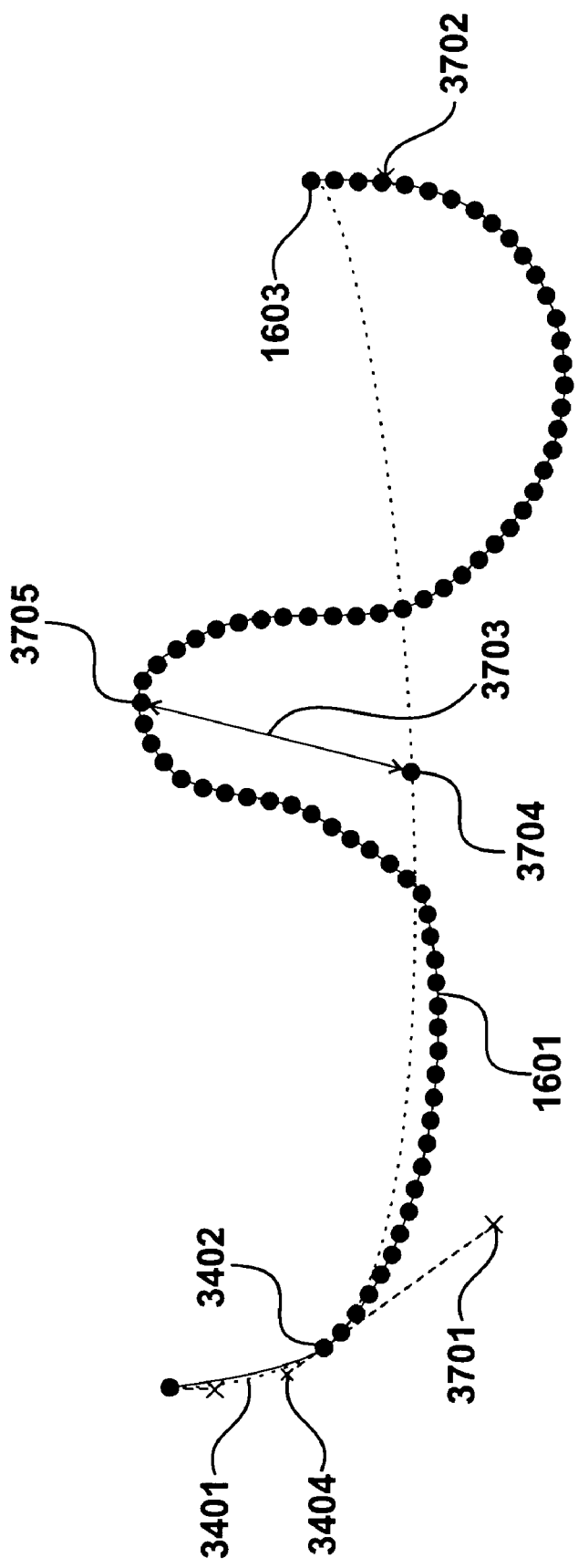
FIG. 37 shows a fourth example of a curve fitted to a section of freehand curve.

FIG. 37 illustrates the next iteration of step 1902 on the example of array of points shown in FIG. 18. Curve 3401 has been fixed and the digitized points 1602 have been removed from the curve 1601 to illustrate this. The section of points under consideration is the section between point 3401 and 1603. The left tangent control point 3701 is constrained to lie along the same line as the right tangent point 3404 of the previous curve 3401. The tangent control point 3702 lies along the same line as tangent point 2802, referring back to FIG. 28, during the first iteration of step 1902. As shown by arrow 3703 the maximum error occurs at digitized point 3705, with its corresponding point on the Bézier curve being at 3704. Digitized point 3705 is therefore the next split point.

FIG. 38

Figure 38:
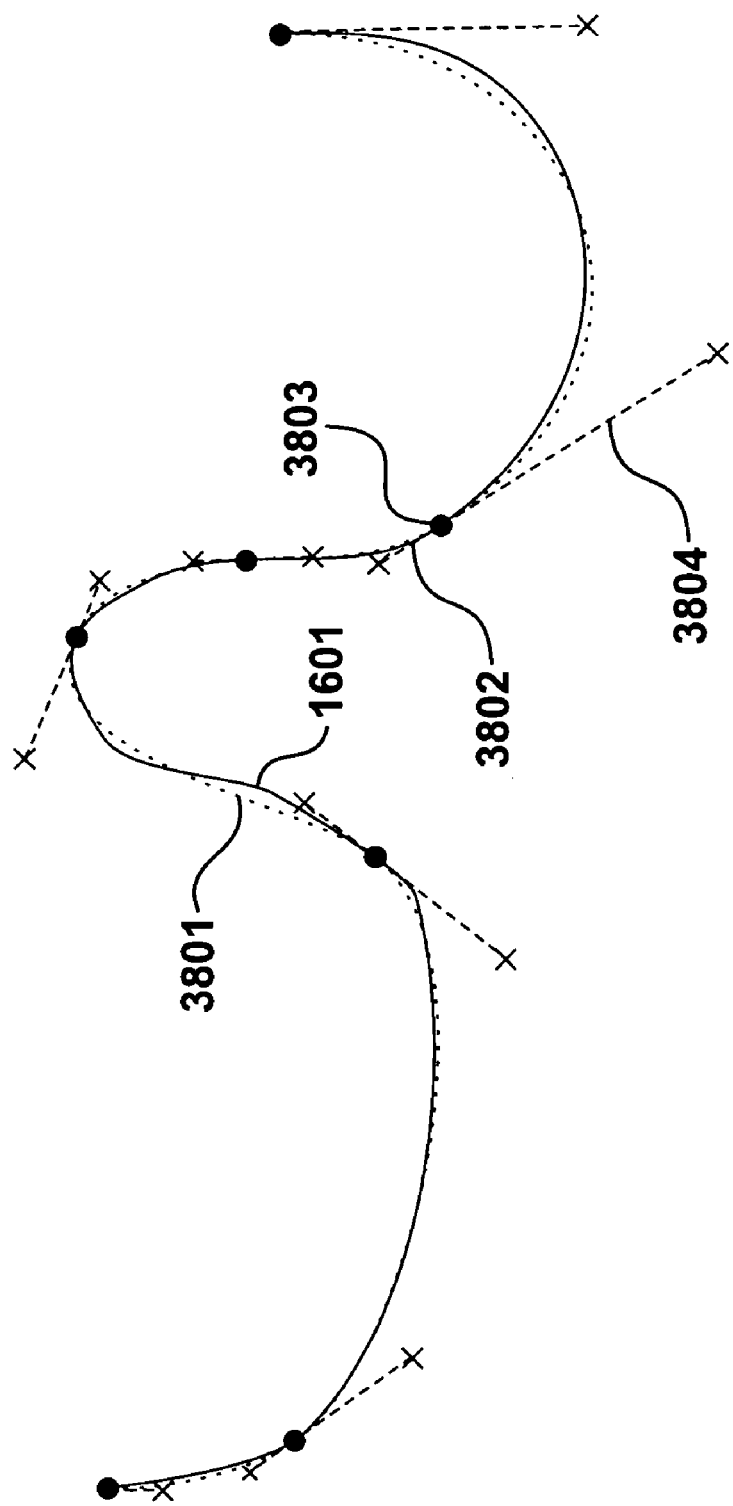
FIG. 38 shows an example of a fitted Bézier spline.

FIG. 38 illustrates the entire Bézier spline obtained by fitting a cubic to the array of digitized points shown in FIG. 18. Spline 3801 is shown by a dotted line and the original freehand curve 1601 is shown without the digitized points 1602 for visual ease. However, as previously discussed, the curve fitting algorithm herein described does not always give easy-to-use tangent handles. For example, the right tangent 3804 at control point 3803 is much longer than left tangent 3802. The illustration of the curve shown in FIG. 38 is considerably enlarged, and referring back to FIG. 7 the skilled reader will understand that tangent handle 3802 could appear very small when displayed on VDU 104.

Thus, there is provided a method of balancing out the lengths of left and right tangent handles at each control point on curve 3801 to make it easier for the user to adjust them.

FIG. 39

Figure 39:
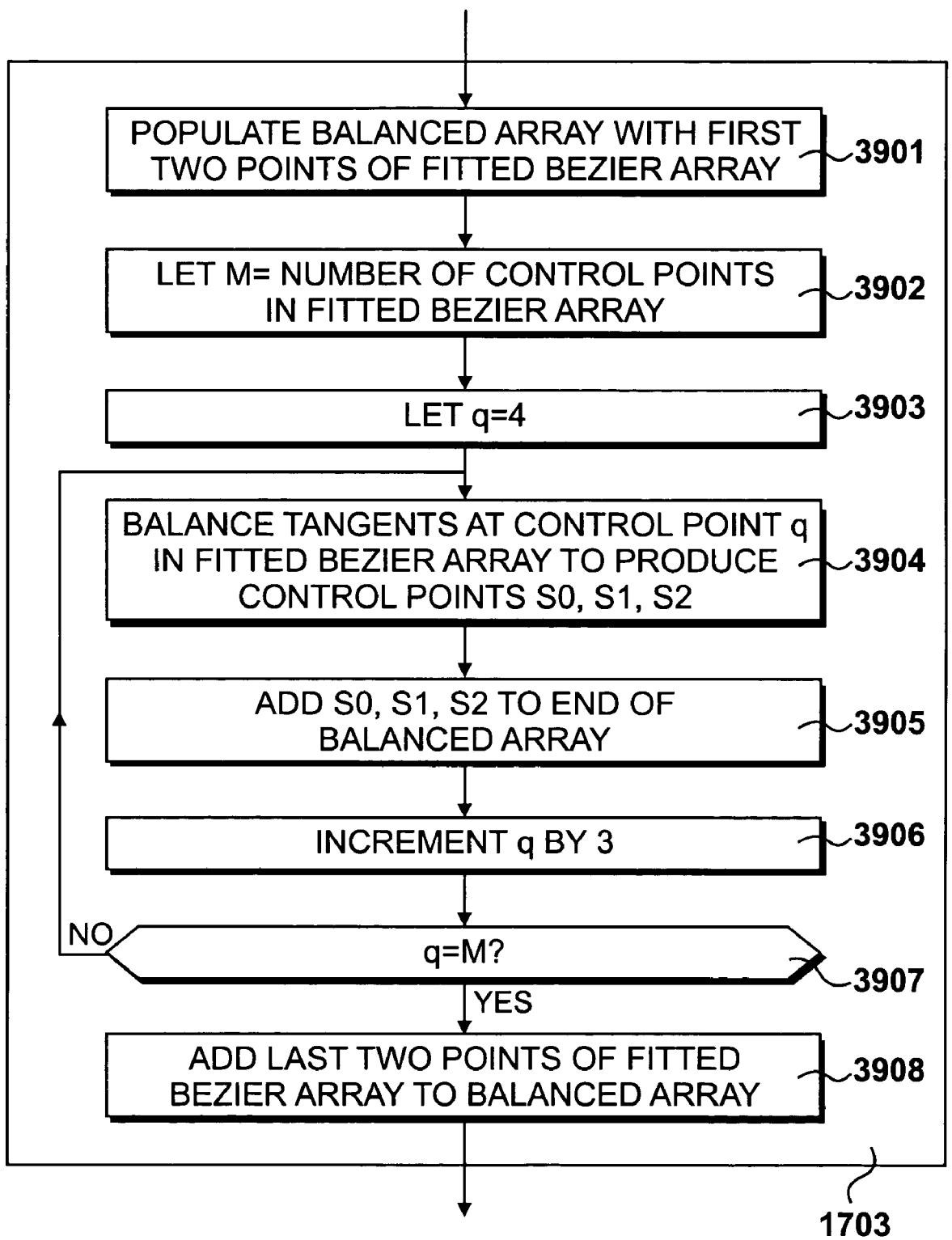
FIG. 39 details steps carried out in FIG. 17 to balance tangent handles in a Bézier spline.

FIG. 39 details step 1703 at which the tangent handles defined by the control point in fitted Bézier array 408 are balanced. At step 3901, a new array, balanced Bézier array 409, is populated with the first two control points in fitted Bézier array 408 and at step 3902, a value M is set to be the number of control points in fitted Bézier array 408. At step 3903, an iterator q is set to be four and at step 3904, the tangents are balanced at the $q^{th}$ control point, which on the first iteration is the fourth control point, to produce points S0, S1 and S2, where S1 is the new principal control point and S0 and S2 are its new tangent control points.

At step 3905, the points S0, S1 and S2 are added to the end of balanced Bézier array 409 and at step 3906, the iterator q is incremented by three.

At step 3907, a question is asked as to whether the iterator q is now equal to the value of M. If this question is answered in the negative, then control is returned to step 3904 and the tangent handles at the $q^{th}$ control point are balanced. If it is answered in the affirmative, then all of the principal control points in fitted Bézier array 408 that have two tangent handles have been balanced. The first and final principal control points are not balanced since they each have only one tangent handle. Thus, at step 3908 the final two control points in fitted Bézier array 408 are added to the end of balanced Bézier array 409 and step 1703 is concluded. Thus, balanced Bézier array 409 has the same number of control points as in fitted Bézier array 408, but for each principal control point in balanced Bézier array 409 the length of its two tangent handles, as defined by its adjacent tangent control points, are equal.

Thus, there is provided a method of editing image data, comprising the steps of fitting a first spline to a plurality of points, and fitting a second spline to the first spline, wherein the second spline has the same number of control points as the first spline and wherein for any principal control point on the second spline its tangent handles are of equal length.

In the description following, for any principal control point in either fitted Bézier array 408 or balanced Bézier array 409, the control point immediately preceding it in the same array is referred to as its left tangent control point and the control point immediately succeeding it is referred to as its right tangent control point.

FIG. 40

Figure 40:
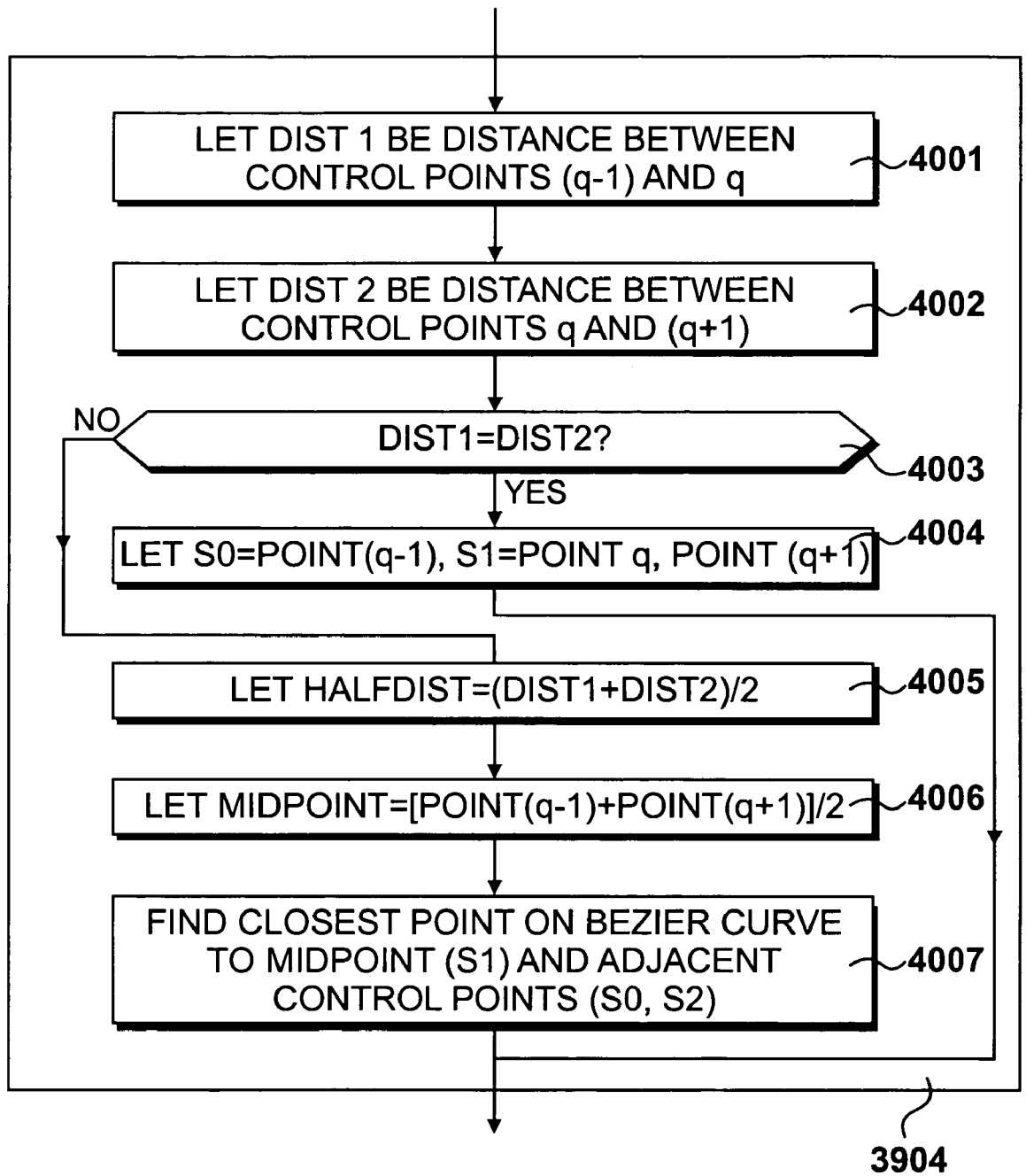
FIG. 40 details steps carried out in FIG. 39 to balance tangent handles at a selected control point.

FIG. 40 details step 3904 at which the tangent handles at the $q^{th}$ control point in fitted Bézier array 408 are balanced. At step 4001, a first distance is set to be the distance between the $q^{th}$ control point in fitted Bézier array 408 and its left tangent control point. At step 4002, a second distance is set to be the distance between the $q^{th}$ control point and its right tangent control point. At step 4003, a question is asked as to whether these two distances are equal. If this question is answered in the affirmative, then the tangent handles are already balanced and no further processing need be done for this control point. Thus, at step 4004, the point S0 is set to be the left tangent control point of the $q^{th}$ control point, S1 is set to be the $q^{th}$ control point and S2 is set to be the right tangent control point of the $q^{th}$ control point.

However, if the question asked at step 4003 is answered in the negative, to the effect that the two distances are not equal, then at step 4005 the two distances are added together and divided by two to give an average distance. At step 4006, a mid-point is calculated to be at the point halfway between the left and right tangent control points of the $q^{th}$ control point. Thus, if the first distance calculated is greater than the second then the mid-point will lie on the left tangent handle of the $q^{th}$ control point, while if the second distance calculated is greater it will lie on the right tangent handle.

At step 4007, the point on the Bézier spline as defined in fitted Bézier array 408 that is closest to the mid-point is found and labeled S1. This is the new principal control point that will replace control point q currently under consideration. Two tangent control points S0 and S2 are also found.

The control points S0, S1 and S2 as defined either at step 4004 or at step 4007 are then entered in balanced Bézier array 409 at step 3905.

FIG. 41

Figure 41:
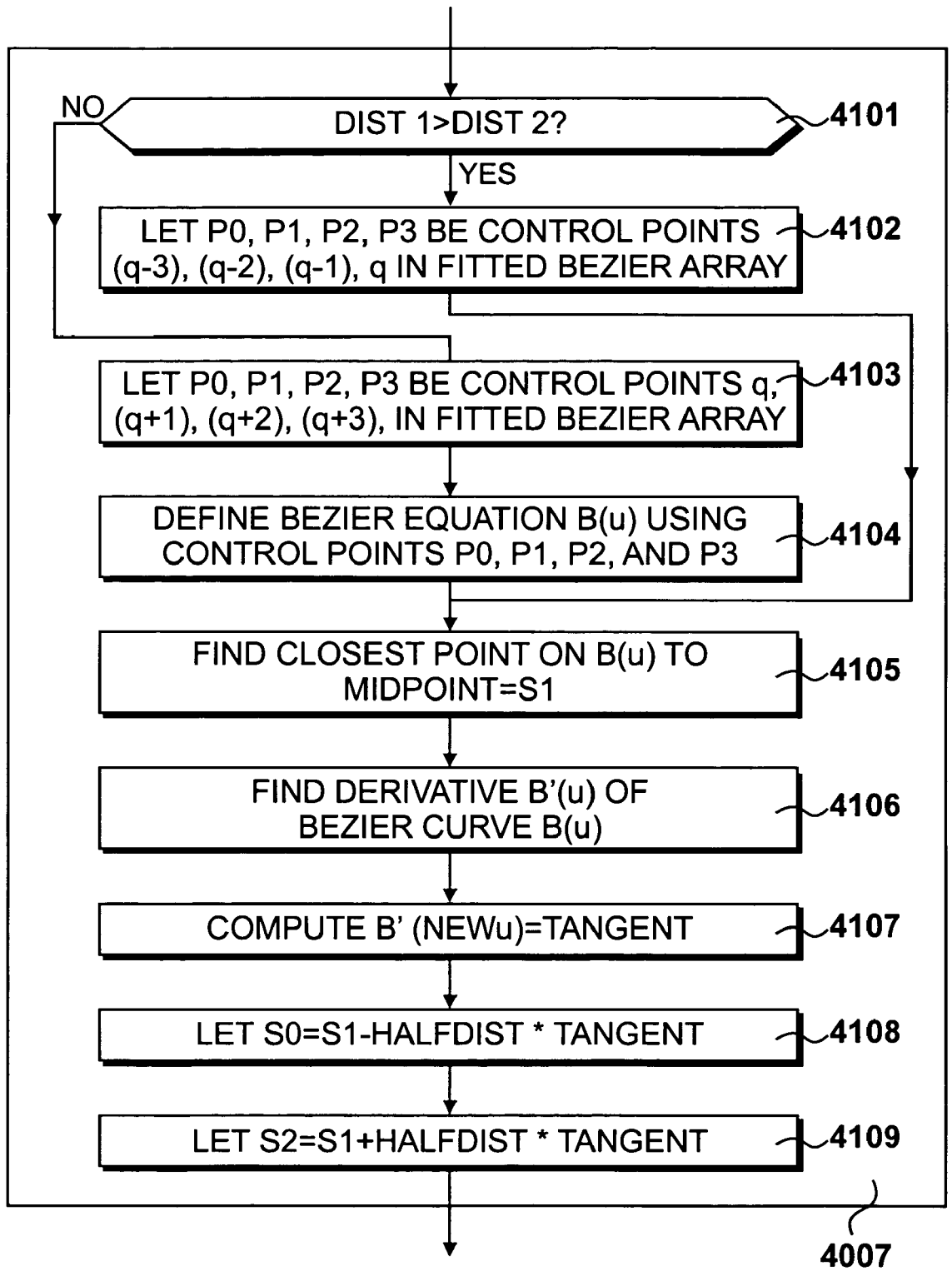
FIG. 41 details steps carried out in FIG. 40 to identify new control points.

FIG. 41 details step 4007 at which the control points S0, S1 and S2 are identified. At step 4101, a question is asked as to whether the first distance found at step 4001 is greater than the second distance found at step 4002. If this question is answered in the affirmative then the left tangent handle of the principal control point under consideration is longer than the right and so the new control point S1 will be to the left of the $q^{th}$ control point in fitted Bézier array 408. Thus, the closest point on the Bézier spline to the mid-point will be on the Bézier curve lying to the left of the $q^{th}$ control point. Thus, at step 4102 control point P3 is set to be the control point under consideration, that is the one numbered q in fitted Bézier array 408, and control points P0, P1, P2 are set to be the three control points preceding it.

If, however, the question asked at step 4101 is answered in the negative, to the effect that the first distance is smaller than the second distance, then the mid-point is on the right tangent handle. Thus, the control points P0, P1, P2 and P3 are set to be the $q^{th}$ control point in fitted Bézier array 408 and the three control points succeeding it.

At step 4104, a Bézier equation is defined using control points P0, P1, P2 and P3, exactly as at step 1004 described in FIG. 12, and at step 4105 the closest point on the curve defined by the equation to the mid-point is found and set to be control point S1. At step 4106, the derivative of this Bézier equation is found and at step 4107 the value of the parameter u at which the point S1 occurs is input into the derivative to find the tangent to the Bézier spline at point S1.

Thus, a new principal control point S1 has been found that is the closest point on the Bézier spline defined by the control points stored in fitted Bézier array 408 to the point that lies halfway between the left and right tangent control points that define the tangents to be balanced. Thus, the control point S1 defines the end and the beginning of two new Bézier curves that are part of the new spline that will be stored in balanced Bézier array 409. In order that this new spline fits as closely as possible to the fitted spline defined by the control points stored in fitted Bézier array 408, the tangent to the new spline at the point S1 is set to be the same as the tangent to the fitted Bézier spline at the same point. Thus, the left tangent control point S0 of principal control point S1 is defined as the tangent vector found at step 4107 multiplied by the distance found at step 4005, all subtracted from the point S1. At step 4109, the right tangent control point S2 is similarly set to be the same result added to the control point S1.

FIG. 42

Figure 42:
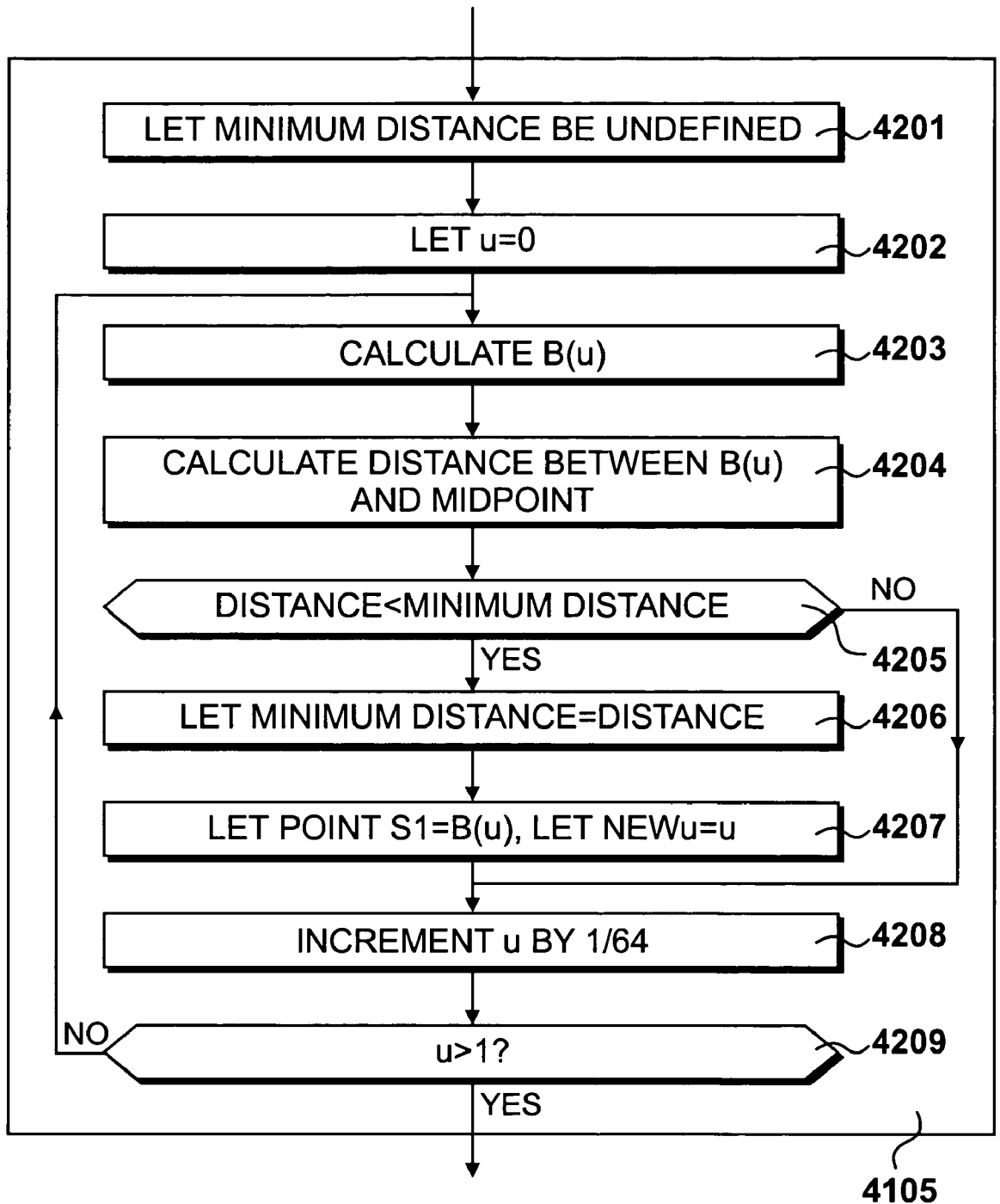
FIG. 42 details steps carried out in FIG. 41 to find a new principal control point.

FIG. 42 details step 4105 at which the point S1 is found. At step 4201, a minimum distance variable is initiated as undefined and at step 4202 a parameter u is set to be zero. At step 4203, this parameter is input into the Bézier equation defined at step 4104 to find the point on the Bézier curve corresponding to that parameter, and at step 4204 the distance between that point and the mid-point is calculated. At step 4205, a question is asked as to whether this distance is less than the minimum distance. On the first iteration this question will always be answered in the affirmative and so the minimum distance variable is set to be the distance (found at step 4204) at step 4206. At step 4207, the point S1 is set to be the point found at step 4203 and the value of the parameter u that was used to find it is saved.

At this point, and if the question asked at step 4205 is answered in the negative, u is incremented by 1/64 at step 4208 and at step 4209 a question is asked as to whether the value of u is now greater than one. If this question is answered in the negative then control is returned to step 4203 and the point on the curve corresponding to the new value of u is calculated. If it is answered in the affirmative, then step 4105 is concluded and the last saved value of S1 is the point at which the minimum distance occurs.

FIG. 43

Figure 43:
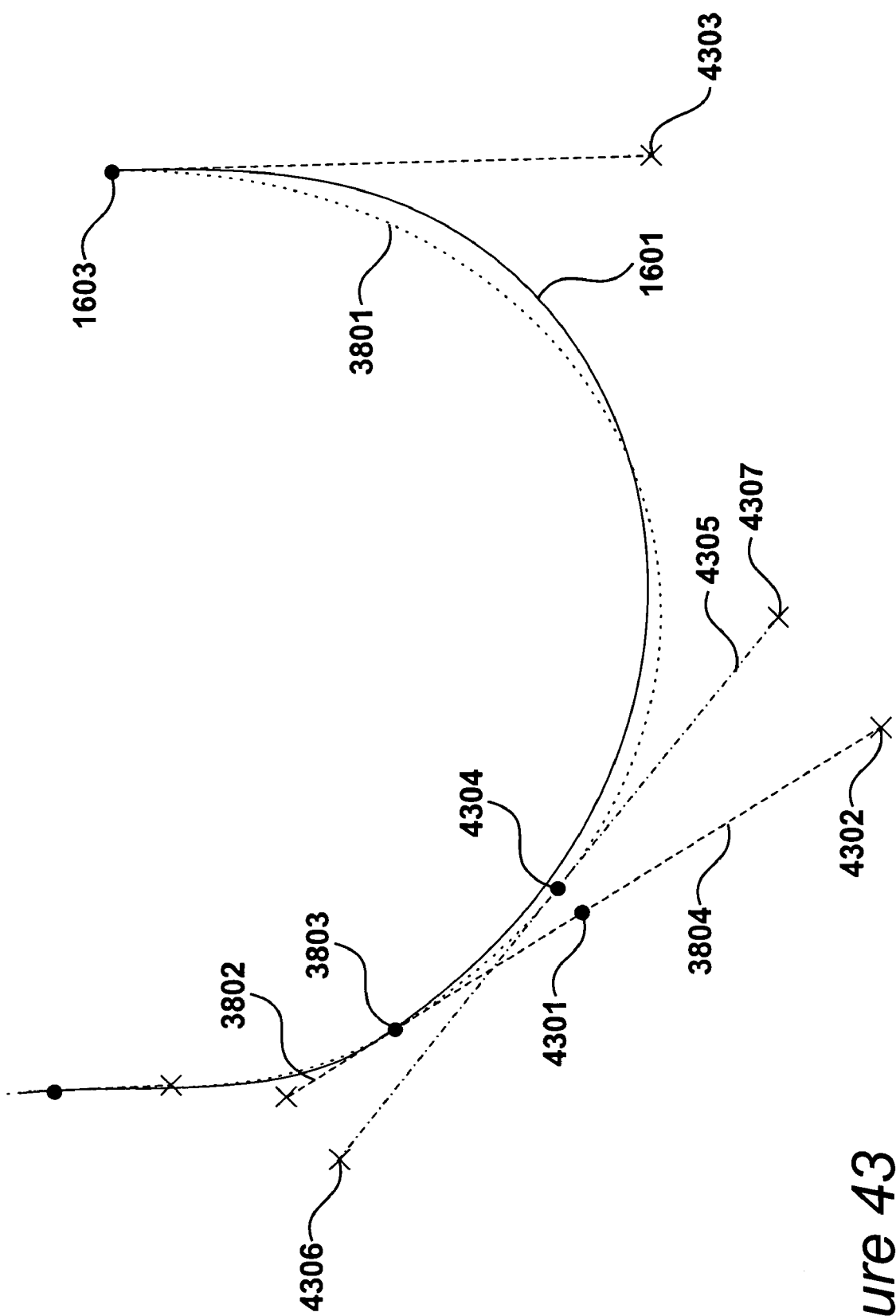
FIG. 43 illustrates a tangent handle balancing process at a selected control point.

FIG. 43 shows an example of the tangent handle balancing process carried out at step 3904. It shows an enlarged section of the fitted Bézier spline 3801 and the original freehand curve 1601. On this iteration of step 3904, q is equal to 17, which means that the principal control point 3803 is being balanced. Its right tangent handle 3804 is longer than its left tangent handle 3802, meaning that the mid-point 4301 is on the right tangent handle 3804. Thus, the portion of the Bézier spline to be considered is that defined by principal control points 3803 and 1603 and tangent control point 4302 and 4303. The closest point on this curve to mid-point 4301 is point 4304 and this is therefore chosen to be the new principal control point S1. The tangent to the curve 3801 at the point 4304 is shown by line 4305 and this defines the tangent control points S0 and S2, shown as 4306 and 4307.

It will be noted that the point 4304 is not on the original freehand curve 1601, whereas the principal control points of the fitted Bézier spline are all digitized points lying on the curve 1601. This is because the balancing procedure is carried out with respect to the Bézier spline fitted to the freehand curve, rather than with respect to the freehand curve itself.

FIG. 44

Figure 44:
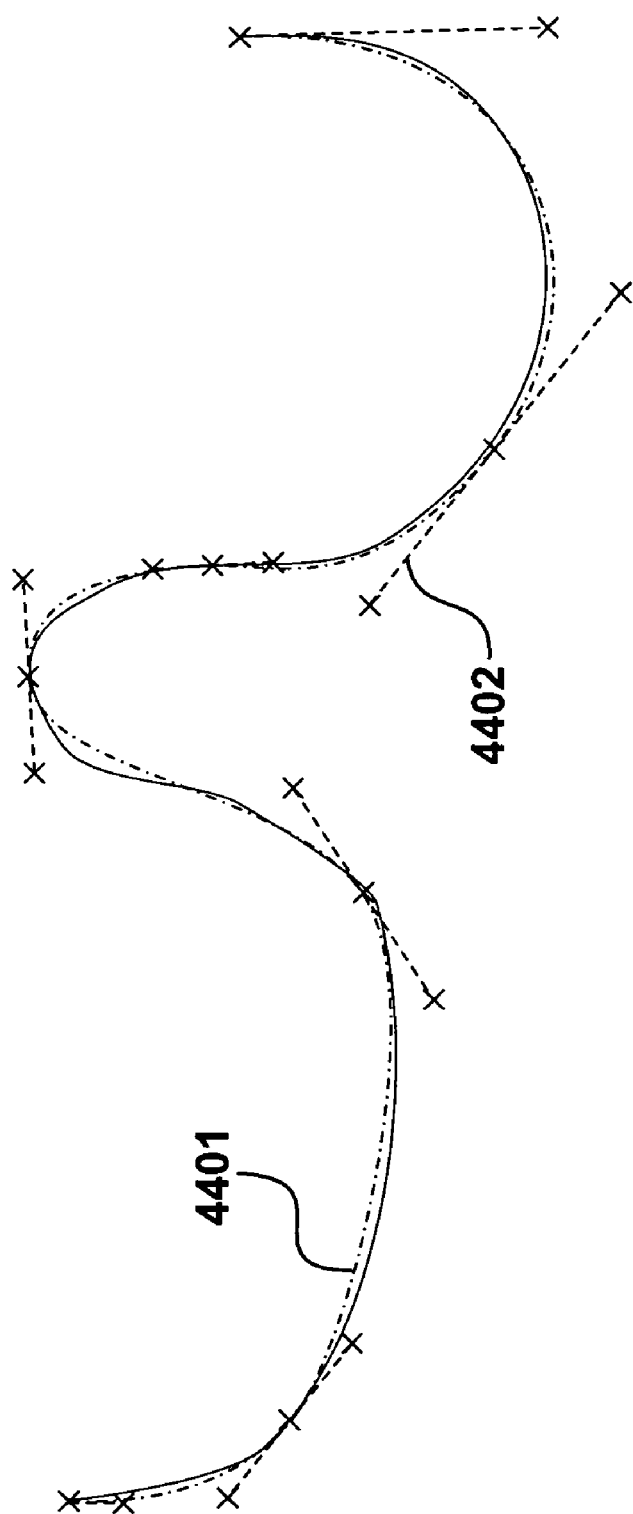
FIG. 44 shows an example of a balanced Bézier spline.

FIG. 44 shows the spline 4401 that is defined by the control points stored in balanced Bézier array 409, the result of the tangent balancing process carried out at step 1703. Comparing spline 4401 with the fitted Bézier spline 3801 shown in FIG. 38, it can be seen that the two curves are extremely similar. However, spline 4401 has balanced tangent handles 4402 that are much easier for the user to manipulate.

FIG. 45

Figure 45:
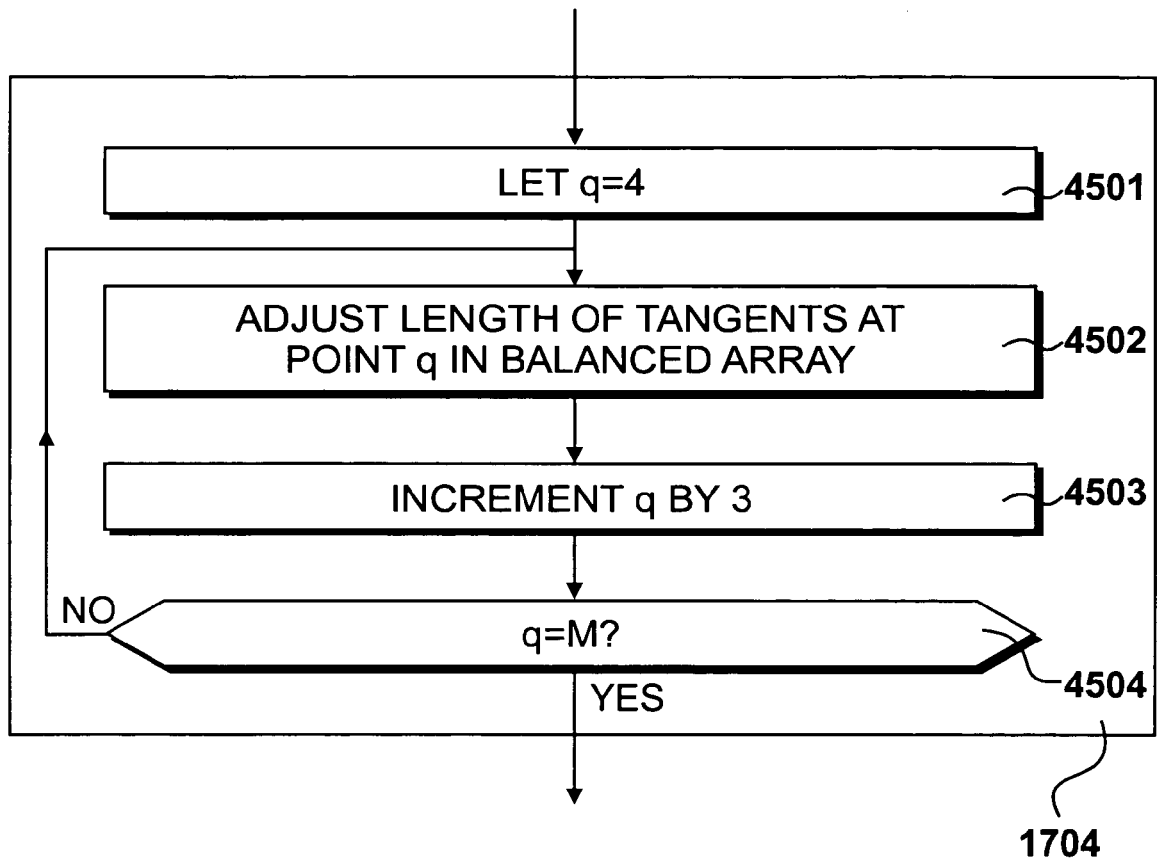
FIG. 45 details steps carried out in FIG. 17 to adjust the length of the tangent handles of a balanced Bézier spline.

FIG. 45 details step 1704 at which the length of the tangent handles of the spline defined by the control points in balanced Bézier array 409 are adjusted. This is in order to provide a better fit with the fitted Bézier spline as defined by the control points in fitted Bézier array 408. In alternative embodiments this step may be omitted since it represents a fine-tuning of the balanced Bézier spline that may not always be required.

Thus, at step 4501, the iterator q is set to be four and at step 4502 the length of the tangent handles on either side of the $q^{th}$ control point in balanced Bézier array 409 are adjusted. At step 4503, q is incremented by three and at step 4504, a question is asked as to whether the new value of q is equal to M, which is the total number of control points in balanced Bézier array 409. If this question is answered in the negative, then control is returned to step 4502 and the length of the tangent handles at the next principal control point are adjusted. If it is answered in the affirmative, then all the lengths have been adjusted and step 1704 is concluded.

FIG. 46

Figure 46:
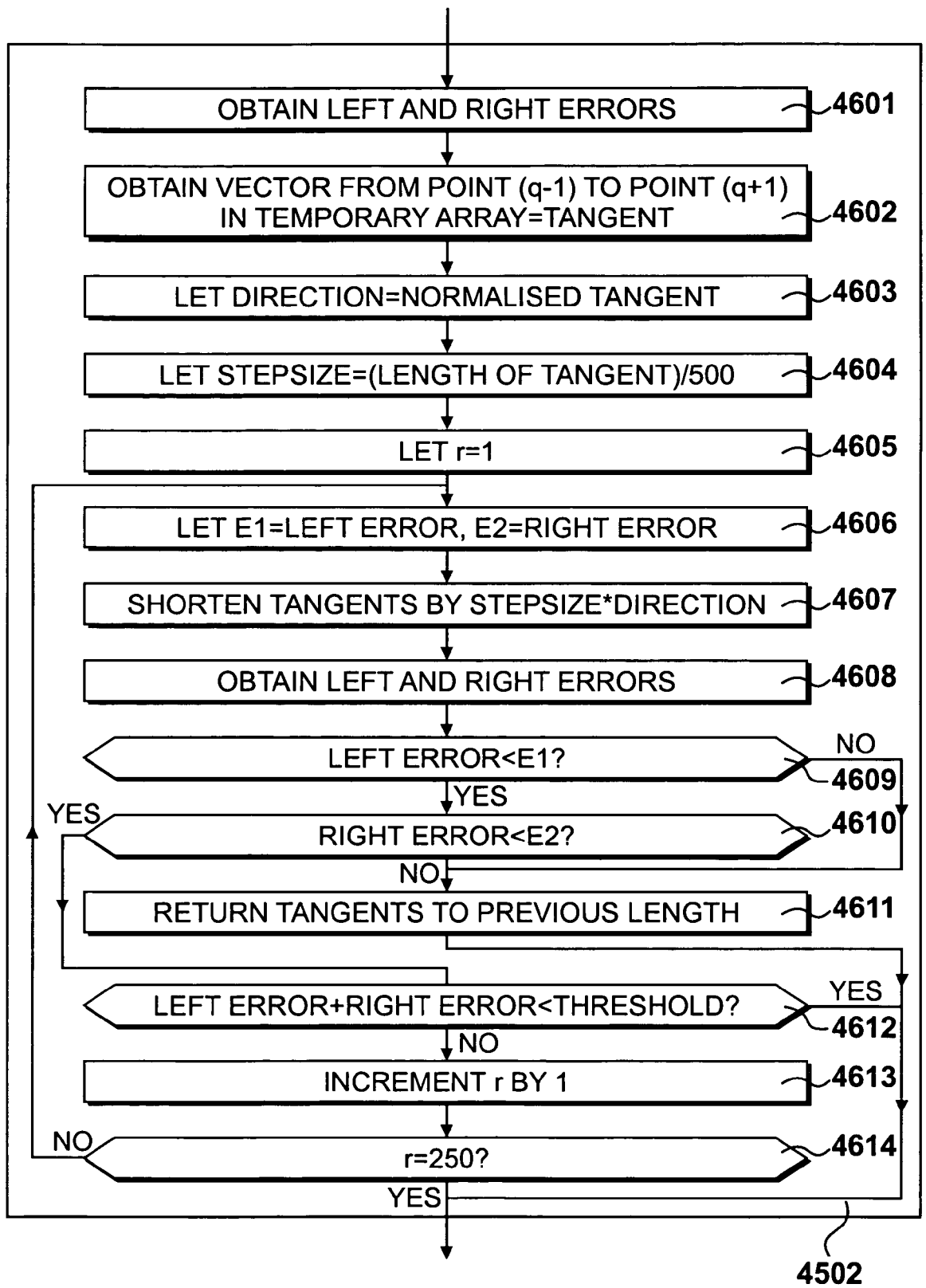
FIG. 46 details steps carried out in FIG. 45 to adjust the length of the tangent handles at a selected control point.

FIG. 46 details step 4502 at which the length of the tangent handles at the $q^{th}$ control point in balanced Bézier array 409 are adjusted. During this step, the sum of errors between the fitted Bézier spline defined by control points in fitted Bézier array 408 and the balanced Bézier spline defined by the control points in balanced Bézier array 409 are obtained, and if shortening the tangent handles of the balanced Bézier spline reduces the errors then they are shortened.

Thus, at step 4601, the errors on the left and on the right of the selected control point, that is the $q^{th}$ control point in balanced Bézier array 409, are obtained. At step 4602, the tangent vector to the balanced Bézier curve at the principal control point under consideration is obtained by finding the vector from its left tangent control point to its right tangent control point. At step 4603, this tangent is normalized to give a direction vector and at step 4604, the length of the tangent found at step 4602 is divided by five hundred to give a step size.

At step 4605, an iterator r is set to be one and at step 4606, the left and right errors calculated at step 4601 are saved. At step 4607, the tangent handles at the selected principal control point are shortened by the product of the step size and the direction vector and at step 4608 new left and right errors are obtained.

At step 4609 a question is asked as to whether the new left error is less than the old one, and if this question is answered in the affirmative, then a second question is asked at step 4610 as to whether the right error has also decreased. If this question or the question asked at step 4609 is answered in the negative then one or both of the errors is increasing and so at step 4611, the tangents are returned to the length they were on the last iteration and step 4502 is concluded.

If the question asked at step 4610 is answered in the affirmative, to the effect that the right error as well as the left error has decreased, then at step 4612, another question is asked as to whether the sum of the left and right errors is less than a pre-set threshold. If this question is answered in the affirmative then the balanced curve is considered to be close enough to the fitted curve and step 4502 is again concluded. However, if it is answered in the negative then at step 4613 the iterator r is incremented by one and at step 4614 a question is asked as to whether r is now equal to two hundred and fifty. If this question is answered in the negative, then control is returned to step 4606 and another iteration of tangent shortening is performed. If, however, it is answered in the affirmative, then two hundred and forty nine reductions in the handle length have taken place and a further iteration will give a tangent handle length of zero. Thus, step 4502 is again concluded.

The skilled reader will understand that the procedure described above for repeatedly shortening the tangent handles is not the only method that could be used. Additionally it might be considered useful, in other embodiments, to lengthen the tangent handles also.

FIG. 47

Figure 47:
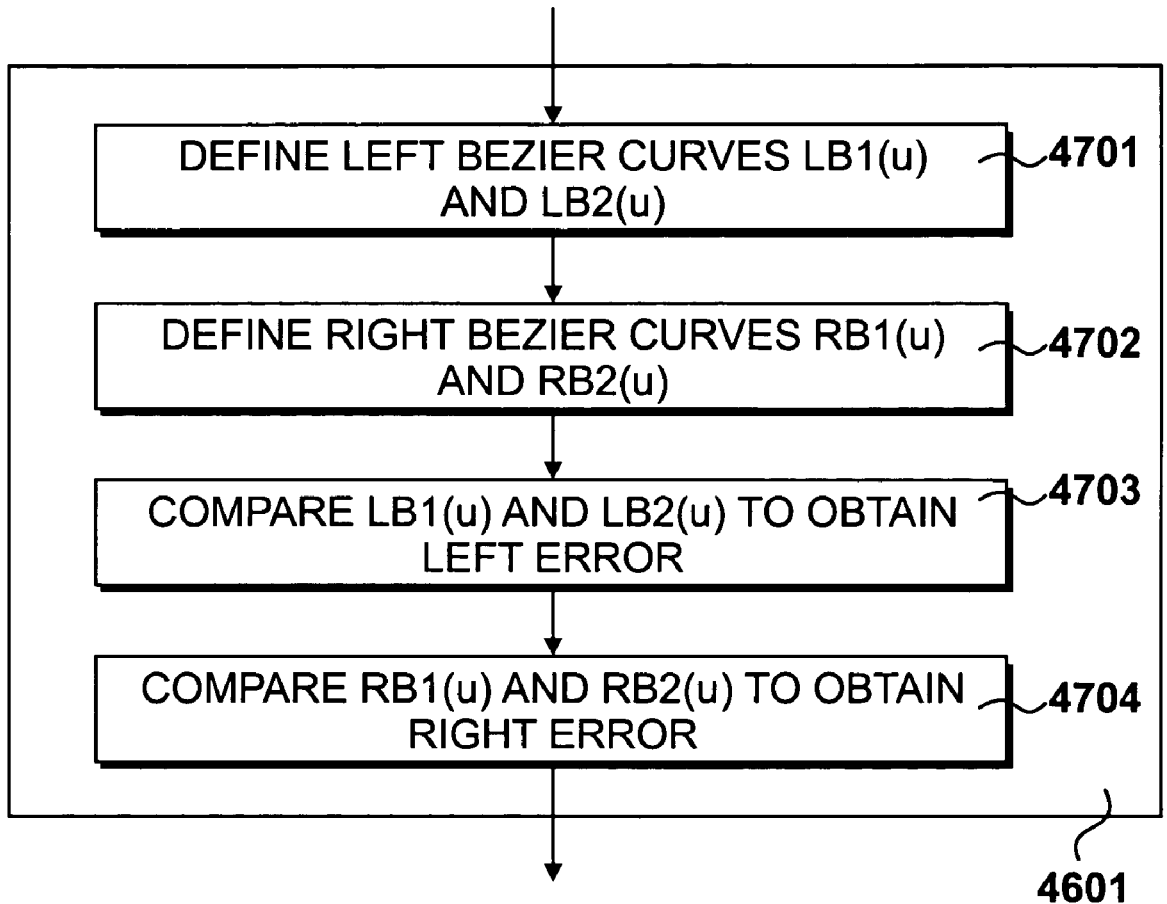
FIG. 47 details steps carried out in FIG. 46 to calculate left and right errors.

FIG. 47 details step 4601 at which the left and right errors are calculated. At step 4701, the two Bézier curves on the left of the selected control point are defined and at step 4702, the curves on the right are defined. At step 4703, the left curves are compared to obtain the left error and at step 4704, the right curves are compared to obtain the right error.

FIG. 48

Figure 48:
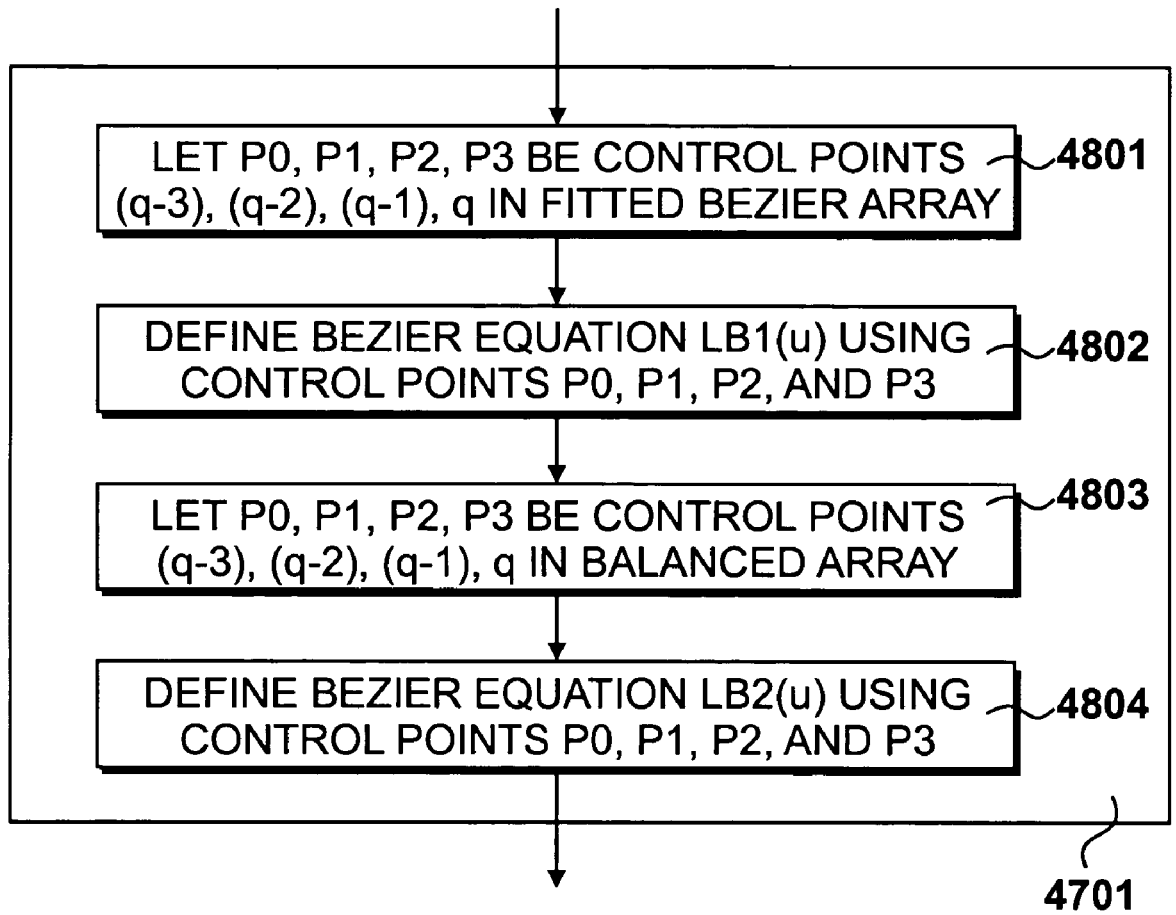
FIG. 48 details steps carried out in FIG. 47 to define first and second left Bézier curves.

FIG. 48 details step 4701 at which the two Bézier curves to the left of the selected control point are defined. At step 4801, the control point P3 is set to be the control point numbered q in fitted Bézier array 408 and the control points P0, P1 and P2 are set to be the three control points preceding it. A step 4802, a Bézier equation is defined using these control points, in exactly the same way as at step 1004 described with reference to FIG. 12.

Similarly, at step 4803, the control point at P3 is set to be control point numbered q in balanced Bézier array 409 and the control points P0, P1 and P2 are set to be the three control points immediately preceding it. At step 4804, a Bézier equation is defined using these control points.

FIG. 49

Figure 49:
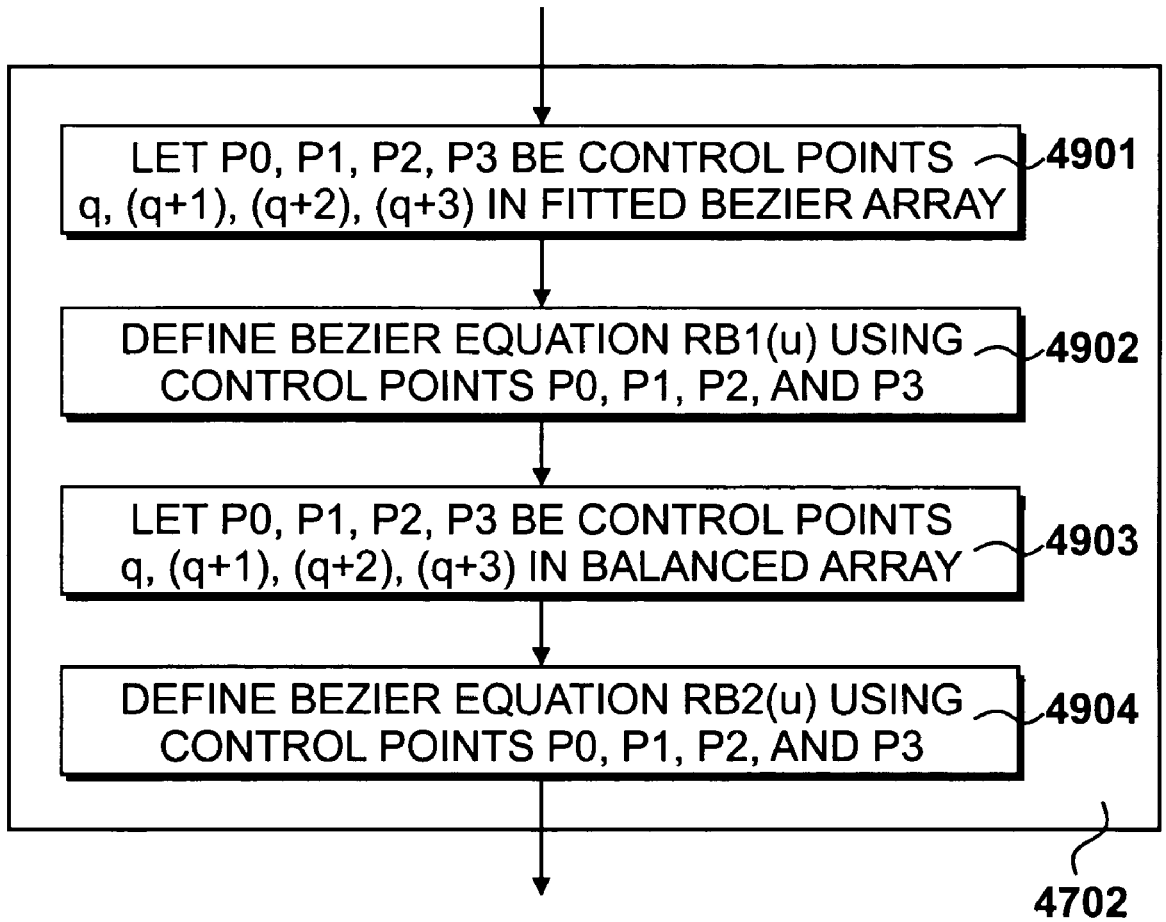
FIG. 49 details steps carried out in FIG. 47 to define first and second right Bézier curves.

FIG. 49 details step 4702 at which the curves to the right of the selected control points are defined. This is done in a similar manner to the definition of the left curves at step 4701, and thus at step 4901 the control points P0, P1, P2 and P3 are set to be the control point numbered q in fitted Bézier array 408 and the three points immediately succeeding it, and at step 4902 a Bézier equation is defined using these four control points. At step 4903, the four control points P0, P1, P2 and P3 are set to be the control point numbered q in balanced Bézier array 409 and the three points immediately succeeding it. At step 4904, a Bézier equation is defined using these four control points.

Thus, at the end of step 4702 four Bézier equations defining four Bézier curves have been obtained. The first left curve is a curve defined by control points in fitted Bézier array 408, as is the first right curve, while the second left and right curves are defined by control points in balanced Bézier array 409. The second left and right curves are the curves that end and begin respectively with the selected control point, that is the control point numbered q in the balanced Bézier array, while the first left and right curves end and begin respectively with the control point in fitted Bézier array 408 which is in the same position in that array as the selected control point is in balanced Bézier array 409. Thus, unless these two control points are identical, which is unlikely, either the left or right first curve will not be entirely to the left or the right of the selected control point.

FIG. 50

Figure 50:
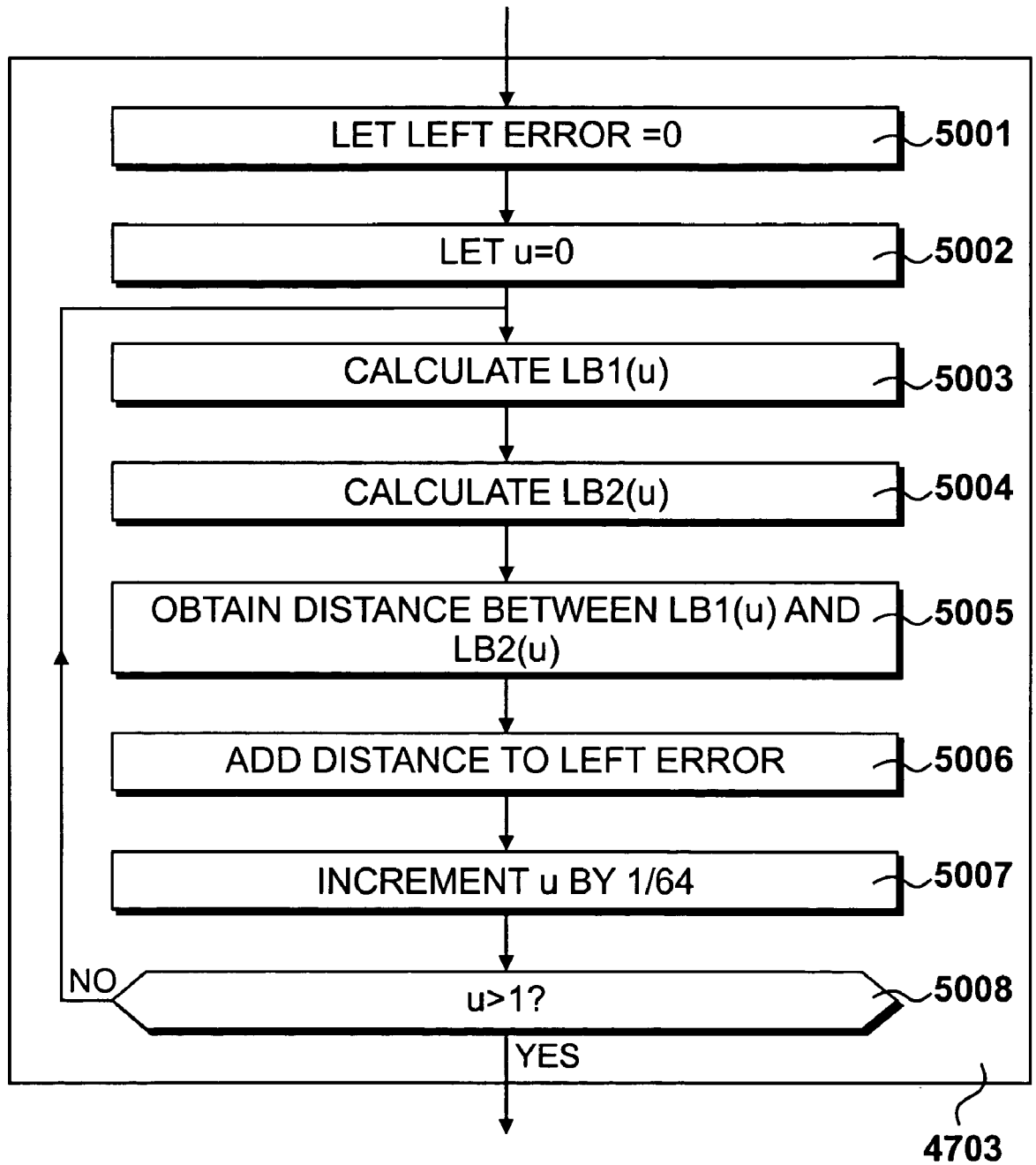
FIG. 50 details steps carried out in FIG. 47 to compare first and second left curves to obtain a left error.

FIG. 50 details step 4703 at which the first and second left curves are compared to obtain the left error. At step 5001, the left error is initially set to be zero and at step 5002, a parameter u is also set to be zero. At step 5003, this parameter is input into the equation defining the first left curve and at 5004, is input into the equation defining the second left curve. At step 5005, the distance between the resulting two points is obtained and at step 5006, this distance is added to the left error. At step 5007, u is incremented by $1/64$ and at step 5008, a question is asked as to whether u is now greater than one. If this question is answered in the negative, then control is returned to step 5003, and the new parameter of u is input into the first and second left curves. However, if it is answered in the affirmative, then step 4703 is concluded and the left error has been calculated to be the sum of the distances between the sixty-five points on the two curves considered.

FIG. 51

Figure 51:
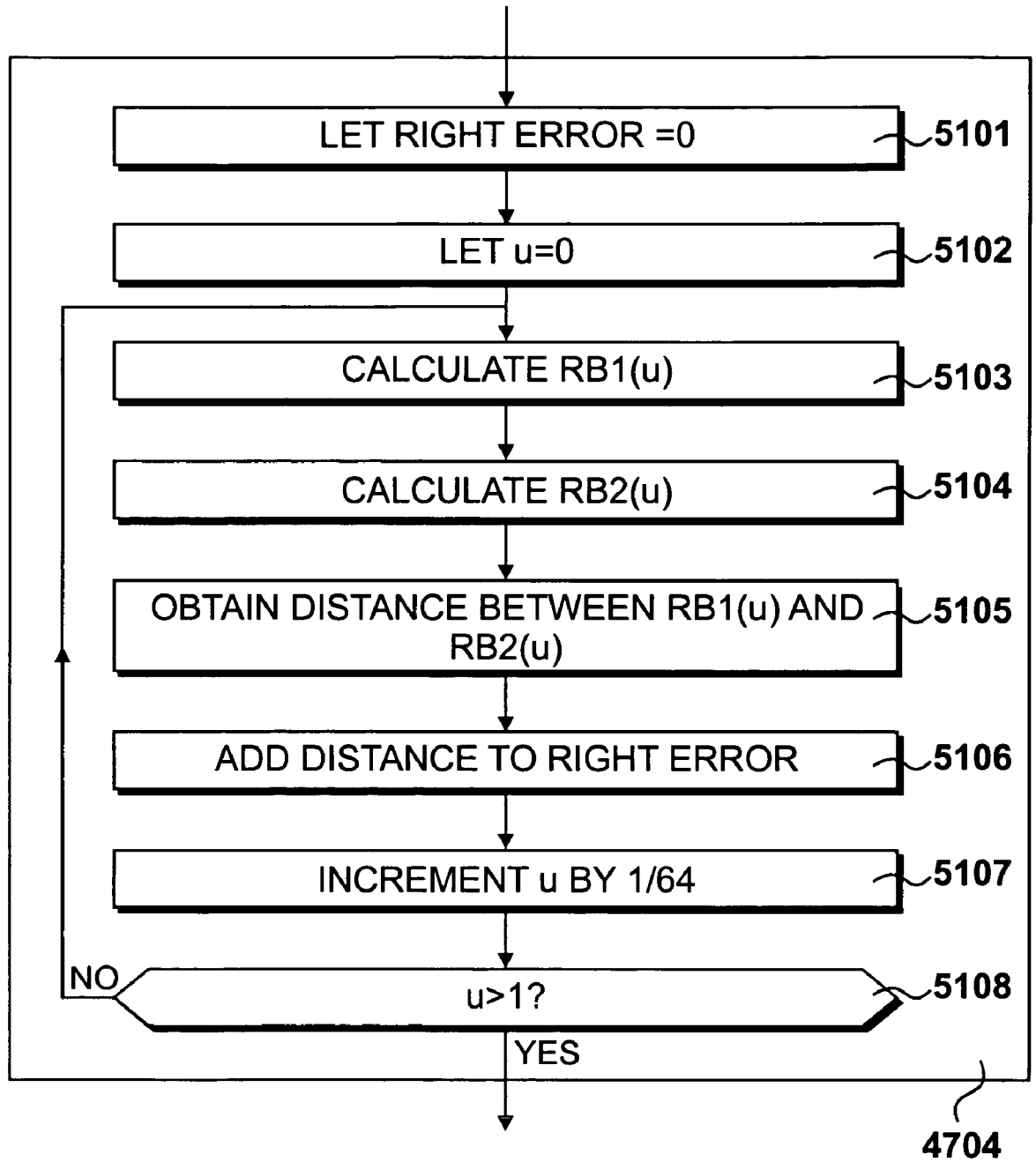
FIG. 51 details steps carried out in FIG. 47 to compare first and second right curves to obtain a right error.

FIG. 51 details step 4704 at which the two right curves are compared to obtain the right error. This is carried out in the same way as the calculation of the left error at step 4703 and thus, at step 5101, the right error is initially set to be zero and at step 5102, a parameter u is also set to be zero. At step 5103, this parameter is input into the equation defining the first right curve and at 5104, is input into the equation defining the second right curve. At step 5105, the distance between the resulting two points is obtained and at step 5106, this distance is added to the right error. At step 5107, u is incremented by $1/64$ and at step 5108, a question is asked as to whether u is now greater than one. If this question is answered in the negative, then control is returned to step 5103, and the new parameter of u is input into the first and second right curves. However, if it is answered in the affirmative, then step 4703 is concluded and the right error is the sum of the distances between the sixty-five points on the two curves considered.

FIG. 52

Figure 52:
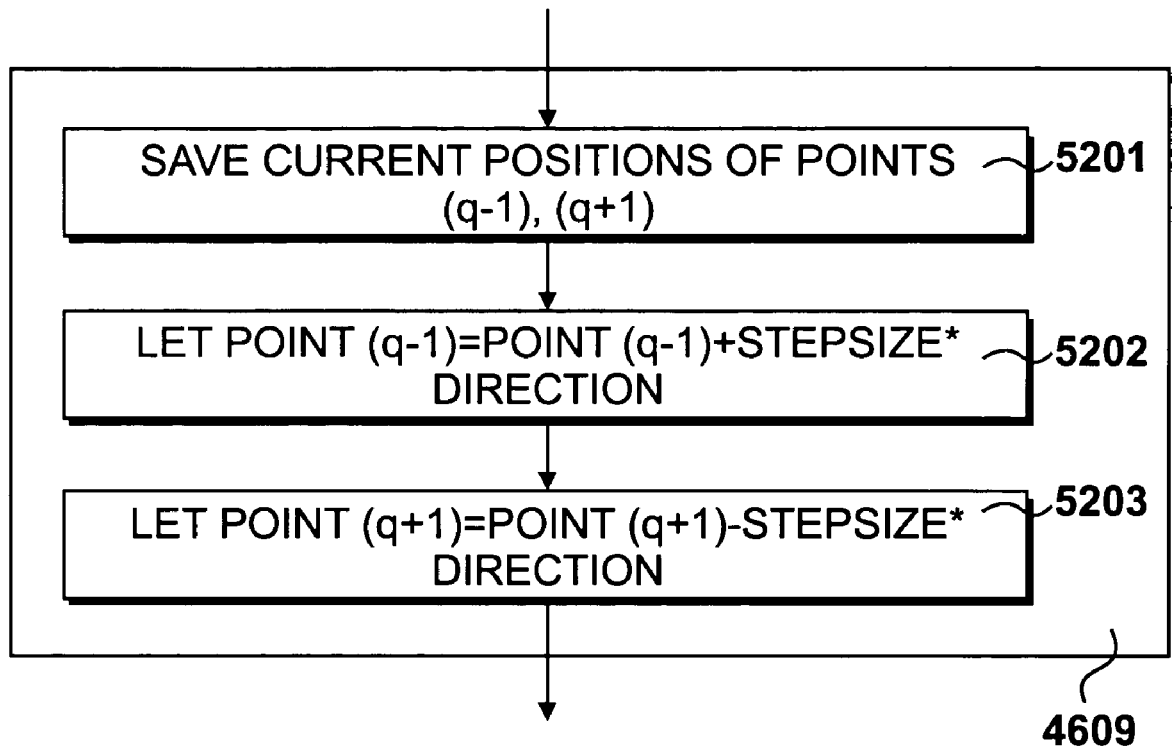
FIG. 52 details steps carried out in FIG. 46 to shorten the tangent handles at a selected control point.

FIG. 52 details step 4609 at which the tangent handles to either side of the selected control point are shortened. At step 5201, the current values of the left and right tangent control points of the control point numbered q in balanced Bézier array 409 are saved. This is in order to enable them to be retrieved if necessary at step 4613.

At step 5202, the position of the left tangent control point of the selected control point is altered by adding the product of the step size calculated at step 4606 and the direction vector obtained at step 4603 to its current position. Similarly, at step 5203, the right tangent control point is altered by subtracting the same product from it.

FIG. 53

Figure 53:
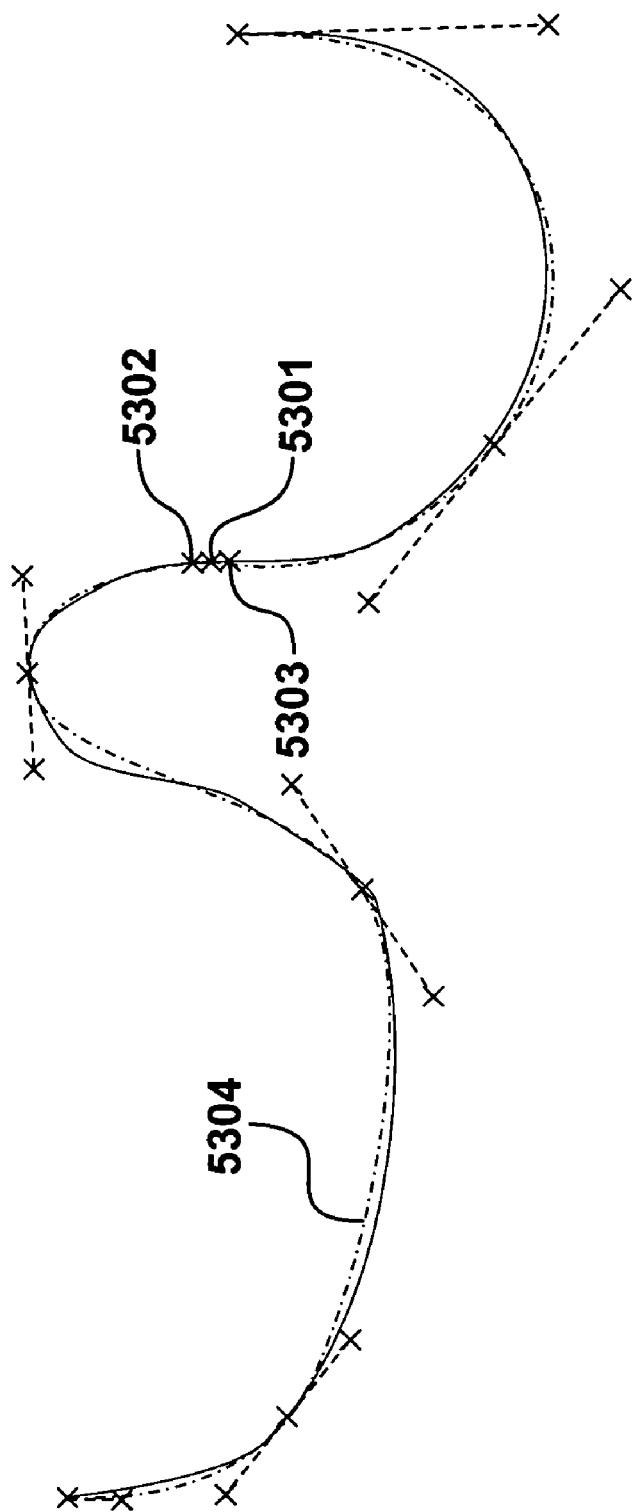
FIG. 53 shows an example of a balanced Bézier spline with adjusted tangent handle lengths.

FIG. 53 shows the results of the adjustments performed at step 1704 on the example curve shown in FIG. 18. In this example, only one of the tangent handle lengths was adjusted since changing any of the others resulted in a larger left and right error than before. However the tangent handles at point 5301, as shown by the positions of tangent control points 5302 and 5303, were shortened. Comparing this adjusted spline 5304 with the fitted Bézier spline 3801 and the balanced spline 4401, it can be seen that adjusting the lengths of the tangent handles, where appropriate, can make the balanced spline better approximate the fitted Bézier spline, which in its turn is a close fit to the original freehand curve 1601.

FIG. 54

Figure 54:
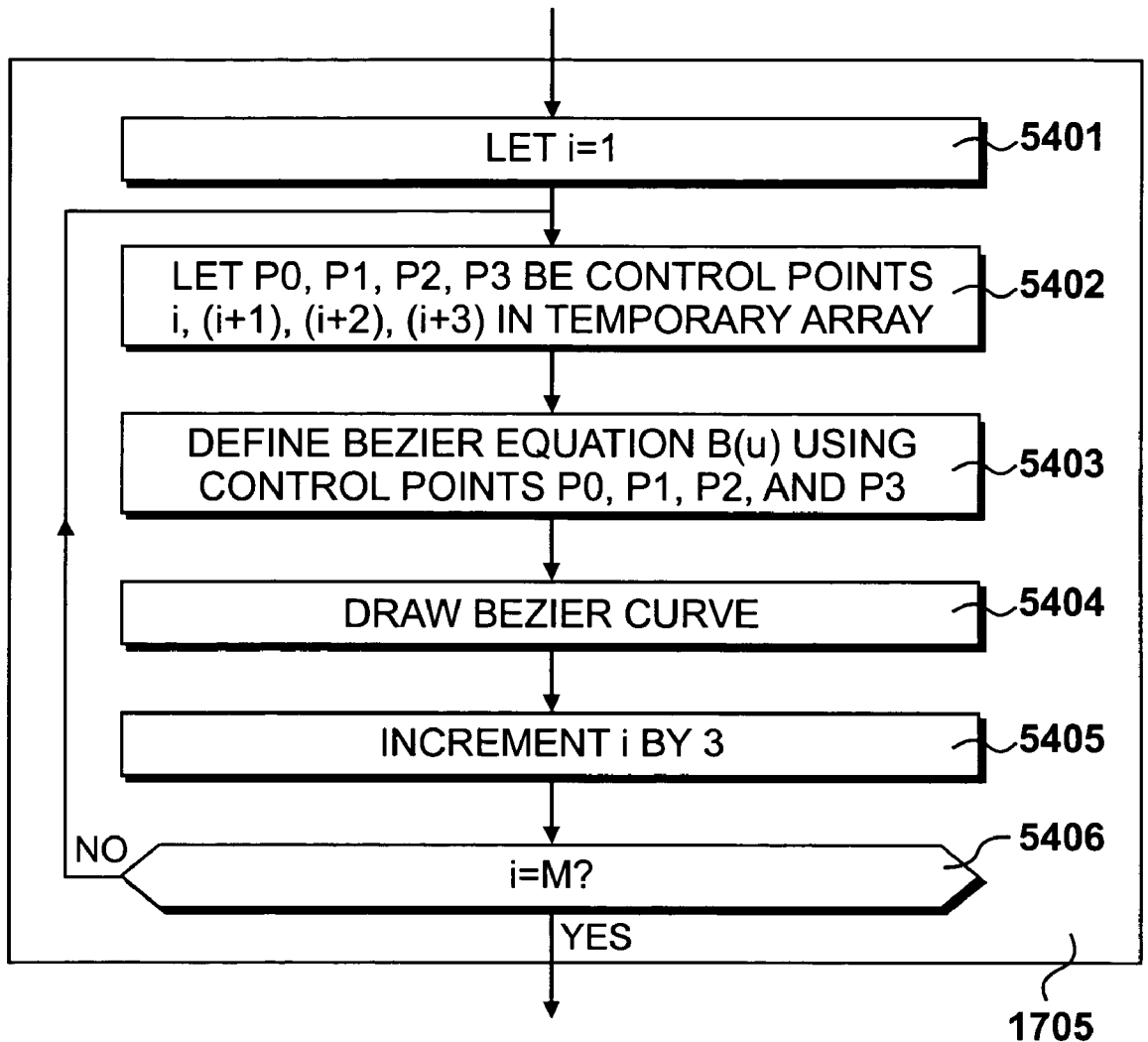
FIG. 54 details steps carried out in FIG. 17 to draw a balanced Bézier spline on the VDU shown in FIG. 1.

FIG. 54 details step 1705 at which the final curves stored in balanced Bézier array 409 are drawn on VDU 104. It will be understood that the curves shown in FIGS. 28, 31, 34, 37, 38, 43 and 44 are never drawn or displayed to the user but are provided for illustrative purposes only. However, the final curve, as defined by the points in balanced Bézier array 409 and as shown in FIG. 53, is drawn at step 1705. Thus, at step 5401, an iterator i is set to be one and at step 5402, the control points P0, P1, P2 and P3 are set to be the control point numbered i in balanced Bézier array 409 and the three immediately succeeding it. At step 5403, a Bézier equation is defined using these four control points, exactly as at step 1004 described with reference to FIG. 12.

Figure 13:
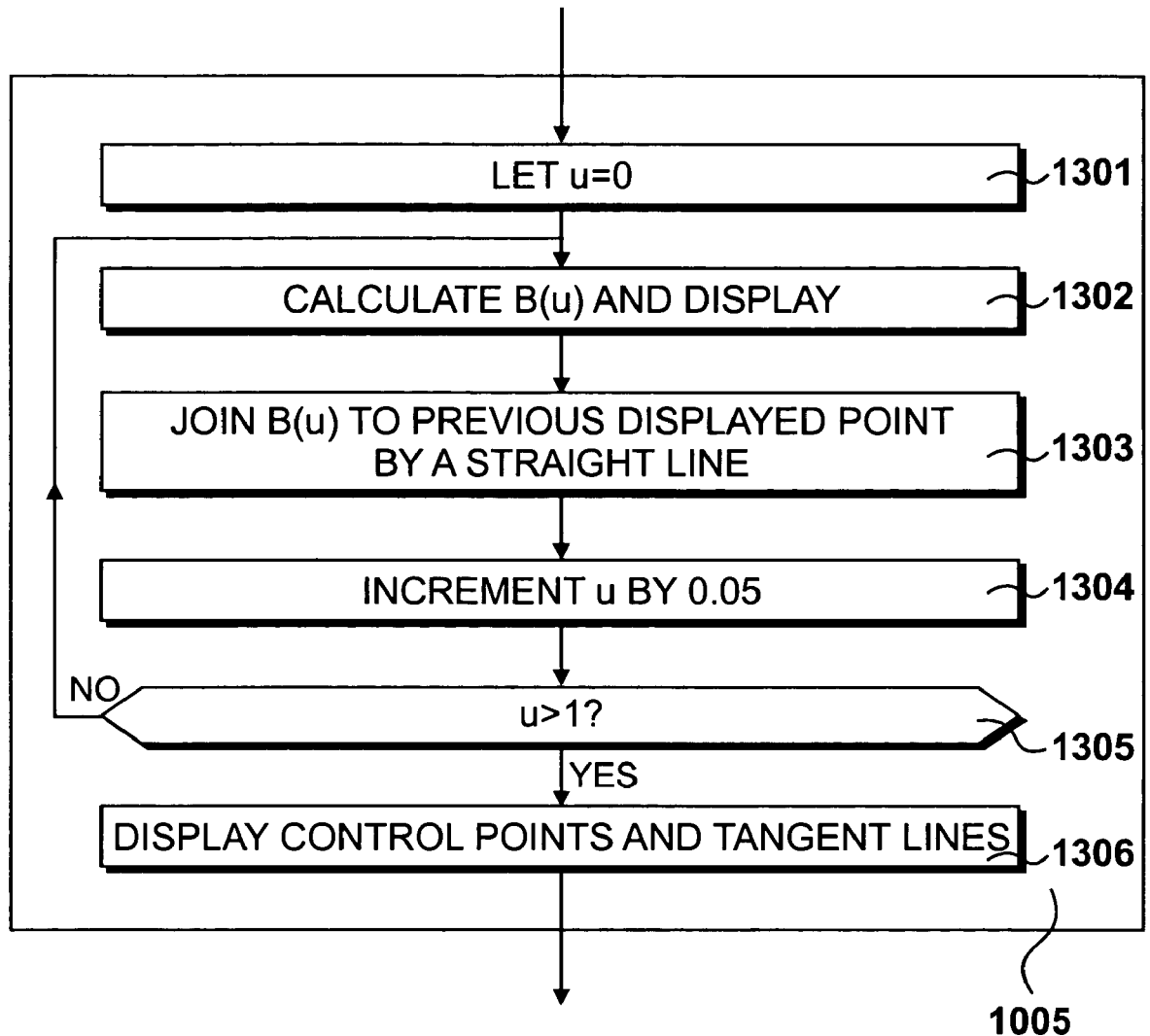
FIG. 13 details steps carried out in FIG. 10 to draw a Bézier curve.

At step 5404, the Bézier curve defined by this equation is drawn on the VDU, in exactly the same way as a Bézier curve defined by the user is drawn at step 1005 described with reference to FIG. 13. At step 5405, i is incremented by three and at step 5406, a question is asked as to whether the new value of i is equal to M, which is the number of control points in the balanced Bézier array 409. If this question is answered in the negative, then control is returned to step 5402. However, if it is answered in the affirmative, then the entire adjusted spline has been drawn and step 1705 is concluded.

FIG. 55

Once step 1705 has been concluded, the curve fitting process performed at step 906 is almost finished. All that remains is to add the points in balanced Bézier array 409 to main Bézier array 406. However, the first control point in balanced Bézier array 409 is not added to main Bézier array 406, because this point is already the last control point in maio Bézier array 406 and therefore does not need to be added.

Figure 55:
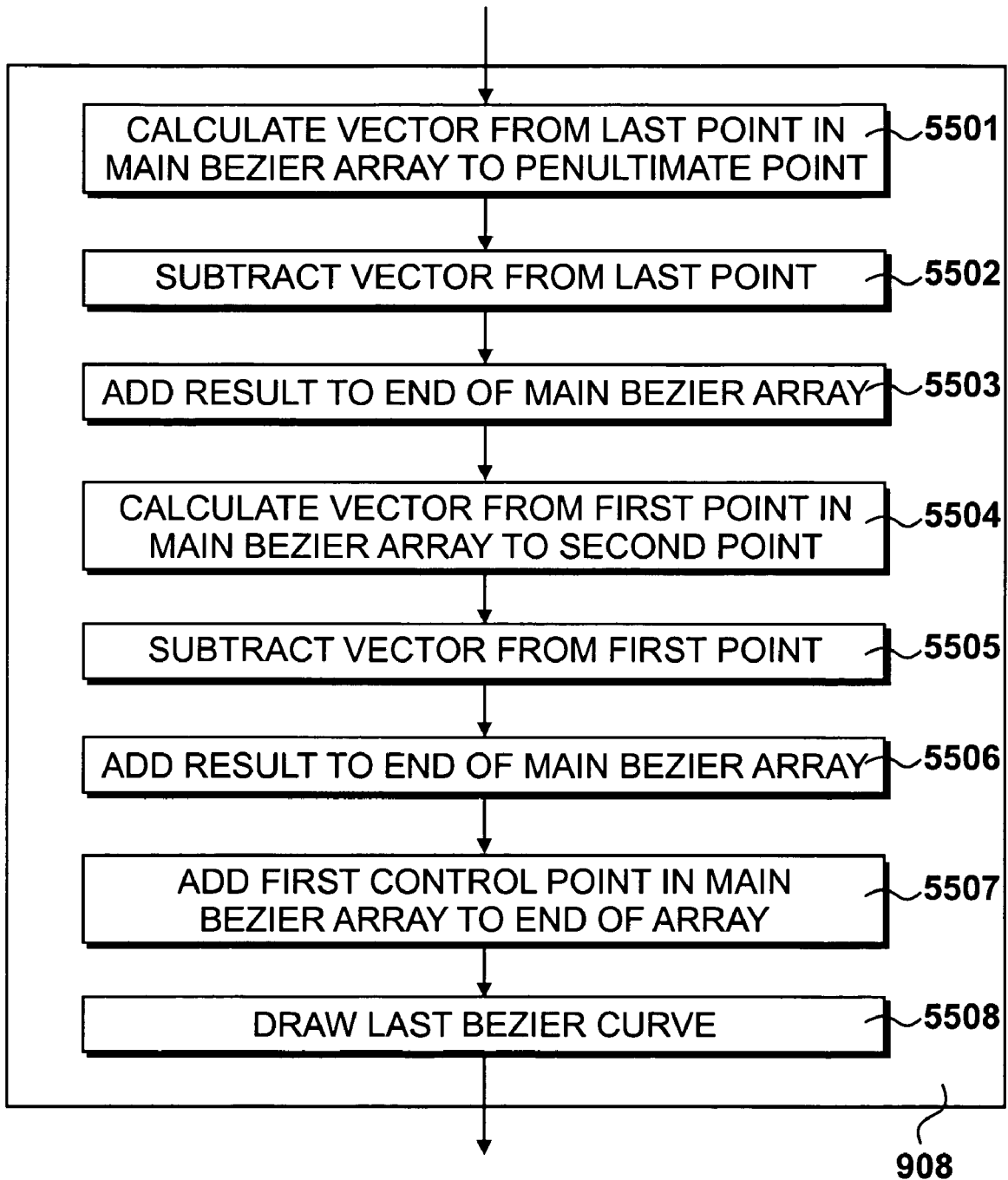
FIG. 55 details steps carried out in FIG. 17 to auto-close a spline drawn by a user on the VDU shown in FIG. 1.

Following step 906, the question is asked at step 907 as to whether there is more movement. Eventually this question will be answered in the negative when the user has finished drawing his curve and so at step 908 the spline is auto-closed. FIG. 55 details this step.

At step 5501, the vector from the last point in main Bézier array 406 to the penultimate point is obtained, and at step 5502 this vector is subtracted from the last point. The result of this step is a new tangent control point and S0 it is added to the end of main Bézier array 406 at step 5503.

At step 5504, the vector from the first point in main Bézier array 406 to the second point is calculated, and at step 5505, this vector is subtracted from the first point in main Bézier array 406. The result of this step is another tangent control point and so it is added to the end of main Bézier array 406 at step 5506. At step 5507, the first control point in main Bézier array 406 is copied to the end of the array. The result of these steps is to create a final curve in main Bézier array 406 that links the last point drawn by the user to the first point to create a closed spline. The user is then free to adjust the Bézier spline thus drawn at step 5508 if required, to ensure the garbage matte area it defines is correct.

The skilled reader will understand that this embodiment, in which a series of Bézier curves is used to define the area for a garbage matte, is not the only application in which a spline of Bézier curves is fitted to freehand curves. The tangent handle balancing process described herein has relevance wherever a curve-fitting algorithm may result in unbalanced tangent handles, including algorithms that fit splines that are made up of other than Bézier curves.

It will also be understood that although the word "fitting" has been used herein only to mean finding a curve that minimizes the sum of squares between it and the points or curve that it is to fit, any other method of finding a best-fit curve is encompassed.

What is claimed is:

1. An image processing apparatus comprising:
   (a) a computer having a memory;
   (b) an application executing on the computer, wherein the application is configured to:
      (i) obtain a first spline fitted to a plurality of points;
      (ii) fit a second spline to said first spline, wherein:
         (1) said second spline has the same number of control points as said first spline;
         (2) for any principal control point on said second spline, tangent handles of the principal control point are of equal length; and
      (iii) display said second spline on a display device.

2. The apparatus according to claim 1, wherein the principal control points of said second spline are points on said first spline.

3. The apparatus according to claim 1, wherein said application is configured to fit said second spline by performing the following steps for each principal control point on said first spline having two tangent handles:
   defining a first distance as a sum of the lengths of said tangent handles;
   identifying a new principal control point that lies on said first spline;
   calculating a tangent to said first spline at said new principal control point; and
   defining new tangent handles at said new principal control point such that the slope of said tangent handles is said tangent and the length of both tangent handles is equal to half of said first distance.

4. The apparatus according to claim 3, wherein said application is configured to identify the new principal control point by:

identifying a midpoint that lies on one of said tangent handles and is at an equal distance from each of said two tangent control points; and finding a point on said first spline that is close to said midpoint.

5. Apparatus according to claim 4, wherein said application is configured to find said close point by:

identifying a curve in the first spline upon which the close point is likely to lie;

identifying a specified number of points upon said curve using uniform parameterization; and identifying which of said points is closest to said midpoint.

6. The apparatus according claim 1, wherein the first two and last two control points of said first and second splines are identical.

7. The apparatus according to claim 1, wherein said application is further configured to adjust the length of said tangent handles on said second spline such that said second spline fits said first spline better by performing the following steps for each principal control point on said second spline having two tangent handles:

identifying a first error between first portions of said first and second splines that are to the left of said control point;

identifying a second error between second portions of said first and second splines that are to the right of said control point; and adjusting a length of said tangent handles to minimize said first and second errors.

8. The apparatus according to claim 7, wherein:

said first error is a sum of distances between a specified number of pairs of points on said first portions of said splines, said points being identified using uniform parameterization; and said second error is a sum of distances between a specified number of pairs of points on said second portions of said splines, said points being identified using uniform parameterization.

9. The apparatus according to claim 1, wherein said first and second splines each comprise a plurality of Bézier curves, wherein the curves in said first spline are joined with at least G1 continuity and the curves in said second spline are joined with at least C1 continuity.

10. The apparatus according to claim 1, wherein said step of fitting said first spline to said plurality of points comprises using a least-squares approximation to fit at least one Bézier curve to said points.

11. A method of editing image data, comprising:

fitting a first spline to a plurality of points; and fitting a second spline to said first spline, wherein said second spline has the same number of control points as said first spline and wherein for any principal control point on said second spline, tangent handles of the control point are of equal length;

display said second spline on a display device.

12. The method according to claim 11, wherein the principal control points of said second spline are points on said first spline.

13. The method according to claim 11, wherein said fitting said second spline comprises performing the following steps for each principal control point on said first spline having two tangent handles:

defining a first distance as a sum of lengths of said tangent handles;

identifying a new principal control point that lies on said first spline;

calculating a tangent to said first spline at said new principal control point; and defining new tangent handles at said new principal control point such that a slope of said tangent handles is said tangent and a length of both tangent handles is equal to half of said first distance.

14. The method according to claim 13, wherein said finding a new principal control point comprises:

identifying a midpoint that lies on one of said tangent handles and is at an equal distance from each of said two tangent control points; and finding a point on said first spline that is close to said midpoint.

15. The method according to claim 14, wherein said finding said close point comprises:

identifying a curve in a spline upon which the close point is likely to lie;

identifying a specified number of points upon said curve using uniform parameterization; and identifying which of said points is closest to said midpoint.

16. The method according to claim 11, wherein the first two and last two control points of said first and second splines are identical.

17. The method according to claim 11, further comprising adjusting a length of said tangent handles on said second spline such that said second spline is closer to said first spline, wherein for each principal control point on said second spline having two tangent handles:

identifying a first error between portions of said first and second splines that are to the left of said control point;

identifying a second error between portions of said first and second splines that are to the right of said control point; and adjusting a length of said tangent handles to minimize said first and second errors.

18. The method according to claim 17, wherein:

said first error is a sum of distances between a specified number of pairs of points on said first portions of said splines, said points being identified using uniform parameterization; and said second error is a sum of distances between a specified number of pairs of points on said second portions of said splines, said points being identified using uniform parameterization.

19. The method according claim 11, wherein said first and second splines each comprise a plurality of Bézier curves, wherein curves in said first spline are joined with at least G1 continuity and curves in said second spline are joined with at least C1 continuity.

20. The method according to claim 11, wherein said fitting said first spline to said plurality of points comprises using a least-squares approximation to fit at least one Bézier curve to said points.

* * * * *